(12) United States Patent
Ibuki et al.

(10) Patent No.: US 8,181,509 B2
(45) Date of Patent: May 22, 2012

(54) APPARATUS FOR DETERMINING AN ABNORMALITY OF A CONTROL VALVE OF AN INTERNAL COMBUSTION ENGINE

(75) Inventors: Taku Ibuki, Gotenba (JP); Tetsuji Tomita, Susono (JP); Yoshihisa Hirosawa, Kariya (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 161 days.

(21) Appl. No.: 12/808,599

(22) PCT Filed: Jul. 16, 2009

(86) PCT No.: PCT/JP2009/063233
§ 371 (c)(1),
(2), (4) Date: Jun. 16, 2010

(87) PCT Pub. No.: WO2011/007455
PCT Pub. Date: Jan. 20, 2011

(65) Prior Publication Data
US 2011/0154892 A1 Jun. 30, 2011

(51) Int. Cl.
*G01M 13/02* (2006.01)
(52) U.S. Cl. .................. 73/114.79; 73/114.77
(58) Field of Classification Search .............. 73/114.69, 73/114.76, 114.77, 114.79
See application file for complete search history.

(56) References Cited

U.S. PATENT DOCUMENTS
6,467,469 B2 * 10/2002 Yang et al. .............. 123/568.21
(Continued)

FOREIGN PATENT DOCUMENTS
JP        2-78734 A      6/1990
(Continued)

OTHER PUBLICATIONS
International Search Report for PCT/JP2009/063233, dated Oct. 20, 2009.

*Primary Examiner* — Freddie Kirkland, III
(74) *Attorney, Agent, or Firm* — Sughrue Mion, PLLC

(57) ABSTRACT

The present invention is applied to an internal combustion engine comprising a first supercharger 61, a second supercharger 62, a first control valve 66 for controlling a supply of an exhaust gas to the first supercharger, and a second control valve 64 for controlling a supply of an air to the first supercharger, and provides to an apparatus for determining an abnormality of a control valve which can determine abnormality of the first control valve and the second control valve. The apparatus for determining an abnormality of a control valve determines abnormality of a control valve when a supercharging pressure is smaller than a predetermined referential supercharging pressure by a predetermined value or more. The apparatus for determining an abnormality of a control valve determines that the first control valve is abnormal and the second control valve is normal if a pressure of an air at a downstream side of a compressor of the first supercharger is larger than a pressure of an air at an upstream side of the compressor by a predetermined value or more. In the meantime, the apparatus for determining an abnormality of a control valve determines that either one of the first control valve and the second control valve is abnormal if the pressure of the air at a downstream side of the compressor of the first supercharger is not larger than the pressure of the air at an upstream side of the compressor by a predetermined value or more.

11 Claims, 14 Drawing Sheets

U.S. PATENT DOCUMENTS

| | | | |
|---|---|---|---|
| 7,500,363 B2 * | 3/2009 | Hara et al. | 60/611 |
| 7,509,210 B2 * | 3/2009 | Tsuda et al. | 701/114 |
| 7,578,128 B2 * | 8/2009 | Miyauchi et al. | 60/611 |
| 7,926,335 B2 * | 4/2011 | Wegener et al. | 73/114.79 |
| 2001/0010214 A1 * | 8/2001 | Maegawa et al. | 123/339.23 |
| 2006/0248889 A1 * | 11/2006 | Sagisaka et al. | 60/602 |
| 2010/0153067 A1 * | 6/2010 | Heinkele et al. | 702/182 |
| 2011/0167816 A1 * | 7/2011 | Tomita et al. | 60/602 |

FOREIGN PATENT DOCUMENTS

| | | |
|---|---|---|
| JP | 03-106133 U | 11/1991 |
| JP | 2005-226501 A | 8/2005 |
| JP | 3931573 B2 | 3/2007 |
| JP | 2008-297994 A | 12/2008 |

* cited by examiner

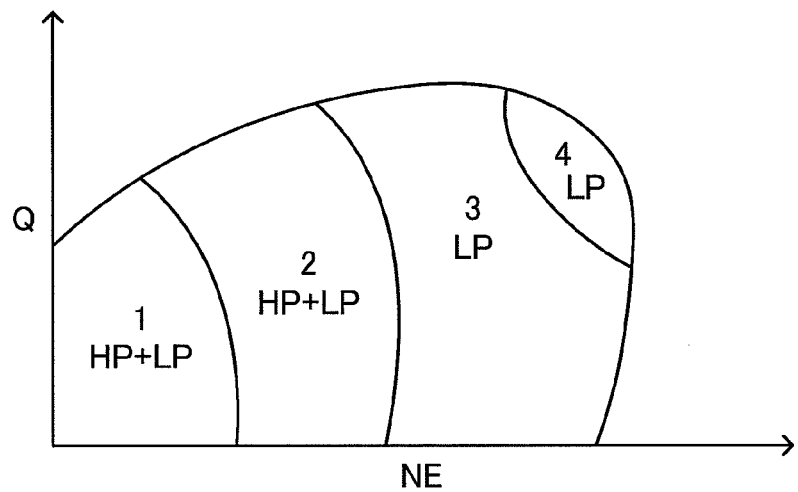
FIG. 3(A)
| Mode | 1 | 2 | 3 | 4 |
|---|---|---|---|---|
| ECV (first control valve) | fully close | open | fully open | fully open |
| ACV (second control valve) | fully close | fully close | open | fully open |
| EBV (third control valve) | fully close | fully close | fully close | open |
FIG. 3(B)
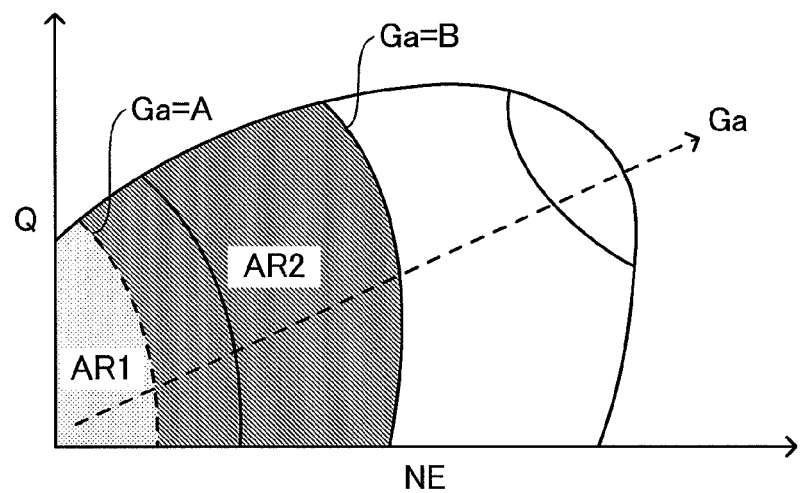
FIG. 3(C)

APPARATUS FOR DETERMINING AN ABNORMALITY OF A CONTROL VALVE OF AN INTERNAL COMBUSTION ENGINE

TECHNICAL FIELD

The present invention relates to an apparatus for determining an abnormality of a control valve, applied to an internal combustion engine having a plurality of superchargers (turbocharger) and a plurality of control valves for controlling the plurality of superchargers.

BACKGROUND ART

A conventionally known supercharger (exhaust gas turbine type supercharger) comprises a turbine which is disposed in an exhaust gas passage of an internal combustion engine and is driven by energy of an exhaust gas, and a compressor which is disposed in an intake air passage of the engine and is driven by the driven turbine. Accordingly, an air introduced into the compressor is compressed by the compressor, and thereafter the air is discharged toward combustion chambers. That is, a supercharging is performed.

It is well known that the supercharger can substantially compress an air introduced into the compressor, when a flow rate of the air is within a range from a predetermined surge flow rate to a predetermined choked flow rate. Generally, both of the surge flow rate and the choked flow rate increase as a capacity of the supercharger becomes greater. Accordingly, when only one supercharger having a relatively small capacity is used to perform the supercharging, the flow rate of the air introduced into the compressor reaches the choked flow rate under a high load operating condition of the engine, and therefore the supercharging can not be performed. On the other hand, when only one supercharger having a relatively large capacity is used to perform the supercharging, the flow rate of the air introduced into the compressor becomes smaller than the surge flow rate under a low load operating condition of the engine, and therefore the supercharging can not be performed. It is therefore understood that an operating area (load area) in which an internal combustion engine having a single supercharger can be appropriately supercharged is small compared to a whole operating area of the engine.

In view of the above, one of conventional internal combustion engines comprises: a first supercharger having a small capacity; a second supercharger having a large capacity and being connected in series with the first supercharger; a plurality of bypass passages for adjusting an air flow rate or an exhaust gas flow rate supplied to the first supercharger and the second supercharger, and a plurality of control valves disposed in the bypass passages. In this internal combustion engine, both the first supercharger and the second supercharger are appropriately used depending on the operating condition of the engine. This allows the operating area (load area) in which the engine is appropriately supercharged to be expanded.

In the conventional internal combustion engine described above, for example, a control valve (exhaust gas changeover valve) is disposed in a bypass passage for adjusting an exhaust gas flow rate supplied to the turbine of the first supercharger. This exhaust gas changeover valve is controlled by a control apparatus so as to be closed when the load of the engine is low and so as to be opened when the load of the engine is high. This allows the first supercharger having the small capacity to operate mainly when the engine is operated under the low load condition. In the meantime, this allows the second supercharger having the large capacity to operate mainly when the engine is operated under the high load condition. As a result, the engine is appropriately supercharged in a greater operating area, compared to an area where the engine having a single supercharger can be appropriately supercharged.

The control apparatus which the conventional internal combustion engine comprises determines whether or not the exhaust gas changeover valve operates properly/normally in order to retain a state where the engine is appropriately supercharged as described above. Specifically, the control apparatus stores/memorizes "a maximum value of the supercharging pressure when the exhaust gas changeover valve operates normally", the maximum value of the supercharging pressure being obtained by experiments performed in advance. Further, the control apparatus is configured in such a manner that the control apparatus determines that the exhaust gas changeover valve is abnormal/anomalous when "an actual supercharging pressure" becomes larger than "the stored maximum value of the supercharging pressure" (see, for example, Japanese Examined Utility Model No. Hei 3-106133).

DISCLOSURE OF THE INVENTION

In the meantime, in order to retain such a condition where the engine is appropriately supercharged as described above, it is preferable for the control apparatus to determine not only whether or not the exhaust gas changeover valve operates properly, but also whether or not another control valve other than the exhaust gas changeover valve operates properly. More specifically, it is preferable for the control apparatus to further determine whether or not "a control valve (intake air changeover valve) disposed in a bypass passage for adjusting a flow rate of an air supplied to the compressor of the first supercharger" operates properly. However, the utility model does not disclose how to determine whether or not the intake air changeover valve operates normally at all.

Further, in the conventional apparatus, the abnormality of the exhaust gas changeover valve can not be found until when an actual supercharging pressure becomes larger than the predetermined maximum value of the supercharging pressure, even if the exhaust gas changeover valve is abnormal. In addition, the actual supercharging pressure generally becomes larger than the predetermined maximum value when the engine is operated in a high load operating area. Therefore, in the conventional apparatus, the abnormality of the exhaust gas changeover valve can not be found when the engine is operated in an area other than the high load operating area. However, if a valve is abnormal, it is preferable that the abnormality of the valve be found as soon as possible.

The present invention is made to solve the problem described above. That is, one of objects of the present invention is to provide an apparatus for determining an abnormality of control valves early, applied to "an internal combustion engine having a plurality of superchargers, a plurality of bypass passages, and a plurality of control valves including the exhaust gas changeover valve and the intake air changeover valve", which can determine whether or not the exhaust gas changeover valve and the intake air changeover valve operate normally.

The apparatus for determining an abnormality of a control valve of an internal combustion engine according to the present invention is applied to an internal combustion engine comprising: a first supercharger: a second supercharger; a first passage section; a first control valve corresponding to the exhaust gas changeover valve; a second passage section; and a second control valve corresponding to the intake air changeover valve.

The first supercharger comprises a first turbine and a second turbine.

The first turbine is disposed in an exhaust gas passage. Accordingly, the first turbine is driven by energy of an exhaust gas which is introduced into the first turbine. The first compressor is disposed in an intake air passage of the engine. The first compressor is configured so as to be driven by the driven first turbine. Consequently, the first compressor compresses an air introduced into the first compressor. Hereinafter, the air introduced into the first compressor will be referred to as "a new air".

The second supercharger comprises a second turbine and a second compressor.

The second turbine is disposed in the exhaust gas passage at a downstream side of (at a position downstream of) the first turbine. Accordingly, the second turbine is driven by energy of the exhaust gas introduced into the second turbine. The second compressor is disposed in the intake air passage at an upstream side of (at a position upstream of) the first compressor. Consequently, the second compressor compresses an air introduced into the second compressor. That is, the first supercharger and the second supercharger are connected in series with each other.

The first passage section is a passage, whose one end is connected to the exhaust gas passage at an upstream side of the first turbine, and whose the other end is connected to the exhaust gas passage between the first turbine and the second turbine. That is, the first passage section constitutes a passage which bypasses the first turbine.

The first control valve is disposed in the first passage section. The first control valve is configured so as to change a flow passage area of the first passage section depending on an opening degree of the first control valve. Accordingly, the first control valve changes a ratio between "a magnitude of energy of the exhaust gas introduced into the first turbine" and "a magnitude of energy of the exhaust gas introduced into the second turbine".

The second passage section is a passage, whose one end is connected to the intake air passage between the first compressor and the second compressor, and whose the other end is connected to the intake air passage at the downstream side of the first compressor. That is, the second passage section constitutes a passage which bypasses the first compressor.

The second control valve is disposed in the second passage section. The second control valve is configured in such a manner that the second control valve "opens" the second passage section so as to allow an air to pass through the second passage section, when "a pressure of an air in the second passage section at an upstream side of the second control valve" is larger than "a pressure of an air in the second passage section at the downstream side of the second control valve" by a first pressure or more. Further, the second control valve is configured in such a manner that the second control valve "closes" the second passage section so as not to allow an air to pass through the second passage section, when "the pressure of the air in the second passage section at an upstream side of the second control valve" is not larger than "the pressure of the air in the second passage section at the downstream side of the second control valve" by the first pressure or more.

The second control valve constituted as described above closes the second passage section when the pressure of the air at a downstream side of the second control valve is larger than the pressure of the air at an upstream side of the second control valve (that is, when the first compressor compresses the new air). As a result, the new air which is compressed by the first compressor is introduced into a combustion chamber.

The apparatus for determining an abnormality of a control valve of the present invention is applied to the internal combustion engine as described above. The apparatus for determining an abnormality of a control valve comprises: control-valve-operating-means which operates the first control valve; pressure-obtaining-means; and abnormality-determining-means.

The control-valve-operating-means operates the first control valve depending on "the new air amount", which is an amount of an air introduced into the combustion chamber from an outside of the engine as described above. Specifically, the control-valve-operating-means is configured in such a manner that the control-valve-operating-means operates the first control valve so that the first compressor compresses the air introduced into the first compressor and discharges the compressed air by driving the first turbine, when the engine is operated in "a first operating area" in which the new air amount is smaller than or equal to "a first threshold new air amount".

"The first operating area" is an area which substantially coincides with an operating area in which "only the first supercharger", among the first supercharger and the second supercharger, can mainly supercharge the engine. That is, the second supercharger does not supercharge the engine when the engine is operated in the first operating area. Accordingly, the new air is appropriately compressed by the first supercharger if "the first control valve and the second control valve" operate normally, when the engine is operated in the first operating area.

The pressure-obtaining-means is configured so as to obtain "a between-compressors-pressure" which is a pressure of an air in the intake air passage "between the first compressor and the second compressor".

Further, the pressure-obtaining-means is configured so as to obtain "a first-compressor-downstream-side-pressure" which is a pressure of an air in the intake air passage "at a downstream side of the first compressor and at an upstream side of a pressure loss generating member which is disposed between the first compressor and the combustion chamber". That is, the first-compressor-downstream-side-pressure is a pressure which substantially coincides with a pressure of an air immediately after passing through the first compressor.

"The pressure loss generation member" is a member: which is disposed in the intake air passage at a downstream side of the first compressor; and which decreases a pressure of the new air which passes through the pressure loss generation member. For example, the pressure loss generation member may include an apparatus for cooling a new air (intercooler), an apparatus for controlling an amount of a new air (throttle valve), and an internal surface of an intake pipe which constitutes the intake air passage.

In addition, the pressure-obtaining-means is configured so as to obtain "a supercharging pressure" which is a pressure of an air in the intake air passage "at a downstream side of the pressure loss generation member". The supercharging pressure is a pressure which is smaller than the first-compressor-downstream-side-pressure by an amount of the pressure loss which is generated by the pressure loss generation member.

The abnormality-determining-means is configured in such a manner that, if "a supercharging-pressure-abnormal-state", which is a state where "the obtained supercharging pressure" is smaller than "a referential supercharging pressure which is determined based on an operating condition of the engine" by a second pressure or more, occurs when the engine is operated in "the first operating area", (A) the abnormality-determining-means determines that "the first control valve is abnormal and the second control valve is normal" if the first-compressor-downstream-side-pressure is larger than a first threshold pressure which is larger than or equal to the between-compressors-pressure, and (B) the abnormality-determining-means determines that "either one of the first control valve and the second control valve is abnormal" if the first-compressor-downstream-side-pressure is smaller than or equal to the first threshold pressure.

"The referential supercharging pressure" is a value serving as an indicative parameter: which is used to determine whether or not the first control valve and the second control valve are normal; and which substantially coincides with the supercharging pressure which is obtained when both the first control valve and the second control valve are "normal". For example, the referential supercharging pressure may be determined by: firstly defining a relation between "a predetermined operation parameter(s) and the supercharging pressure" when both the first control valve and the second control valve are normal based on experiments performed in advance; and secondly applying "an actual operation parameter(s)" which is obtained when the engine is driven to the defined relation. Further, for example, a target supercharging pressure which is required for the engine may be adopted as the referential supercharging pressure.

Accordingly, a supercharging pressure which is obtained by the pressure-obtaining-means substantially coincides with the referential supercharging pressure, when both the first control valve and the second control valve are normal. To the contrary, if at least one of the first control valve and the second control valve is abnormal, the supercharging pressure is smaller than the referential supercharging pressure.

In view of the above, the abnormality-determining-means is configured in such a manner that the abnormality-determining-means determines which control valve is abnormal if the supercharging pressure is smaller than the referential supercharging pressure by the second pressure or more (i.e., if "the supercharging-pressure-abnormal-state" occurs). "The second pressure" may be set at an appropriate certain value which allows that the abnormality-determining-means to determine that at least one of the first control valve and the second control valve is abnormal if the supercharging pressure is smaller than the referential supercharging pressure by the second pressure or more. It should be noted that the second pressure may be zero.

More specifically, in the apparatus for determining an abnormality of a control valve of the present invention, "the first value which is determined based on the between-compressors-pressure" and "the first-compressor-downstream-side-pressure" are compared if "the supercharging-pressure-abnormal-state" occurs when the engine is operated in "the first operating area". Further, the abnormality-determining-means determines which control valve is abnormal based on a result of the comparison (refer to (A) and (B) above). Hereinafter, "a principle for determining abnormality of the first control valve and the second control valve" which is adopted by the abnormality-determining-means will be described below. Hereinafter, this principle will be simply referred to as "abnormality-determining-principle" for convenience.

As described above, the first control valve changes energy of the exhaust gas introduced into the first turbine by changing the flow passage area of the first passage section depending on the opening degree of the first control valve. Specifically, a magnitude of energy of the exhaust gas introduced into the first turbine becomes the maximum when the opening degree of the first control valve is set at an opening degree to shut the first passage section (i.e., fully-closed-opening-degree). The first compressor is driven by the driven first turbine, and the first compressor compresses the new air, when the opening degree of the first control valve is the fully-closed-opening-degree.

The magnitude of the exhaust gas introduced into the first turbine decreases when the opening degree of the first control valve becomes larger than "the fully-closed-opening-degree". The first compressor can still compresses the new air if the magnitude of energy of the exhaust gas introduced into the first turbine is larger than or equal to "the smallest value of the magnitude of energy by which the first compressor can drive", even though the opening degree of the first control valve becomes larger than the fully-closed-opening-degree. To the contrary, the first compressor can not compress the new air if the magnitude of the energy of the exhaust gas introduced into the first turbine is smaller than "the smallest value". For example, the energy of the exhaust gas is not substantially introduced into the first turbine when the opening degree of the first control valve is set at an opening degree to fully open the first passage section (i.e., fully-opened-opening-degree), and therefore the first compressor can not compress the new air.

Hereinafter, a range of the opening degree from "the fully-closed-opening-degree" to "the opening degree at which the magnitude of energy of the exhaust gas introduced into the first turbine is the smallest value described above" among the entire range of the opening degree of the first control valve will be referred to as "first compressor drivable range" for convenience. Further, a range of the opening degree from "the opening degree at which the magnitude of energy of the exhaust gas introduced into the first turbine is the smallest value described above" to "the fully-opened-opening-degree" among the entire range of the opening degree of the first control valve will be referred to as "first compressor undrivable range" for convenience.

(1) Now, it is assumed that the first control valve is "normal". As described above, the first control valve is operated in such a manner that "the first compressor compresses the new air introduced into the first compressor and discharges the compressed air", when the engine is operated in the "first operating area". That is, the first control valve is operated in such a manner that the opening degree of the first control valve is in a predetermined opening degree in the first compressor drivable range. Accordingly, a pressure of the new air "after" passing through the first compressor (the first-compressor-downstream-side-pressure, as described above) is larger than a pressure of the new air "before" passing through the first compressor (the between-compressors-pressure, as described above). It should be noted that "the predetermined opening degree" described above is an opening degree determined based on the operating condition, and the like.

In the meantime, the second control valve is configured in such a manner that the second control valve opens the second passage section when "the pressure of the air in the second passage section at an upstream side of the second control valve (the between-compressors-pressure)" is larger than "the pressure of the air in the second passage section at a downstream side of the second control valve (the first-compressor-downstream-side-pressure)" by the first pressure or more, and the second control valve shuts the second passage section when the between-compressors-pressure is not larger than the first-compressor-downstream-side-pressure by the first pressure or more. Accordingly, the second control valve always shuts the second passage section when the first-compressor-downstream-side-pressure is larger than the between-compressors-pressure, if the second control valve is "normal". As a result, the air compressed by the first compressor is introduced into the combustion chamber of the engine. The compressed air is appropriately compressed in this case, and therefore the supercharging pressure coincides with the referential supercharging pressure.

To the contrary, the second control valve does not shuts the second passage section if the second control valve is "abnormal", even if the first compressor is driven so as to compress the new air (i.e., even if the first supercharger is operated so that the first-compressor-downstream-side-pressure be larger than the between-compressors-pressure). The upstream side of the first compressor and the downstream side of the first compressor are communicated with each other, when the second passage section is not shut. Accordingly, the new air is not compressed if the second control valve is abnormal. Consequently, the supercharging pressure becomes smaller than the referential supercharging pressure in this case.

(2) Next, it is assumed that the first control valve is "abnormal" (i.e., the opening degree of the first control valve does not coincide with "the predetermined opening degree described above"). Under this assumption, a phenomenon which occurs in a case where the first control valve is abnormal and the opening degree of the first control valve is within the first compressor drivable range is different from a phenomenon which occurs in a case where the first control valve is abnormal and the opening degree of the first control valve is within the first compressor un-drivable range.

(2-1) In the case where the first control valve is abnormal and the opening degree of the first control valve is within the first compressor drivable range In this case, the first compressor can compress the new air if the second control valve is "normal". It should be noted that the opening degree of the first control valve is different from the predetermined opening degree, and therefore the supercharging pressure becomes smaller than the referential supercharging pressure, in this case.

(2-2) In the case where the first control valve is abnormal and the opening degree of the first control valve is within the first compressor un-drivable range In this case, the first compressor can not compress the new air regardless of whether or not the second control valve is "normal". Accordingly, the supercharging pressure is smaller than the referential supercharging pressure, in this case.

As described above, the supercharging pressure is smaller than the referential supercharging pressure if any of the first control valve and the second control valve is abnormal, when the engine is operated in the first operating area. However, the first compressor can compress the new air if the first control valve is "abnormal (it should be noted that an opening degree of the first control valve is still within the first compressor drivable range)" and the second control valve is "normal", as described in the case (2-1). In view of the above, the abnormality-determining-means determines that "the first control valve is abnormal and the second control valve is normal", if "the supercharging pressure is smaller than the referential supercharging pressure and the first compressor compresses the new air (i.e., the first-compressor-downstream-side-pressure is larger than the first threshold pressure)" (refer to (A) above).

To the contrary, the first compressor can not compresses the new air, in the case where the first control valve is "normal" and the second control valve is "abnormal" as described in the above (1), or in the case where the first control valve is "abnormal (it should be noted that an opening degree of the first control valve is within the first compressor un-drivable range)" as described in the above (2-2). In view of the above, the abnormality-determining-means determines that "either one of the first control valve and the second control valve is abnormal", if "the supercharging pressure is smaller than the referential supercharging pressure and the first compressor does not compress the new air (i.e., the first-compressor-downstream-side-pressure is smaller than or equal to the first threshold pressure)" (refer to (B) above). These are "the principle to determine the abnormality" adopted by the abnormality-determining-means.

The first threshold pressure may be set at a constant value or a pressure which is larger than the between-compressors-pressure by a third pressure including zero (that is, a pressure which becomes larger as the between-compressors-pressure becomes larger in a range which is larger than or equal to the between-compressors-pressure). The third pressure may be set at an appropriate certain value which allows the abnormality-determining-means to determine that the first compressor compresses the new air when the first-compressor-downstream-side-pressure is larger than "a pressure larger than the between-compressors-pressure by the third pressure".

As described above, the apparatus for determining an abnormality of a control valve of the present invention is adopted to an internal combustion engine having a plurality of compressors, a plurality of bypass passage sections, and a plurality of control valves which include an exhaust gas changeover valve and an intake air changeover valve, and can determine whether or not the first control valve serving as the exhaust gas changeover valve and the second control valve serving as the intake air changeover valve operate normally. Further, the apparatus for determining an abnormality of a control valve of the present invention can determine whether or not the control valves operate normally even if the engine is operated in a relatively low load operating area (i.e., the first operating area). Accordingly, the apparatus for determining an abnormality of a control valve of the present invention can found the abnormality of the control valves early.

Further, in the apparatus for determining an abnormality of a control valve of the present invention, method by which the pressure-obtaining-means obtains the first-compressor-downstream-side-pressure is not specifically limited.

For example, the pressure-obtaining-means may be configured in such a manner that the pressure-obtaining-means firstly "estimates" an amount of the pressure loss generated by the pressure loss generation member, secondly obtains the supercharging pressure by actually detecting the supercharging pressure, and thirdly obtains "a sum of the estimated pressure loss and the obtained supercharging pressure" as the first-compressor-downstream-side-pressure.

Further, method by which the pressure-obtaining-means estimates the amount of the pressure loss is not specifically limited. For example, the pressure-obtaining-means may be configured in such a manner that the pressure-obtaining-means firstly defines "a relation between a flow rate of the new air and a pressure loss generated by the pressure loss generation member" in advance, and secondly applies an actual flow rate of the new air to the relation to estimate the amount of the pressure loss.

In the meantime, the internal combustion engine having a plurality of compressors, which is described above, may be configured so as to have "a third passage section which bypasses the second turbine" and "a third control valve which is disposed in the third passage section" in addition to the constitution above. The apparatus for determining an abnormality of a control valve of the present invention can be adopted to the engine constituted as described above.

More specifically, the third passage section is a passage whose one end is connected to the exhaust gas passage between the first turbine and the second turbine and whose the other end is connected to the exhaust gas passage at a downstream side of the second turbine. That is, the third passage section constitutes a passage which bypasses the second turbine.

The third control valve which is disposed in the third passage section is configured so as to change a flow passage area of the third passage section depending on an opening degree of the third control valve. Thereby, the third control valve changes "a magnitude of energy of the exhaust gas introduced into the second turbine".

In a case where the apparatus for determining an abnormality of a control valve of the present invention is adopted to the engine above, the control-valve-operating-means is configured in such a manner that the control-valve-operating-means operates the third control valve so as "not" to allow the exhaust gas to pass through the third passage section, when that the engine is operated in "the first operating area" or in "a second operating area in which the new air amount is larger than the first threshold new air amount and smaller than or equal to a second threshold new air amount which is larger than the first threshold new air amount".

"The second operating area" is an area which substantially coincide with an operating area in which "both" of the first compressor and the second compressor can supercharge the engine. That is, the new air is compressed by the second compressor regardless of the condition of the first control valve and the second control valve, in a case where the exhaust gas is not allowed to pass through the third passage section by "the third control valve" operating normally when the engine is operated in the second operating area, since a sufficient amount of energy of the exhaust gas is introduced into the second supercharger in this case. In other words, it can be determined that the third control valve operates normally if the new air is compressed by the second supercharger.

In view of the above, the abnormality-determining-means is configured in such a manner that, if "the supercharging-pressure-abnormal-state" occurs when the engine is operated in "the second operating area", (C) the abnormality-determining-means determines that "the third control valve is normal" if the between-compressors-pressure is larger than or equal to a predetermined second threshold pressure, and (D) the abnormality-determining-means determines that "the third control valve is abnormal" if the between-compressors-pressure is smaller than the second threshold pressure.

"The second threshold pressure" is a value serving as an indicative parameter: which is used to determine whether or not the third control valve is abnormal; and which corresponds to the minimum value among the between-compressors-pressure which is obtained when the third control valve is "normal". For example, the second threshold pressure may be the atmospheric pressure. Further, the second threshold pressure may be a value obtained by adding "a predetermined value which is determined by the operating condition of the engine and a required performance of the second supercharger, and the like" to the atmospheric pressure. Still further, the second threshold pressure may be a value which is obtained by reducing "an amount of the pressure loss which is generated in a passage from an outside of the engine to the second compressor" from the atmospheric pressure.

As described above, the apparatus for determining an abnormality of a control valve of the present invention can be adopted to an internal combustion engine having a plurality of compressors, a plurality of bypass passage sections, and a plurality of control valves including an exhaust gas changeover valve, an intake air changeover valve and other control valve (the third control valve), and can determine whether or not the "other control valve (the third control valve)" operates normally.

Further, the apparatus for determining an abnormality of a control valve of the present invention may be configured to determine the abnormality of the control valves under an assumption that "two or more control valves among the first control valve, the second control valve and the third control valve become abnormal at the same time". It is rare in actuality that two or more control valves among the first control valve, the second control valve and the third control valve become abnormal at the same time, and therefore this assumption is practical. Hereinafter, this assumption will be referred to as "multiple-abnormality-exclusive-assumption". Under the multiple-abnormality-exclusive-assumption, it can be inferred, when it is determined that "one control valve among the first control valve, and the second control valve and the third control valve is abnormal", that "the other control valves other than the one control valve are normal".

In view of the above, in the apparatus for determining an abnormality of a control valve, the abnormality-determining-means may be configured so as to infer that "the first control valve and the second control valve are normal", if the abnormality-determining-means determines that "the third control valve is abnormal".

Further, in the apparatus for determining an abnormality of a control valve of the present invention, the control-valve-operating-means may be configured in such a manner that the control-valve-operating-means operates the first control valve so as to compress the air introduced into the first compressor and discharge the compressed air, when the engine is operated in "the second operating area", in the same way as the engine is operated in "the first operating area".

In the abnormality-determining-principle described above, the abnormality of the first control valve and the second control valve are determined based on the operation of the first control valve and the second control valve when the engine is operated in the "first operating area". However, the first control valve is operated in the same way as the engine is operated in the "first operating area" even though the engine is operated in "the second operating area", when the control-valve-operating-means is configured as above. Further, as described above, the second control valve operates based on the pressure of the air at an upstream side of the second control valve and the pressure of the air at a downstream side of the second control valve, regardless of operating area in which the engine is operated. Accordingly, the abnormality-determining-principle can be adopted to the apparatus for determining an abnormality of a control valve, even when the engine which is configured as above is operated in "the second operating area".

In view of the above, the abnormality-determining-means may be configured in such a manner, if the abnormality-determining-means determines that the third control valve is normal when the engine is operated in "the second operating area", that: the abnormality-determining-means determines that "the first control valve is abnormal and the second control valve is normal" if the first-compressor-downstream-side-pressure is larger than the first threshold pressure; and the abnormality-determining-means determines that "either one of the first control valve and the second control valve is abnormal" if the first-compressor-downstream-side-pressure is smaller than or equal to the first threshold pressure.

Further, the apparatus for determining an abnormality of a control valve of the present invention may be configured so as to identify which of the first control valve and the second control valve is abnormal, if the supercharging-pressure-abnormal-state occurs and the first-compressor-downstream-side-pressure is smaller than or equal to the first threshold pressure (that is, when the abnormality-determining-means determines that "either one of the first control valve and the second control valve is abnormal"), when the engine is operated in either one of "the first operating area" and "the second operating area".

Specifically, the abnormality-determining-means is configured in such a manner that:

firstly, the abnormality-determining-means obtains, as "a first value", the supercharging-pressure-corresponding-value which becomes larger as the obtained supercharging pressure becomes larger;

subsequently, the abnormality-determining-means operates the first control valve, at "a first timing" after the timing at which the abnormality-determining-means obtains the first value, in such a manner that the opening degree of the first control valve coincides with "a second opening degree different from a first opening degree which is an opening degree of the first control valve at a timing when the abnormality-determining-means obtains the first value", and subsequently, the abnormality-determining-means obtains, "as a second value", the supercharging-pressure-corresponding-value which is obtained at "a second timing" at which a predetermined period has elapsed from the first timing, during a period in which an abnormality determining condition including "a condition that the engine is operated in the second operating area" is satisfied.

The engine is operated in "the second operating area" when the abnormality determining condition is satisfied, and therefore the first control valve is operated within "the range where both of the first compressor and the second compressor compress the new air" as described above. Energy of the exhaust gas is distributed to the first compressor and the second compressor, when both of the first compressor and the second compressor compress the new air. Then, the magnitude of energy of the exhaust gas introduced into the first compressor and the magnitude of energy of the exhaust gas introduced into the second compressor change, if the first control valve is "normal", when the first control valve is operated so as to change the opening degree of the first control valve from the first opening degree to the second opening degree, since actual opening degree of the first control valve also changes from the first opening degree to the second opening degree when the first control valve is operated as above.

The second control valve shuts the second passage section when the engine is operated in the second operating area, and therefore the both of the first supercharger and the second supercharger supercharge the engine (refer to (1) above), if the second control valve is "normal". Further, a change amount of efficiency of supercharging (supercharging efficiency) of the first supercharger which is associated with a change of the amount of the energy of the exhaust gas introduced into the first supercharger is different from a change amount of supercharging efficiency of the second supercharger which is associated with a change of the amount of the energy of the exhaust gas introduced into the second supercharger. As a result, the supercharging pressure changes when the opening degree of the first value is changed.

To the contrary, the second compressor does not shut the second passage section when the engine is operated in the second operating area, and therefore only the second compressor supercharges the engine (refer to (1) above), if the second control valve is "abnormal". Further, the amount of energy of the exhaust gas changes when the opening degree of the first control valve is changed. As a result, the supercharging pressure changes when the opening degree of the first value is changed.

That is, the supercharging pressure always changes when the first control valve is operated so as to change the opening degree of the first control valve from the first opening degree to the second opening degree, if actual opening degree of the first control valve is changed from the first opening degree to the second opening degree when the first control valve is operated as above, regardless of the condition of the second control valve.

Accordingly, it can be determined that the first control valve is "normal" and then the second control valve is "abnormal" in accordance with "the multiple-abnormality-exclusive-assumption", if the supercharging pressure changes when the first control valve is operated as described above. To the contrary, it can be determined that the first control valve is "abnormal" and then the second control valve is "normal" in accordance with "the multiple-abnormality-exclusive-assumption", if the supercharging pressure does not change when the first control valve is operated as described above.

In view of the above, the abnormality-determining-means may be configured in such a manner that:

(E) the abnormality-determining-means determines that "the first control valve is normal and the second control valve is abnormal" if an absolute value of "a change amount of the supercharging-pressure-corresponding-value", which is the difference of the second value and the first value, is larger than or equal to a predetermined threshold change amount; and (F) the abnormality-determining-means determines that "the first control valve is abnormal and the second control valve is normal" if the absolute value of the change amount of the supercharging-pressure-corresponding-value is smaller than the threshold change amount.

It should be noted that "the threshold change amount" is a value serving as an indicative parameter: which is used to determined whether or not the first control valve is normal; and which corresponds to "the minimum value among a difference between the first value and the second value (i.e., a change amount of the supercharging-pressure-corresponding-value)" which is obtained when the first control valve is "normal".

As described above, the apparatus for determining an abnormality of a control valve of the present invention can identify "which of the first control valve and the second control valve is abnormal" based on a result which is obtained by forcibly operating the first control valve, when the abnormality-determining-means determines that "either one of the first control valve and the second control valve is abnormal".

Further, in the configuration described above, "the amount which becomes larger as the supercharging pressure becomes larger" is obtained as the supercharging-pressure-corresponding-value. For example, the supercharging pressure itself or the new air amount may be adopted as the supercharging-pressure-corresponding-value.

In view of the above, the abnormality-determining-means may be configured so as to obtain "the new air amount" as the supercharging-pressure-corresponding-value. Further, the abnormality-determining-means may be configured so as to obtain "the new air amount" as the supercharging-pressure-corresponding-value.

Further, in the apparatus for determining an abnormality of a control valve of the present invention, the control-valve-operating-means is preferably configured in such a manner that the control-valve-operating-means operates the first control valve so that the opening degree of the first control valve becomes "a fully-closed-opening-degree (i.e., an opening degree where the first passage section is shut)", when the engine is operated in "the first operating area".

The magnitude of energy of the exhaust gas introduced into the first supercharger (the first turbine) can be the maximum value by operating the first control valve as described above. Accordingly, the energy of the exhaust gas discharged from the combustion chamber can be utilized "for driving the first compressor" in the most efficient manner when the engine is operated in the first operating area.

In one of the embodiments of the apparatus for determining an abnormality of a control valve of the present invention, the first control valve is configured so as to vary the flow passage area of the first passage section in response to an instruction signal, and the control-valve-operating-means or the abnormality-determining-means is configured so as to change the opening degree of the first control valve by sending the instruction signal to a first control valve driving means.

Further, the second control valve is configured so as to shut or open the second passage section depending on the pressure of the air at an upstream side of the second control valve and the pressure of the air at a downstream side of the second control valve.

The second control valve as described above may be configured, as one of embodiments of the second control valve, in such a manner that:

The second control valve may comprise "a valving element", "a valve seat portion" against which the valving element rests, and "biasing means" for biasing the valving element toward the valve seat portion. Specifically, the second control valve may be configured in such a manner that: the valving element is moved to "a first position at which the valving element rests against the valve seat portion" by a biasing force generated by the biasing means so as to "close the second passage section", when "the pressure of the air in the second passage section at an upstream side of the second control valve is not larger than the pressure of the air at a downstream side of the second control valve by the first pressure or more". Further, the second control valve may be configured in such a manner that: the valving element is moved to "a second position different from the first position" against the biasing force generated by the biasing means so as to "open the second passage section to allow an air to pass through the second passage section", when "the pressure of the air in the second passage section at an upstream side of the second control valve is larger than the pressure of the air at a downstream side of the second control valve by the first pressure or more".

In the second control valve which is configured as above, the first pressure can be changed by changing a magnitude of the biasing force of the biasing means. Hereinafter, control valve which has the configuration as described above will be referred to as "an automatically-open-and-close-valve" for convenience.

BRIEF DESCRIPTION OF THE DRAWINGS

FIG. 3 is a schematic figure showing a relation among an engine rotation speed, a fuel injection amount, and a turbo mode, which is adopted by the control apparatus according to the first embodiment of the present invention;

BEST MODE FOR CARRYING OUT THE INVENTION

Next will be described embodiments of an apparatus for determining an abnormality of a control valve according to the present invention with reference to the drawings.
(A First Embodiment)
<An Outline of Apparatus>

Figure 1:
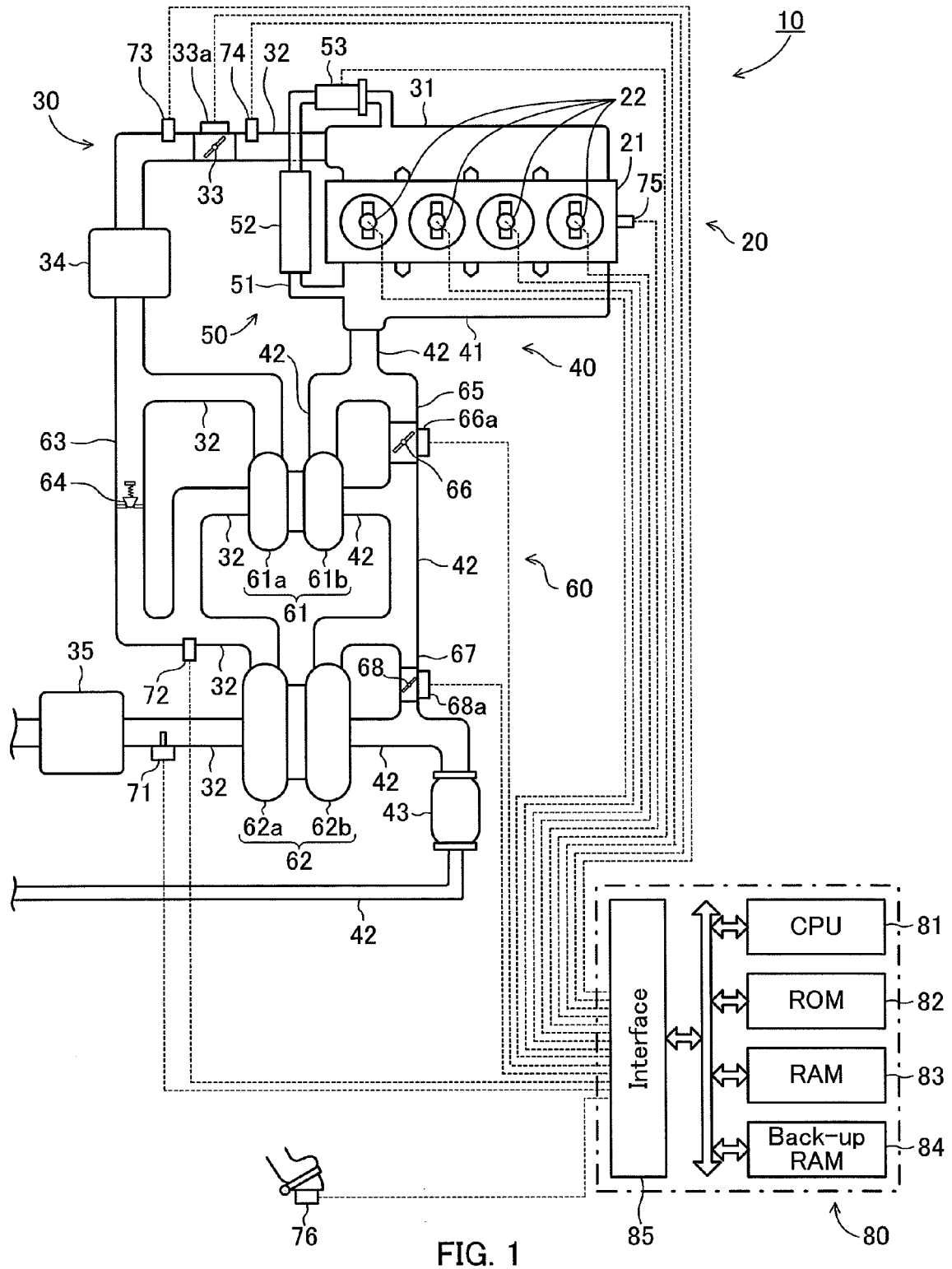
FIG. 1 is a schematic diagram of an internal combustion engine to which a control apparatus of a first embodiment of the present invention is applied.
Figure 2:
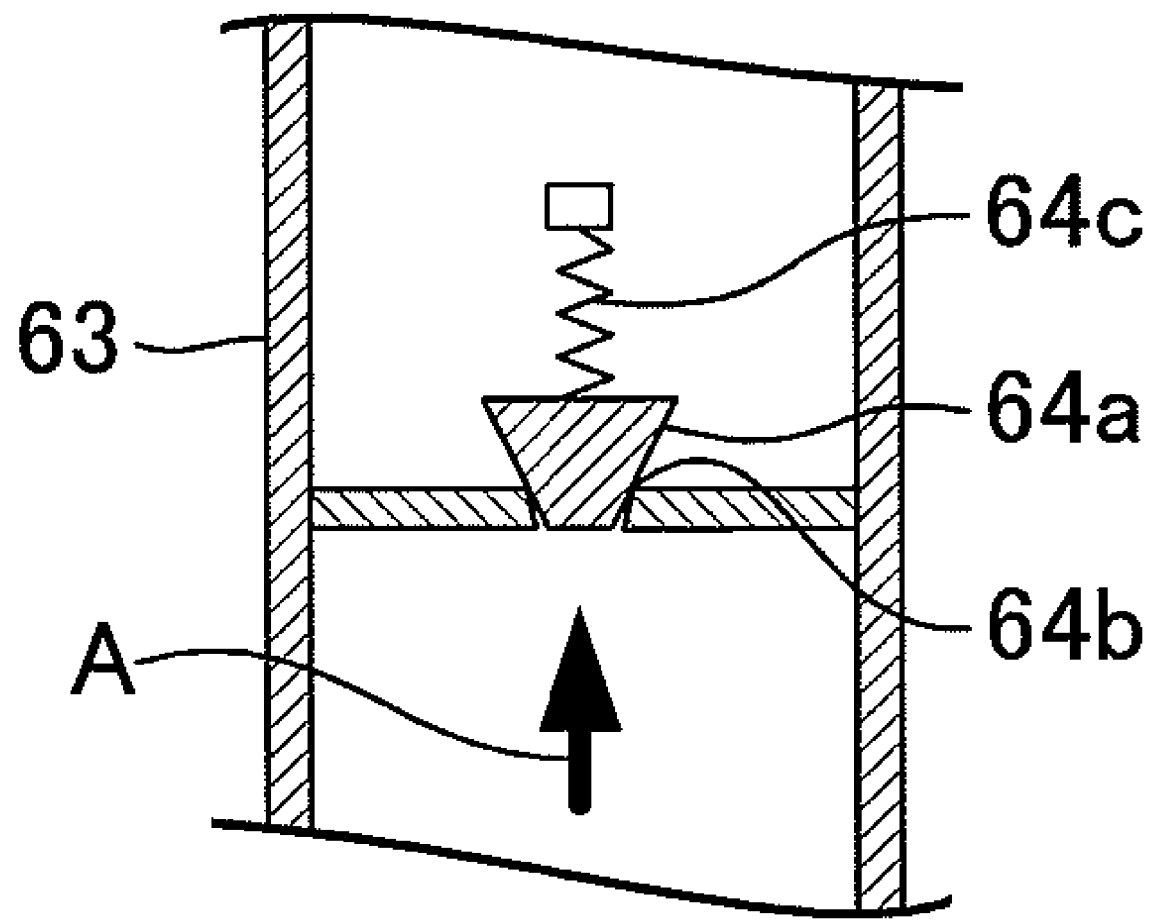
FIG. 2 is a schematic figure of an intake air changeover valve which is applied to the internal combustion engine shown in FIG. 1.

FIG. 1 shows a schematic configuration of a system including an internal combustion engine 10 to which an apparatus for determining an abnormality of a control valve according to a first embodiment of the present invention (hereinafter, this apparatus will be referred to as "a first apparatus") is applied. The engine 10 is a four cylinder diesel engine.

The engine 10 comprises: an engine main body 20 including a fuel supply system, an intake system 30 for introducing an air into the engine main body 20; an exhaust system 40 for emitting an exhaust gas from the engine main body 20 to the outside; an EGR apparatus 50 for recirculating the exhaust gas to a side of the intake system 30; and supercharging apparatus 60 for compressing an air introduced into the engine main body 20 by being driven by an energy of the exhaust gas.

The engine main body 20 comprises a cylinder head 21 with which the intake system 30 and the exhaust system 40 are connected. The cylinder head 21 comprises a plurality of fuel injection devices 22, each of which is disposed at an upper portion of a corresponding cylinder. Each of the fuel injection devices 22 is communicated with a fuel tank (not shown) so as to inject a fuel directly into a combustion chamber of each of the cylinders in response to an instruction signal from an electrical control apparatus 80.

The intake system 30 includes: an intake manifold 31 communicated with each of the cylinders through intake ports (not shown) provided in the cylinder head 21; an intake pipe 32 connected to an upstream merged portion of the intake manifold 31; a throttle valve 33, in the intake pipe 32, for varying a cross-sectional opening area of an intake air passage; a throttle valve actuator 33*a* for rotatably driving the throttle valve 33 in response to an instruction signal from the electrical control apparatus 80; an intercooler 34 disposed in the intake pipe 32 at an upstream side of the throttle valve 33; and an air cleaner 35 disposed at an end potion of the intake pipe 32 which is an upstream side of the supercharging apparatus 60 disposed at an upstream side of the intercooler 34. The intake manifold 31 and the intake pipe 32 constitute the intake air passage.

The exhaust system 40 comprises: an exhaust manifold 41 communicated with each of the cylinders through exhaust ports (not shown) provided in the cylinder head 21; an exhaust pipe 42 connected to a downstream merged portion of the exhaust manifold 41; and a well-known catalytic converter for purifying the exhaust gas (DPNR) 43 disposed in the exhaust pipe 42 at a downstream side of the supercharging apparatus 60 disposed in the exhaust pipe 42. The exhaust manifold 41 and the exhaust pipe 42 constitute an exhaust gas passage.

The EGR apparatus 50 comprises: an exhaust gas recirculation pipe 51 constituting a passage (an EGR passage) for recirculating the exhaust gas from the exhaust manifold 41 to the intake manifold 31; an EGR gas cooling apparatus (an EGR cooler) 52 disposed in the exhaust gas recirculation pipe 51; and an EGR control valve 53 disposed in the exhaust gas recirculation pipe 51. The EGR control valve 53 is configured so as to be able to vary an amount of the exhaust gas which is recirculated from the exhaust manifold 41 to the intake manifold 31 in response to an instruction signal from the electrical control apparatus 80.

The supercharging apparatus 60 comprises: a high pressure supercharger (turbocharger) 61 serving as a first supercharger; and a low pressure supercharger (turbocharger) 62 serving as a second supercharger. That is, the supercharging apparatus 60 comprises a plurality (two) of superchargers.

The high pressure supercharger 61 comprises a high pressure compressor 61*a* and a high pressure turbine 61*b*. The high pressure compressor 61*a* will be referred to as a first compressor. The high pressure compressor 61*a* is disposed in the intake air passage (intake pipe 32). The high pressure turbine 61*b* will be referred to as a first turbine. The high pressure turbine 61*b* is disposed in the exhaust gas passage (exhaust pipe 42). The high pressure compressor 61*a* and the high pressure turbine 61*b* are connected with each other coaxially rotatably through a rotor shaft (not shown). Accordingly, when the high pressure turbine 61*b* is driven by the exhaust gas, the high pressure compressor 61*a* rotates to compress an air introduced into the high pressure compressor 61*a* (i.e., supercharge the engine 10).

The low pressure supercharger 62 comprises a low pressure compressor 62*a* and a low pressure turbine 62*b*. The low pressure compressor 62*a* will be referred to as a second compressor. The low pressure compressor 62*a* is disposed in the intake air passage (intake pipe 32) at an upstream side of the high pressure compressor 61*a*. The low pressure turbine 62*b* is disposed in the exhaust gas passage (exhaust pipe 42) at a downstream side of the high pressure turbine 61*b*. The low pressure compressor 62*a* and the low pressure turbine 62*b* are connected with each other coaxially rotatably through a rotor shaft (not shown). Accordingly, when the low pressure turbine 62*b* is driven by the exhaust gas, the low pressure compressor 62*a* rotates to compress an air introduced into the low pressure compressor 62*a* (i.e., supercharge the engine 10). In this manner, the high pressure supercharger 61 and the low pressure supercharger 62 are connected in series with each other.

Further, a capacity of the low pressure supercharger 62 is larger than a capacity of the high pressure supercharger 61. Accordingly, a choked flow rate of the low pressure supercharger 62 is larger than a choked flow rate of the high pressure supercharger 61, and a surge flow rate of the low pressure supercharger 62 is larger than a surge flow rate of the high pressure supercharger 61. In other words, a minimum magnitude of energy required for supercharging the engine by the high pressure supercharger 61 is smaller than a minimum magnitude of energy required for supercharging the engine by the low pressure supercharger 62.

Consequently, the high pressure supercharger 61 and the low pressure supercharger 62 can supercharge the engine mainly by the high pressure supercharger 61 in a low load operating area, and supercharge the engine mainly by the low pressure supercharger 62 in a high load operating area. Accordingly, a new air is appropriately compressed (the engine is appropriately supercharged) in a wider operating (load) area by the high pressure supercharger 61 and the low pressure supercharger 62.

Further, the supercharging apparatus 60 comprises: a high-pressure-compressor-bypass-passage-section (bypass pipe) 63; an intake air changeover valve (ACV) 64; a high-pressure-turbine-bypass-passage-section (bypass pipe) 65; an exhaust gas changeover valve (ECV) 66; a low-pressure-turbine-bypass-passage (bypass pipe) 67; and an exhaust gas bypass valve (EBV) 68.

One end of the high-pressure-compressor-bypass-passage-section 63 is connected to the intake air passage (intake pipe 32) between the high pressure compressor 61*a* and the low pressure compressor 62*a*. The other end of the high-pressure-compressor-bypass-passage-section 63 is connected to the intake air passage (intake pipe 32) at a downstream side of the high pressure compressor 61*a*. That is, the high-pressure-compressor-bypass-passage-section 63 constitutes a passage which bypasses the high pressure compressor 61*a*. The high-pressure-compressor-bypass-passage-section 63 will be referred to as "a second passage section", for convenience.

The intake air changeover valve 64 is an automatically-open-and-close-valve disposed in the high-pressure-compressor-bypass-passage-section 63. The intake air changeover valve 64 comprises: a valving element 64*a*; a valve seat portion 64*b* against which the valving element 64*a* rests, and biasing means (spring) 64*c* for biasing the valving element 64*a* toward the valve seat portion 64*b*. The intake air changeover valve 64 is configured in such a manner that the valving element 64*a* is moved to "a first position at which the valving element 64*a* rests against the valve seat portion 64*b*" by a biasing force generated by the biasing means (spring) 64*c* so as to "close the second passage section", when "a pressure of an air in the high-pressure-compressor-bypass-passage-section 63 at an upstream side of the intake air changeover valve 64 is not larger than a pressure of an air in the high-pressure-compressor-bypass-passage-section 63 at a downstream side of the intake air changeover valve 64 by a predetermined pressure (the first pressure) or more".

Further, the intake air changeover valve 64 is configured in such a manner that the valving element 64a is moved to a "second position different from the first position" against the biasing force generated by the biasing means (spring) 64c so as to "open the high-pressure-compressor-bypass-passage-section 63 to allow an air to pass through the high-pressure-compressor-bypass-passage-section 63", when the pressure of an air in the high-pressure-compressor-bypass-passage-section 63 at an upstream side of the intake air changeover valve 64 is larger than the pressure of an air in the high-pressure-compressor-bypass-passage-section 63 at a downstream side of the intake air changeover valve 64 by the predetermined pressure described above or more. That is, the intake air changeover valve 64 is a valve which is operated independently from an instruction signal generated by the electric control apparatus 80. The intake air changeover valve 64 will be referred to as "a second control valve", for convenience.

Referring to FIG. 1 again, one end of the high-pressure-turbine-bypass-passage-section 65 is connected to the exhaust gas passage (exhaust pipe 42) at an upstream side of the high pressure turbine 61b. The other end of the high-pressure-turbine-bypass-passage-section 65 is connected to the exhaust gas passage (exhaust pipe 42) between the high pressure turbine 61b and the low pressure turbine 62b. That is, the high-pressure-turbine-bypass-passage-section 65 constitutes a passage which bypasses the high pressure turbine 61b. The high-pressure-turbine-bypass-passage-section 65 will be referred to as "a first passage section", for convenience.

The exhaust gas changeover valve 66 is a butterfly valve disposed in the high-pressure-turbine-bypass-passage-section 65. The exhaust gas changeover valve 66 is configured in such a manner that an opening degree (operating amount) of the valve 66 is varied by an exhaust gas changeover valve actuator 66a which is driven in response to an instruction from the electric control apparatus 80. The exhaust gas changeover valve 66 changes a flow passage area of the high-pressure-turbine-bypass-passage-section 65 in accordance with a change in the opening degree to thereby change a ratio between an amount of the gas introduced into the high pressure turbine 61b and an amount of the gas passing through the high-pressure-turbine-bypass-passage-section 65. The exhaust gas changeover valve 66 will be referred to as "a first control valve", for convenience.

One end of the low-pressure-turbine-bypass-passage-section 67 is connected to the exhaust gas passage (exhaust pipe 42) at an upstream side of the low pressure turbine 62b. The other end of the low-pressure-turbine-bypass-passage-section 67 is connected to the exhaust gas passage (exhaust pipe 42) at a downstream side of the low pressure turbine 62b. That is, the low-pressure-turbine-bypass-passage-section 67 constitutes a passage which bypasses the low pressure turbine 62b. The low-pressure-turbine-bypass-passage-section 67 will be referred to as "a third passage section", for convenience.

The exhaust gas bypass valve 68 is a butterfly valve disposed in the low-pressure-turbine-bypass-passage-section 67. The exhaust gas bypass valve 68 is configured in such a manner that an opening degree (operating amount) of the valve 68 is varied by an exhaust gas bypass valve actuator 68a which is driven in response to an instruction from the electric control apparatus 80. The exhaust gas bypass valve 68 changes a flow passage area of the low-pressure-turbine-bypass-passage-section 67 in accordance with a change in the opening degree to thereby change a ratio between an amount of the gas introduced into the low pressure turbine 62b and an amount of the gas passing through the low-pressure-turbine-bypass-passage-section 67. The exhaust gas bypass valve 68 will be referred to as "a third control valve", for convenience.

Further, the first apparatus comprises: a hot wire airflow meter 71; a between-compressors-pressure sensor 72; an intake air temperature sensor 73; a supercharging pressure sensor 74; a crank position sensor 75; and an accelerator opening degree sensor 76.

The airflow meter 71 is configured so as to output a signal indicative of a mass flow rate Ga of the intake air flowing in the intake pipe 32 (the mass flow rate Ga being an amount of an air introduced into the engine 10 per unit time and referred simply to as "a flow rate").

The between-compressors-pressure sensor 72 is configured so as to output a signal indicative of a pressure (between-compressors-pressure) in the intake pipe 32 between the high pressure compressor 61a and the low pressure compressor 62a. It should be noted that the between-compressors-pressure sensor 72 may be disposed in the high-pressure-compressor-bypass-passage-section 63 at the upstream side of the intake air changeover valve 64.

The intake air temperature sensor 73 is configured so as to output a signal indicative of a temperature of the air flowing in the intake pipe 32.

The supercharging pressure sensor 74 is disposed in the intake pipe 32 at a downstream side of the throttle valve 33. The supercharging pressure sensor 74 is configured so as to output a signal indicative of a pressure Pim of an air in the intake pipe 32 at a position at which the supercharging pressure sensor 74 is disposed. That is, the supercharging pressure sensor 74 outputs a signal indicative of the pressure (supercharging pressure) Pim of the air introduced into combustion chambers of the engine 10.

The crank position sensor 75 is configured so as to output a signal which includes a narrow pulse generated every time a crank shaft (not shown) rotates 10° and a wide pulse generated every time the crank shaft rotates 360°.

The accelerator opening degree sensor 76 is configured so as to output a signal indicative of an opening degree Accp of an accelerator pedal AP operated by a driver.

The electric control apparatus 80 is a microcomputer, which includes the following mutually bus-connected elements: a CPU 81; a ROM 82; a RAM 83; a backup RAM 84 which stores data while power is held on and which retains the stored data even while power is held off; and an interface 85 including an AD converter.

The interface 85 is connected to the sensors etc., so as to send signals from each of the sensors to the CPU 81. Further, in accordance with instructions from the CPU 81, the interface 85 sends drive signals (instruction signals) to the fuel injection devices 22, and each of the actuators (the throttle valve actuator 33a, the exhaust gas changeover valve actuator 66a, and the exhaust gas bypass valve actuator 68a), and the like.

<An Outline of Operations the Apparatus>

Next will be described the outline of operations of the first apparatus.

The first apparatus determines "a turbo mode" which represents an operating state of the supercharging apparatus 60 (the high pressure supercharger 61 and the low pressure supercharger 62) depending on an operating condition/state of the engine 10. Further, the first apparatus checks whether or not the new air is appropriately compressed when the supercharging apparatus 60 is operated in a predetermined turbo mode by comparing a supercharging pressure with a predetermined referential supercharging pressure.

Subsequently, the first apparatus determines whether or not the exhaust gas changeover valve (the first control value) 66 and the intake air changeover valve (the second control valve) 64 operate normally by comparing the first-compressor-downstream-side-pressure with the between-compressors-pressure, when the new air is not compressed normally (i.e., the supercharging-pressure-abnormal-state described above occurs). Further, the first apparatus determines whether or not the exhaust gas bypass valve (the third control valve) 68 works normally by comparing the between-compressors-pressure with a predetermined pressure.

Further, the first apparatus notifies the operators of the engine 10 of a result of the determination described above and performs "an emergency operation" in which a load given to the members of the engine 10 is low, in a case where any of the control valves is abnormal. On the other hand, the first apparatus does not notify the operator the result and performs "a normal operation", in a case where all control valves are normal. These are the outlines of the operations of the first apparatus.

<How to Determine the Turbo Mode>

Next will be described the turbo mode which the first apparatus adopts and the way to determine the turbo mode, before actual operations of the present invention are described.

As described above, an amount of energy of the exhaust gas which allows the high pressure supercharger 61 to operate (to supercharge the engine) is smaller than an amount of energy of the exhaust gas which allows the low pressure supercharger 62 to operate (to supercharge the engine). The first apparatus therefore controls the exhaust gas changeover valve 66 in such a manner that the exhaust gas is preferentially supplied to the high pressure supercharger 61, when the energy of the exhaust gas is small (i.e., when the load of the engine is small and the flow rate Ga is small). To the contrary, the first apparatus controls the exhaust gas changeover valve 66 in such a manner that the exhaust gas is preferentially supplied to the low pressure supercharger 62, when the energy of the exhaust gas is large (i.e., when the load of the engine is large and the flow rate Ga is large). Further, the first apparatus controls the exhaust gas bypass valve 68 so as to adjust the magnitude of the energy of the exhaust gas supplied to the low pressure supercharger 62.

That is, the first apparatus controls the exhaust gas changeover valve 66 and the exhaust gas bypass valve 68 in such a manner that the appropriate amount of the exhaust gas is supplied to the high pressure supercharger 61 and the low pressure supercharger 62 in accordance with the operating condition of the engine 10. It should be noted that the intake air changeover valve 64 operates dependent on the pressure of the air at an upstream side of the intake air changeover valve 64 and the pressure of the air at an upstream side of the intake air changeover valve 64, and independent from the control of the first apparatus, as described above.

In order to perform such a control, the first apparatus divides operating conditions of the engine 10 into four areas (operating areas), and determines operating states of the intake air changeover valve 64, the exhaust gas changeover valve 66, and the exhaust gas bypass valve 68 (hereinafter, these valves will be referred to as "each control valve"), the operating states being suitable for each of the four operating areas. "The operating state of each control valve" is determined based on a turbo mode.

The turbo mode is determined as follows.

As shown in FIG. 3(A), the first apparatus stores, in the ROM 82, "a turbo mode table MapTurbo (NE, Q) which defines a relation among an engine rotational speed NE, a fuel injection amount Q, a the turbo mode in advance". Each of the figures "1" to "4" shown in FIG. 3(A) indicates a turbo mode number. "HP+LP" shown in FIG. 3(A) indicates that both of the high pressure supercharger 61 and the low pressure supercharger 62 are operated, and "LP" indicates that the low pressure supercharger 62 is preferentially operated.

FIG. 3(B) shows an operating state of each control valve in the each turbo mode. In FIG. 3(B), the "fully close" indicates that an opening degree of the control valve is set at an opening degree to shut down (completely close) a passage in which the control valve is disposed, so that the passage is in a condition where the air or the exhaust gas can not pass through the passage. On the other hand, the "fully open" indicates that the opening degree of the control valve is set at an opening degree to completely/fully open (to its maximum) the passage in which the control valve is disposed, so that the passage is in a condition where the air or the exhaust gas can pass through the passage without being substantially affected by the control valve. The "open" indicates that the opening degree of the control valve is set at an opening degree between "the fully close" and "the fully open", so that the passage is in a condition where an amount of the air or an amount of the exhaust gas passing through the passage in which the control valve is disposed can be varied depending on the opening degree of the control valve.

It should be noted that, in FIG. 3(B), "ECV" is an abbreviated name of the exhaust gas changeover valve (the first control valve) 66, "ACV" is an abbreviated name of the intake air changeover valve (the second control valve) 64, and "EBV" is an abbreviated name of the exhaust gas bypass valve (the third control valve) 68.

The first apparatus applies an actual engine rotational speed NE and an actual fuel injection amount Q to the turbo mode table MapTurbo (NE, Q) to thereby determine the turbo mode (the operation state of the each control valve). Thereafter, the first apparatus controls the each control valve in accordance with the determined turbo mode.

<An Abnormality determination for the Control Valve>

Next will be described methods to determine an abnormality of the control valve in the first apparatus.

The first apparatus performs the determination of an abnormality of the control valve when the engine is driven in the turbo mode 1 or the turbo mode 2.

The first apparatus firstly determines whether or not the supercharging pressure Pim coincides with a predetermined referential supercharging pressure when the engine is driven in the turbo mode 1 or the turbo mode 2. In the first apparatus, the referential supercharging pressure is set at a target supercharging pressure Pimtgt, which is determined in accordance with the operating condition. As a result of the determination, the first apparatus determines that at least one of the control valves is abnormal and further determines which of the control valves is abnormal based on the abnormality-determining-method described below, in a case where the supercharging pressure Pim does not coincide with the target supercharging pressure Pimtgt (specifically, in a case where the supercharging pressure Pim is smaller than the target supercharging pressure Pimtgt by a predetermined value (the second pressure) or more, which is, in other words, a case where the supercharging-pressure-abnormal-state occurs.).

As described above, the each control valve is operated in such a manner that "both" of the high pressure supercharger 61 and the low pressure supercharger 62 are operated in the turbo mode 1 and the turbo mode 2, as shown in FIG. 3(A). FIG. 3(C) shows a relation between the turbo mode and the new air amount (mass flow rate) Ga. In FIG. 3(C), "a relation among the new air amount Ga, a first operating area AR1, and a second operating area AR2", the area AR1 and the area AR2 being determined based on the new air amount Ga, with the turbo mode table MapTurbo(NE, Q) shown in FIG. 3(A).

As shown in FIG. 3(C), the low pressure supercharger 62 can not be operated in a predetermined low load operating area (specifically, an area in which the new air amount Ga is smaller than or equal to a first threshold new air amount A, i.e., the first operating area) AR1 among the operating area in which the turbo mode 1 is chosen, since the mass flow rate Ga of the air introduced into the engine 10 is small. That is, "only the high pressure supercharger 61" is operated in the first operating area. To the contrary, "both of the high pressure supercharger 61 and the low pressure supercharger 62" are operated in an operating area which is obtained by combining: an operating area other than the first operating area among the operating area in which the turbo mode 1 is chosen; and an operating area in which the turbo mode 2 is chosen (specifically, an area in which the new air amount Ga is an amount from the first threshold new air amount A to a second threshold new air amount B (B>A), i.e., the second operating area) AR2. In FIG. 3(C), it should be noted that a boundary line marking the upper limit of the second operating area (i.e., a boundary line on which the amount Ga coincides with the amount B) coincides with a boundary line between the turbo mode 1 and the turbo mode 2.

<An Abnormality Determination Method 1>

As described above, the high pressure supercharger (the first supercharger) 61 can only supercharge the engine 10, but the low pressure supercharger (the second supercharger) 62 can not supercharge the engine 10, when the engine 10 is operated in "the first operating area AR1". Accordingly, the condition of the exhaust gas bypass valve 68 does not affect the supercharging pressure. Consequently, it can be determined that at least one of the intake air changeover valve 64 and the exhaust gas changeover valve 66 is abnormal, if the supercharging-pressure-abnormal-state occurs when the engine 10 is operated in "the first operating area AR1".

The first apparatus determines whether or not the high pressure compressor 61a compresses a new air, if the supercharging-pressure-abnormal-state occurs when the engine 10 is operated in "the first operating area AR1". In a case where it is determined that the high pressure compressor 61a compresses the new air as a result of the determination, the first apparatus determines that "the exhaust gas changeover valve 66 is abnormal and the intake air changeover valve 64 is normal". To the contrary, in a case where it is determined that the high pressure compressor 61a does not compress the new air as a result of the determination, the first apparatus determines that "either one of the exhaust gas changeover valve 66 and the intake air changeover valve 64 is abnormal". Hereinafter, the determination method described above will be referred to as "an abnormality determination method 1".

It should be noted that there is a possibility that the exhaust gas bypass valve 68 is also abnormal if the supercharging-pressure-abnormal-state occurs when the engine 10 is operated in "the first operating area AR1". However, it is rare that two or more control valves become abnormal at the same time, as described above. Accordingly, the first apparatus infers, in accordance with the multiple-abnormality-exclusive-assumption, that the exhaust gas bypass valve 68 is normal in a case where the first apparatus determines that at least one of the intake air changeover valve 64 and the exhaust gas changeover valve 66 is abnormal.

<An Abnormality Determination Method 2>

On the other hand, if the supercharging-pressure-abnormal-state occurs when the engine 10 is operated in "the second operating area AR2", the first apparatus firstly determines whether or not the low pressure compressor 62a compresses a new air appropriately. In a case where it is determined that the low pressure compressor 62a compresses the new air as a result of the determination, the first apparatus determines that "the exhaust gas bypass valve 68 is normal". To the contrary, in a case where it is determined that the low pressure compressor 62a does not compress the new air as a result of the determination, the first apparatus determines that "the exhaust gas bypass valve 68 is abnormal".

Further, in the case where it is determined that "the exhaust gas bypass valve 68 is normal", the first apparatus performs an abnormality determination of the exhaust gas changeover valve 66 and the intake air changeover valve 64 by "the abnormality determination method 1". To the contrary, in the case where it is determined that "the exhaust gas bypass valve 68 is abnormal", the first apparatus infers that "the exhaust gas changeover valve 66 and the intake air changeover valve 64 are normal", in accordance with the multiple-abnormality-exclusive-assumption. Hereinafter, the determination method described above will be referred to as "an abnormality determination method 2".

Next will be described reasons why an abnormality of the control valves can be determined by "the abnormality determination method 1 and the abnormality determination method 2" in the following order.

<The Description Order>

(Case 1-1) All of the intake air changeover valve 64, the exhaust gas changeover valve 66, and the exhaust gas bypass valve 68 are normal.

(Case 1-2) The intake air changeover valve 64 is abnormal, but the exhaust gas changeover valve 66 and the exhaust gas bypass valve 68 are normal.

(Case 1-3) The exhaust gas changeover valve 66 is abnormal, but the intake air changeover valve 64 and the exhaust gas bypass valve 68 are normal.

(Case 1-4) The exhaust gas bypass valve 68 is abnormal, but the intake air changeover valve 64 and the exhaust gas changeover valve 66 are normal.

<Description>

(Case 1-1) The case where all of the intake air changeover valve 64, the exhaust gas changeover valve 66, and the exhaust gas bypass valve 68 are normal.

A case where the engine 10 is operated in "the first operating area AR1" is firstly described. The intake air changeover valve 64, the exhaust gas changeover valve 66 and the exhaust gas bypass valve 68 are controlled to be in "the fully close" state, when the engine 10 is operated in the first operating area AR1 (i.e., the low load operating area in the turbo mode 1), as shown in FIG. 3(B).

Figure 4:
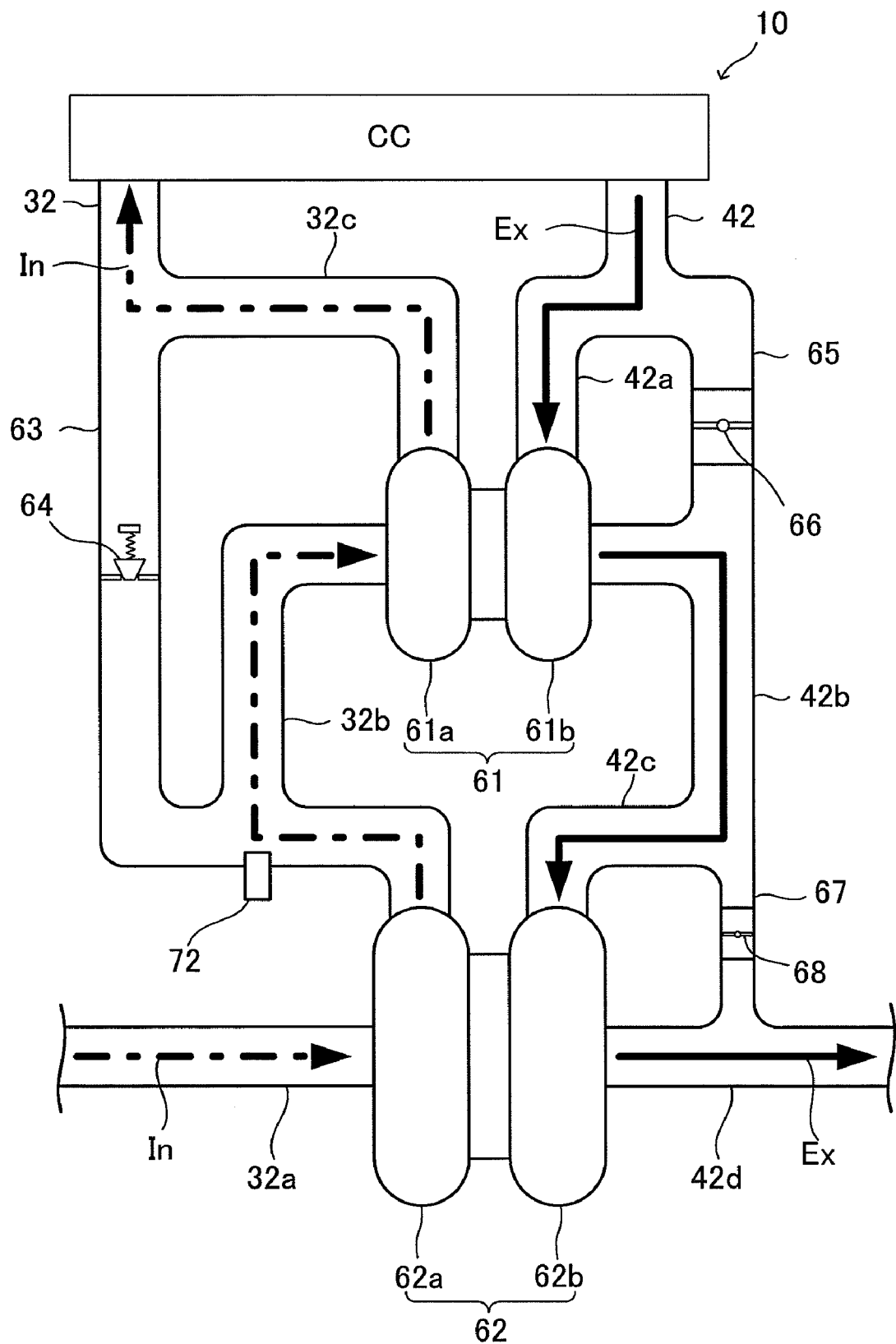
FIG. 4 is a schematic diagram showing a first example of an intake air passage and an exhaust gas passage of the internal combustion engine to which a control apparatus according to the first embodiment of the present invention is applied.

Accordingly, as shown in FIG. 4, the new air In introduced into an intake air passage 32a (a portion of the intake air passage 32) is introduced into the combustion chamber CC through the low pressure compressor 62a, an intake air passage 32b (a portion of the intake air passage 32) between the high pressure compressor 61a and the low pressure compressor 62a, the high pressure compressor 61a, and an intake air passage 32c (a portion of the intake air passage 32).

Further, an exhaust gas Ex discharged from the combustion chamber CC is emitted to the outside of the engine 10 through an exhaust gas passage 42a (a portion of the exhaust gas passage 42), the high pressure turbine 61b, an exhaust gas passage 42b (a portion of the exhaust gas passage 42) between the high pressure turbine 61b and the low pressure turbine 62b, an exhaust gas passage 42c (a portion of the exhaust gas passage 42), the low pressure turbine 62b, and an exhaust gas passage 42d (a portion of the exhaust gas passage 42).

As a result, the high pressure compressor 61a compresses "the new air In introduced into the high pressure compressor 61a". To the contrary, the low pressure compressor 62a is not driven even if the exhaust gas Ex is introduced into the low pressure turbine 62b in the first operating area AR1. Accordingly, only the high pressure compressor 61a compresses the new air In, in a case that all control valves are normal when the engine 10 is operated in the first operating area AR1. Consequently, the supercharging pressure Pim substantially coincides with the target supercharging pressure Pimtgt. That is, the supercharging-pressure-abnormal-state does not occur.

Next will be described a case where the engine 10 is operated in "the second operating area AR2". The intake air changeover valve 64 and the exhaust gas bypass valve 68 are controlled to be in "the fully close" state and the exhaust gas changeover valve 66 is controlled to be in "the fully open" state or "the open" state, when the engine 10 is operated in the second operating area AR2 as shown in FIG. 3(B), and thereby both of the high pressure compressor 61a and the low pressure compressor 62a compress the new air In.

It should be noted that the first apparatus performs a feedback control of an opening degree of the exhaust gas changeover valve 66 in such a manner that the supercharging pressure Pim obtained by the supercharging pressure sensor 74 coincides with the target supercharging pressure Pimtgt determined based on the operating condition of the engine 10. Thereby, the supercharging pressure Pim substantially coincides with the target supercharging pressure Pimtgt. That is, the supercharging-pressure-abnormal-state does not occur.

(Case 1-2) The case where the intake air changeover valve 64 is abnormal but the exhaust gas changeover valve 66 and the exhaust gas bypass valve 68 are normal.

The intake air changeover valve 64 must be in "the fully close" state in a case that the engine 10 is operated in the first operating area AR1 or the second operating area AR2. Accordingly, the intake air changeover valve 64 is in a state in which the intake air changeover valve 64 opens, if the intake air changeover valve 64 is abnormal when the engine 10 is operated in these operating areas. Hereinafter, this abnormal state will be referred to as "an intake air changeover valve abnormal open state".

Figure 5:
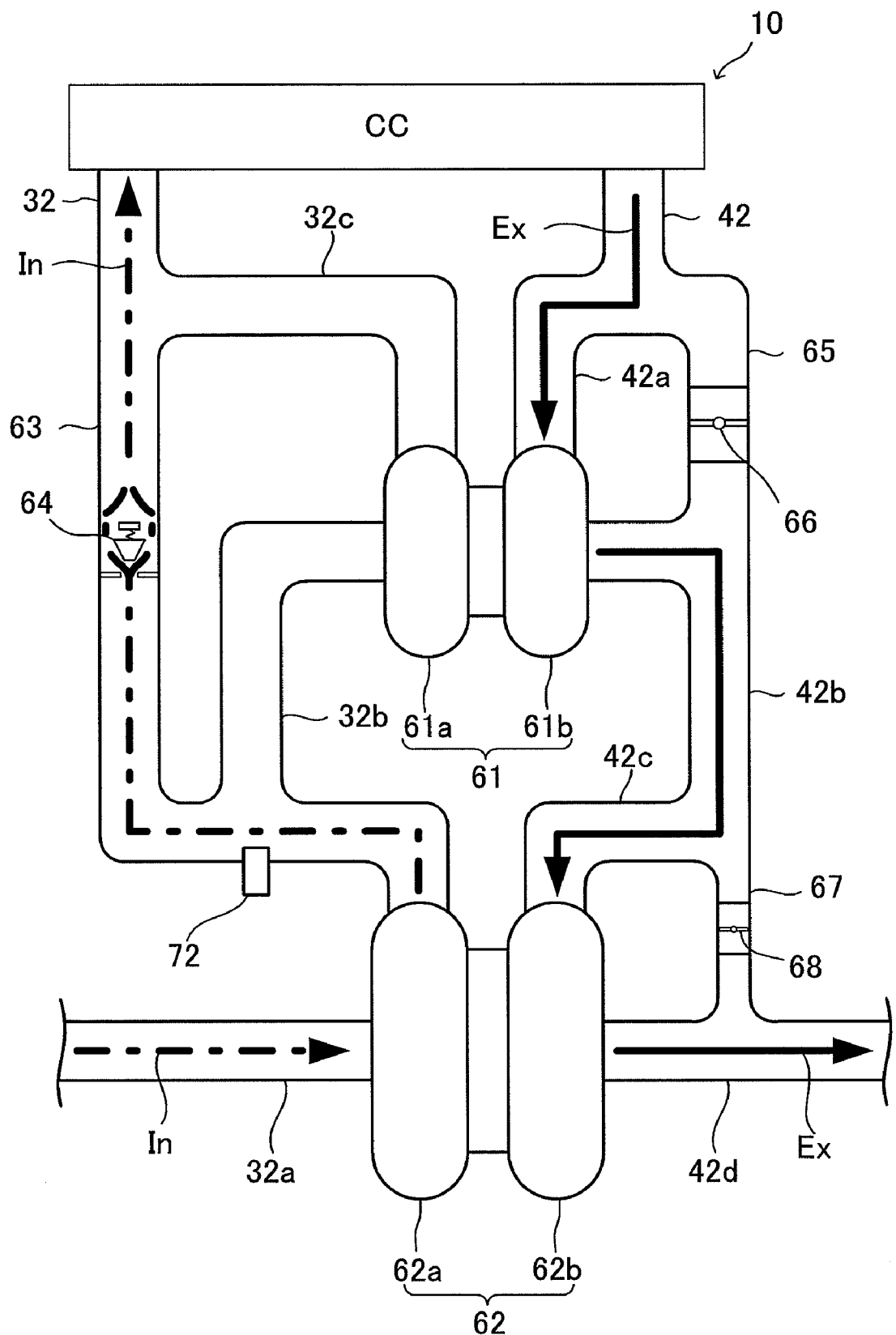
FIG. 5 is a schematic diagram showing a second example of an intake air passage and an exhaust gas passage of the internal combustion engine to which a control apparatus according to the first embodiment of the present invention is applied.

In this case, an exhaust gas Ex discharged from the combustion chamber CC is emitted to the outside of the engine 10 through the high pressure turbine 61b and the low pressure turbine 62b in the same way as in "the Case 1-1", as shown in FIG. 5.

Accordingly, only the high pressure compressor 61a is driven so as to compress the new air In when the engine 10 is operated in "the first operating area AR1". To the contrary, both of the high pressure compressor 61a and the low pressure compressor 62a are driven so as to compress the new air In when the engine 10 is operated in "the second operating area AR2".

However, the intake air changeover valve 64 is in "the intake air changeover valve abnormal open state" in this Case 1-2. Therefore, the new air In passed through the low pressure compressor 62a does not head to the high pressure compressor 61a but is introduced into the combustion chamber CC of the engine 10 through the high-pressure-compressor-bypass-passage-section 63, when the engine 10 is operated in any of "the first operating area AR1" and "the second operating area AR2". Accordingly, the high pressure compressor 61a can not compress the new air In even if the high pressure compressor 61a is driven as described above.

As a result, the between-compressors-pressure Pc substantially coincides with a pressure of the new air In after passing through the high pressure compressor 61a. Further, the high pressure supercharger 61 which is expected to supercharge the engine 10 can not supercharge the engine 10 in this case, and therefore the supercharging pressure Pim becomes smaller than the target supercharging pressure Pimtgt. That is, the supercharging-pressure-abnormal-state occurs.

As is apparent from the description above, it can be determined that "the intake air changeover valve 64, which must be closed if the intake air changeover valve 64 is normal", opens, in a case that the supercharging-pressure-abnormal-state occurs when the engine 10 is operated at least in "the first operating area AR1" and the high pressure compressor 61a does not compress the new air. It should be noted that the case that "the intake air changeover valve 64, which must be closed if the intake air changeover valve 64 is normal", opens, includes the following two cases: one is a case where the intake air changeover valve 64 opens due to an abnormality of the intake air changeover valve 64 itself (the intake air changeover valve abnormal open state); and the other is a case where the intake air changeover valve 64 opens due to an abnormality of the exhaust gas changeover valve 66, the other case being described below.

(Case 1-3) The case where the exhaust gas changeover valve 66 is abnormal but the intake air changeover valve 64 and the exhaust gas bypass valve 68 are normal.

The exhaust gas changeover valve 66 is controlled so as to be in "the fully close" state in the case that the engine 10 is operated in "the first operating area AR1". Accordingly, the exhaust gas changeover valve 66 is in a state in which the exhaust gas changeover valve 66 opens (that is, the opening degree of the exhaust gas changeover valve 66 is larger than the opening degree in the fully close state), if the exhaust gas changeover valve 66 is abnormal when the engine 10 is operated in "the first operating area AR1".

Figure 6:
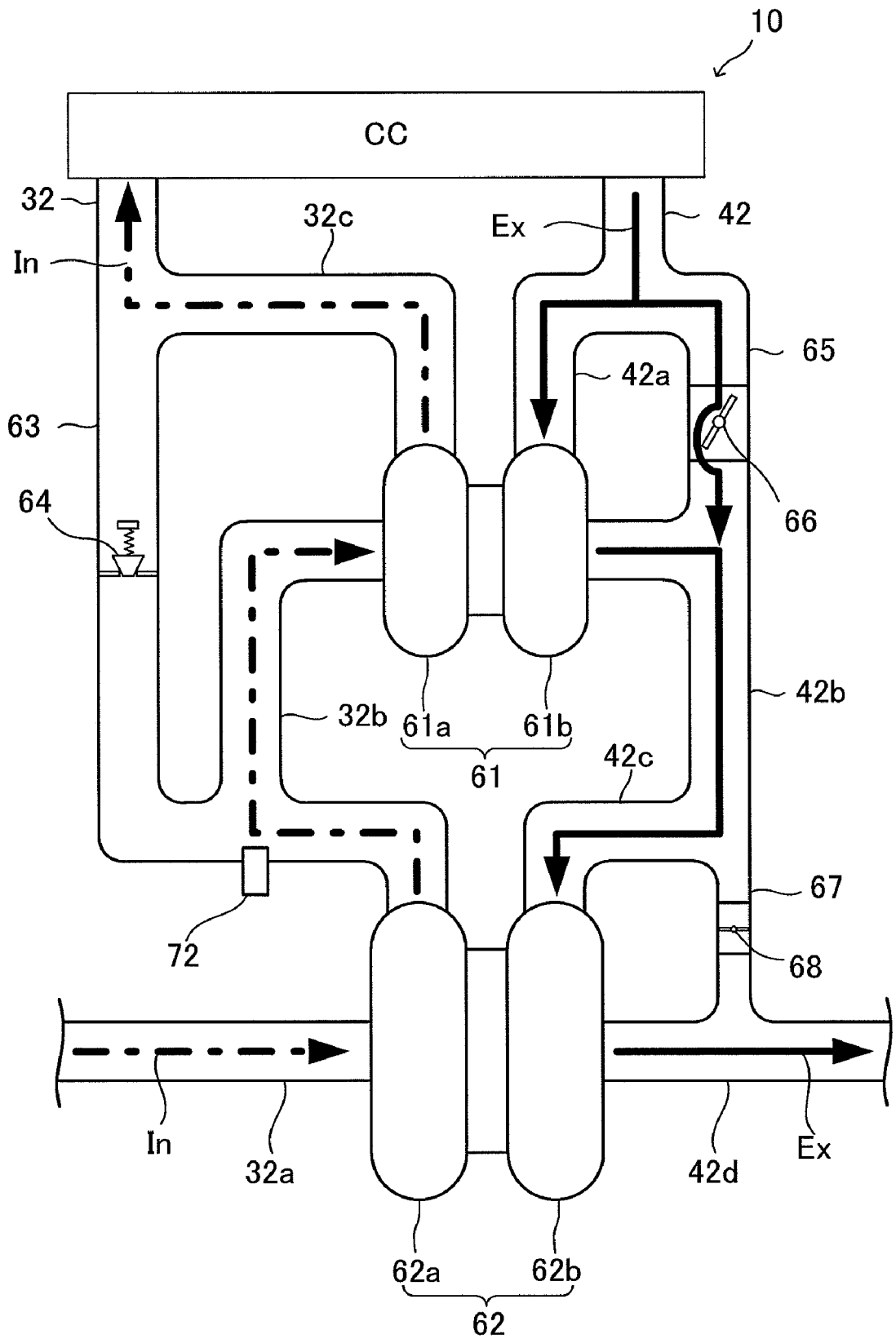
FIG. 6 is a schematic diagram showing a third example of an intake air passage and an exhaust gas passage of the internal combustion engine to which a control apparatus according to the first embodiment of the present invention is applied.

In this case, as shown in FIG. 6, "one part of the exhaust gas Ex" is introduced into the low pressure compressor 62a after the one part of the exhaust gas Ex has passed through the high pressure compressor 61a, and "the other part of the exhaust gas Ex" is directly introduced into the low pressure compressor 62a through the high-pressure-turbine-bypass-passage-section 65. Accordingly, the energy of the exhaust gas introduced into the high pressure turbine 61b decreases by an amount of the energy of the exhaust gas which is directly introduced into the low pressure turbine 62b, in comparison with "the Case 1-1".

In this case, the high pressure compressor 61a can compress the new air In, if the energy of the exhaust gas introduced into the high pressure turbine 61b is larger than or equal to "the lower limit among the magnitude of energy by which the high pressure compressor 61a can be driven" (that is, if the opening degree of the exhaust gas changeover valve 66 is smaller than or equal to a predetermined threshold opening degree). Accordingly, the pressure of the new air In after passing through the high pressure compressor 61a is larger than the between-compressors-pressure Pc. It should be noted that the supercharging pressure Pim is smaller than the target supercharging pressure Pimtgt since the energy of the exhaust gas which is served to drive the high pressure compressor 61a decreases. That is, the supercharging-pressure-abnormal-state occurs. Hereinafter, the abnormality of the exhaust gas changeover valve 66 as described above will be referred to as "a small-opening-degree abnormal open state".

Accordingly, it can be determined that the exhaust gas changeover valve 66 is abnormal (i.e., the exhaust gas changeover valve 66 is in the small-opening-degree abnormal open state), if the supercharging-pressure-abnormal-state occurs and the high pressure compressor 61a compresses the new air In when the engine 10 is operated in "the first operating area AR1" (refer to the abnormality determination method 1).

To the contrary, the high pressure compressor 61a can not compress the new air In, if the energy of the exhaust gas introduced into the high pressure turbine 61b is smaller than "the lower limit among the magnitude of energy by which the high pressure compressor 61a can be driven" (that is, if the opening degree of the exhaust gas changeover valve 66 is larger than to the predetermined threshold opening degree). Accordingly, the pressure of the new air In after passing through the high pressure compressor 61a is smaller than the between-compressors-pressure Pc by "an amount of the pressure loss which is generated when the new air In passes through the high pressure compressor 61a". Hereinafter, the abnormality of the exhaust gas changeover valve 66 as described above will be referred to as "the large-opening-degree abnormal open state".

The valving element 64a is subjected to a force in such a direction that "the high-pressure-compressor-bypass-passage-section 63 is opened" when the large-opening-degree abnormal open state occurs (hereinafter, the force described above will be referred to as "a force caused by difference in pressure"). In the meantime, the biasing force which the valving element 64a is subjected to from the biasing means (spring) is set so as to be smaller than or equal to "the force caused by difference in pressure". Accordingly, the intake air changeover valve 64 also opens when the exhaust gas changeover valve 66 is in "the large-opening-degree abnormal open state".

Figure 7:
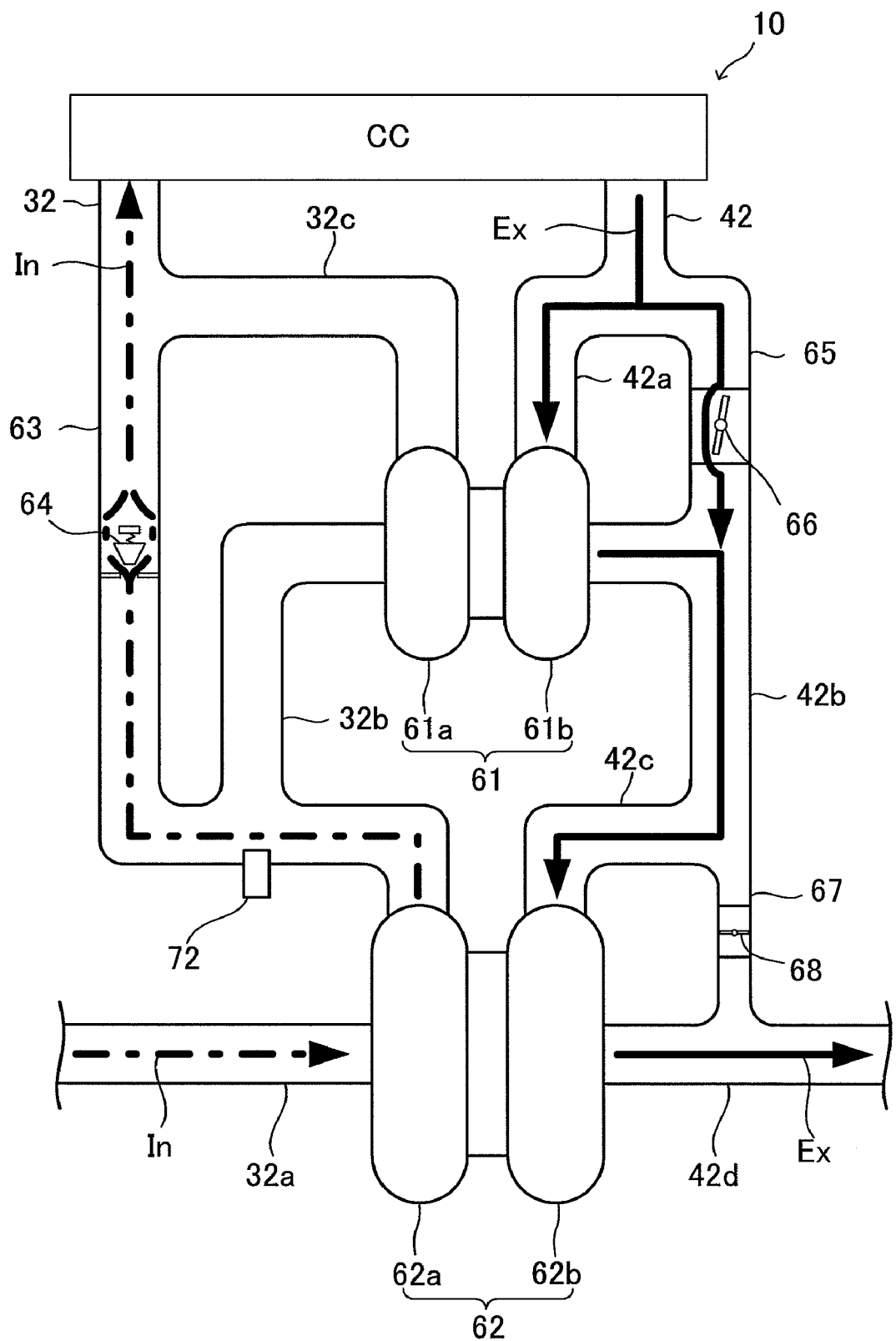
FIG. 7 is a schematic diagram showing a fourth example of an intake air passage and an exhaust gas passage of the internal combustion engine to which a control apparatus according to the first embodiment of the present invention is applied.

As a result, as shown in FIG. 7, the new air In is introduced into the combustion chamber CC via passages similar to ones in "the Case 1-2" described above. Accordingly, the between-compressors-pressure Pc substantially coincides with the pressure of the new air In after passing through the high pressure compressor 61a. Further, the high pressure supercharger 61 which is expected to supercharge the engine 10 can not supercharge the engine 10 in this case, and therefore the supercharging pressure Pim becomes smaller than the target supercharging pressure Pimtgt. That is, the supercharging-pressure-abnormal-state occurs.

As described above, the state where the supercharging-pressure-abnormal-state occurs and the high pressure compressor 61a does not compresses the new air In when the engine 10 is operated in "the first operating area AR1" occurs in the following two cases: one is the case where the intake air changeover valve 64 is in "the intake air changeover valve abnormal open state" as described in "the Case 1-2"; and the other is a case where the exhaust gas changeover valve 66 is in "the large-opening-degree abnormal open state".

Accordingly, it can be determined that "either one of the intake air changeover valve 64 and the exhaust gas changeover valve 66 is abnormal", if the supercharging-pressure-abnormal-state occurs and the high pressure compressor 61a does not compress the new air In when the engine 10 is operated in "the first operating area AR1".

The abnormality of the exhaust gas changeover valve 66 when the engine 10 is operated in "the first operating area AR1" is described above. In the meantime, as described above, the first apparatus performs the feedback control of the opening degree of the exhaust gas changeover valve 66 in such a manner that the supercharging pressure Pim coincides with the target supercharging pressure Pimtgt when the engine 10 is operated in "the second operating area AR2". The energy of the exhaust gas introduced into the high pressure turbine 61b decreases when the opening degree of the exhaust gas changeover valve 66 is larger than the opening degree which is determined by the feedback control as described above. Then, the phenomenon similar to the above (i.e., one of the small-opening-degree abnormal opening state and the large-opening-degree abnormal opening state) occurs depending on whether or not the opening degree of the exhaust gas changeover valve 66 is larger than or equal to the threshold opening degree.

That is, a relation between the between-compressors-pressure Pc and the pressure of the new air In after passing through the high pressure compressor 61a differs depending on which of "the small-opening-degree abnormal open state" and "the large-opening-degree abnormal open state" the exhaust gas changeover valve 66 is in, when the engine 10 is operated in "the second operating area AR2", in the same way as the engine 10 is operated in "the first operating area AR1". Further, the supercharging pressure Pim is smaller than the target supercharging pressure Pimtgt.

(Case 1-4) The case where the exhaust gas bypass valve 68 is abnormal but the intake air changeover valve 64 and the exhaust gas changeover valve 66 are normal.

As described above, the exhaust gas bypass valve 68 is controlled so as to be in "the fully close" state in a case that the engine 10 is operated in "the first operating area AR1" or "the second operating area AR2". Accordingly, the exhaust gas bypass valve 68 is in a state in which the exhaust gas bypass valve 68 opens (that is, the opening degree of the exhaust gas bypass valve 68 is larger than the opening degree in the fully close state), if the exhaust gas bypass valve 68 is abnormal when the engine 10 is operated in the operating areas above.

Figure 8:
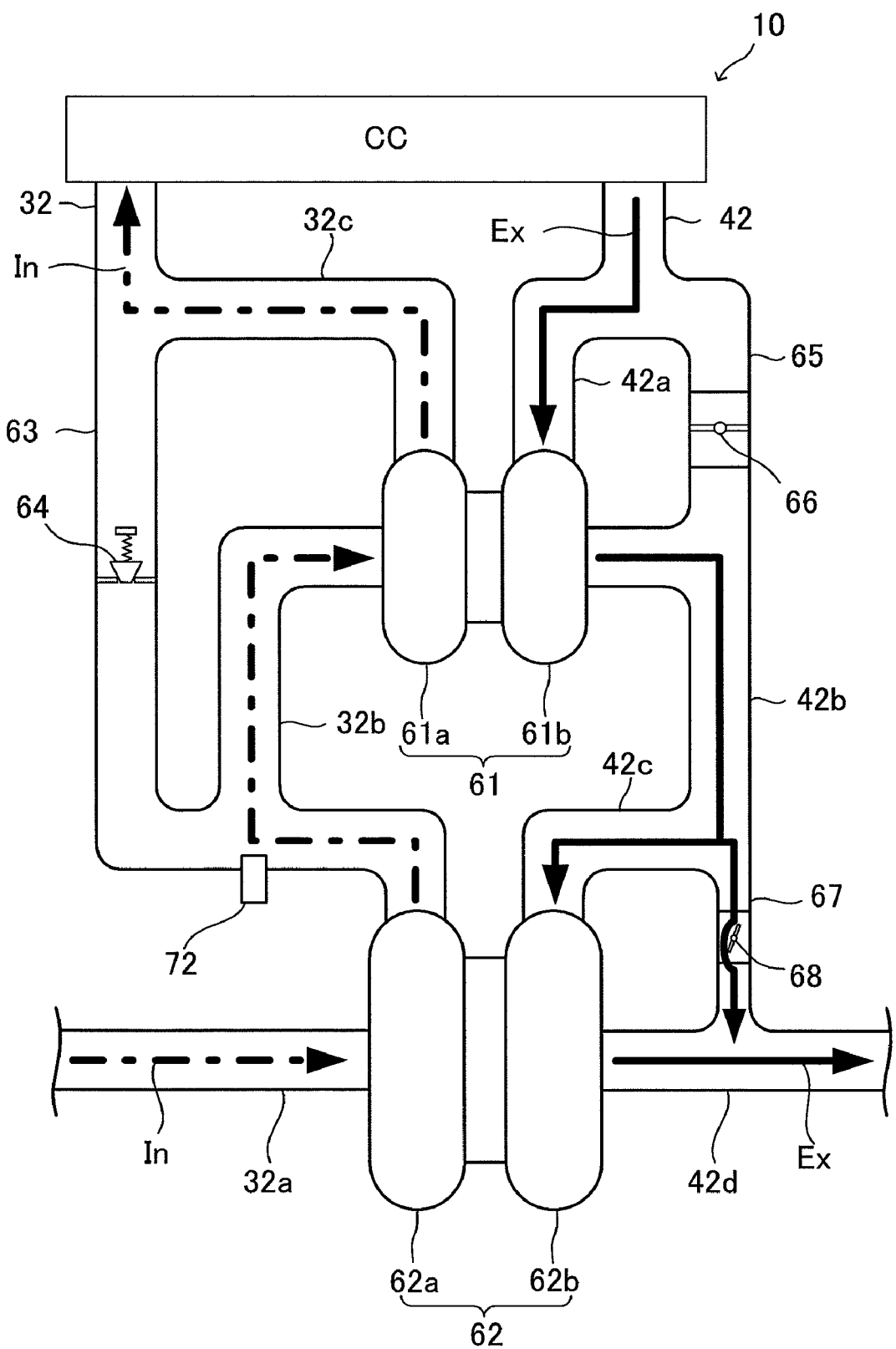
FIG. 8 is a schematic diagram showing a fifth example of an intake air passage and an exhaust gas passage of the internal combustion engine to which a control apparatus according to the first embodiment of the present invention is applied.

In this case, as shown in FIG. 8, "one part of the exhaust gas Ex which has passed the high pressure turbine 61b" passes through the low pressure turbine 62b, and "the other part of the exhaust gas Ex" passes through the low-pressure-turbine-bypass-passage-section 67. Therefore, the energy of the exhaust gas introduced into the low pressure turbine 62b decreases in comparison with "the Case 1-1". Accordingly, the between-compressors-pressure Pc in this case becomes smaller than the between-compressors-pressure Pc in a case where the exhaust gas bypass valve 68 is normal (for example, a value obtained by adding a predetermined value to the atmospheric pressure), when the engine 10 is operated at least in the second operating area AR2. Further, the supercharging pressure Pim becomes smaller than the target supercharging pressure Pimtgt by an amount of reduction of the between-compressors-pressure Pc.

Accordingly, it can be determined that "the exhaust gas bypass valve 68 is normal (consequently, either one of the intake air changeover valve 64 and the exhaust gas changeover valve 66 is abnormal)", if the supercharging-pressure-abnormal-state occurs and the low pressure compressor 62a appropriately compresses the new air In when the engine 10 is operated in the second operating area AR2. To the contrary, it can be determined that "the exhaust gas bypass valve 68 is abnormal (consequently, both of the intake air changeover valve 64 and the exhaust gas changeover valve 66 is normal)", if the supercharging-pressure-abnormal-state occurs and the low pressure compressor 62a does not appropriately compress the new air In when the engine 10 is operated in the second operating area AR2.

<An Actual Operation>

Next will be described an actual operation of the first apparatus. The CPU 81 executes "an pressure loss estimation routine" shown by a flowchart in FIG. 9 every elapse of a predetermined time period. Accordingly, the CPU 81 starts executing the routine from step 900 in FIG. 9 at a predetermined timing, and proceeds to step 910 at which the CPU 81 estimates an amount of pressure loss PDic which is caused by the intercooler 34 (hereinafter, this amount of the pressure loss will be referred to as "the intercooler-pressure loss amount PDic") by applying an actual mass flow rate Ga which is obtained based on an output value of the airflow meter 71 to an intercooler-pressure-loss-table MapPDic (Ga). The intercooler-pressure-loss-table MapPDic (Ga) is a table determined based on "a relation between the mass flow rate Ga and the intercooler-pressure loss amount PDic" which is obtained by experiments performed in advance. According to this table, the intercooler-pressure loss amount PDic is determined so as to become larger as the mass flow rate Ga becomes larger.

Subsequently, the CPU 81 proceeds to step 920 at which the CPU 81 estimates an amount of pressure loss PDtv which is caused by the throttle valve 33 (hereinafter, this amount of the pressure loss will be referred to as "the throttle-valve-pressure loss amount PDtv") by applying "an actual mass flow rate Ga and an actual opening degree of the throttle valve Otv (hereinafter, this opening degree will be referred to as "the throttle valve opening degree Otv")" to a throttle-valve-pressure-loss-table MapPDtv (Ga, Otv), which is a table defining "a relation between the mass flow rate Ga, the throttle valve opening degree Otv, and the throttle-valve-pressure loss amount PDtv" in advance. The actual throttle valve opening degree Otv is determined based on an instruction signal sent to the throttle valve actuator 33a. According to this table, the throttle-valve-pressure loss amount PDtv is determined so as to become larger as the mass flow rate Ga becomes larger. Further, the throttle-valve-pressure loss amount PDtv is determined so as to become larger as the throttle valve opening degree Otv becomes smaller.

Subsequently, the CPU 81 proceeds to step 930 at which the CPU 81 stores a sum of the intercooler-pressure loss amount PDic and the throttle-valve-pressure loss amount PDtv as the pressure loss amount PD. Thereafter, the CPU 81 proceeds to step 995 at which the CPU 81 ends the present routine tentatively.

Figure 10:
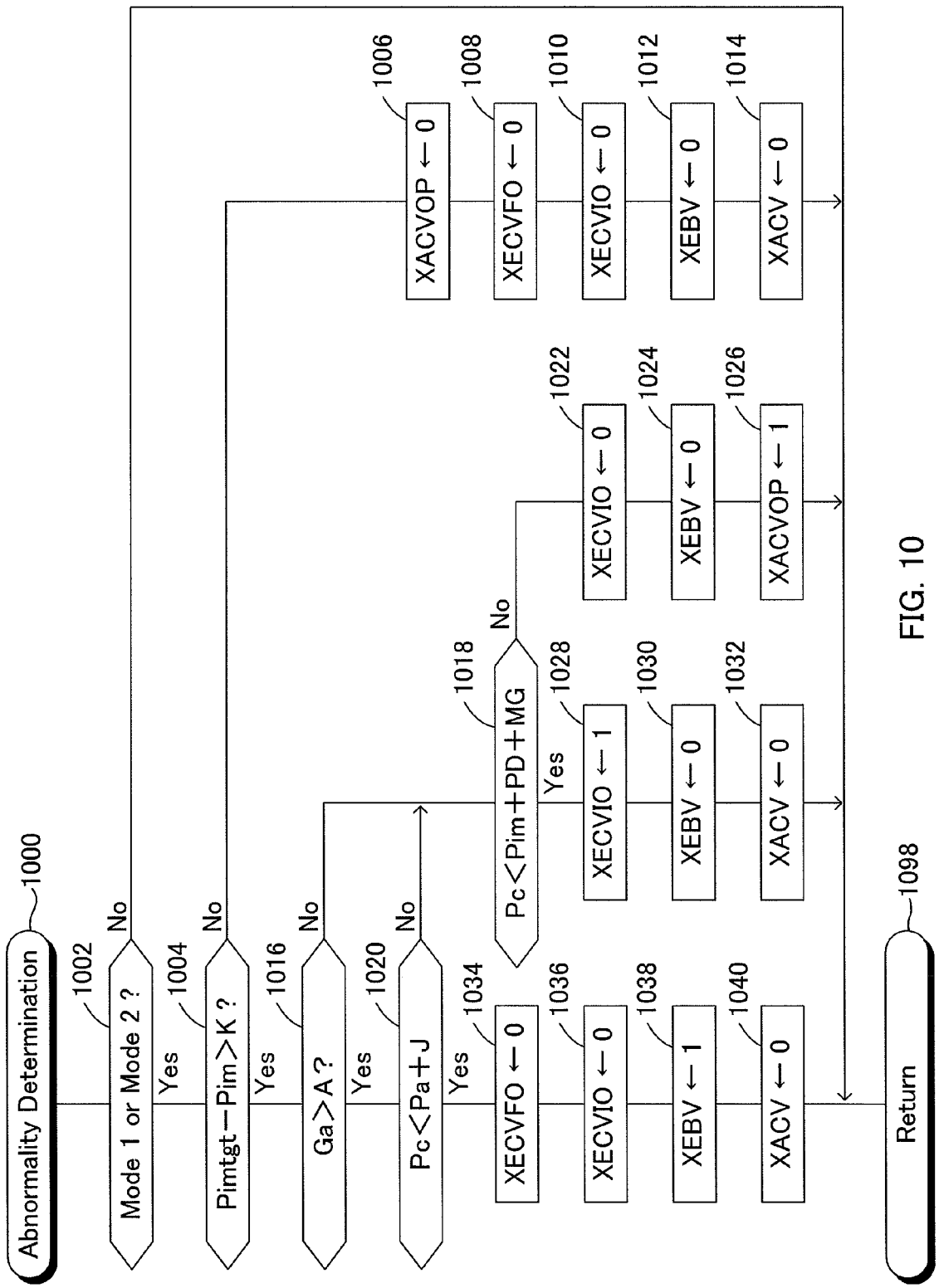
FIG. 10 is a flowchart showing a routine executed by a CPU of the control apparatus according to the first embodiment of the present invention.

Further, the CPU 81 executes "an abnormality determination routine" shown by a flowchart in FIG. 10 every elapse of a predetermined time period. The CPU 81 determines an abnormality of the exhaust gas changeover valve 66, the intake air changeover valve 64, and the exhaust gas bypass valve 68.

Specifically, the CPU 81 starts executing the routine from step 1000 in FIG. 10 at a predetermined timing, and proceeds to step 1002 at which the CPU 81 determines which of the turbo mode 1 and the turbo mode 2 the engine 10 is driven in. If the engine 10 is not driven in the turbo mode 1 or the turbo mode 2, the CPU 81 makes a "No" determination at step 1002 to proceed directly to step 1098 at which the CPU 81 ends the present routine tentatively. That is, the abnormality determination is not performed in this case. To the contrary, if the engine 10 is driven in the turbo mode 1 or the turbo mode 2, the CPC 81 makes a "Yes" determination at step 1002 to proceed to step 1004. Hereinafter, descriptions will be continued based on an assumption that the engine 10 is driven in the turbo mode 1 or the turbo mode 2.

The CPU 81 determines whether or not the supercharging pressure Pim which is obtained based on an output value of the supercharging pressure sensor 74 coincides with the target supercharging pressure Pimtgt determined based on the operating condition of the engine 10. Specifically, the CPU 81 determines whether or not the difference between the target supercharging pressure Pimtgt and the supercharging pressure Pim is larger than a predetermined value K. The value K is set at a value which corresponds to the minimum value among a magnitude of a reduction amount of the supercharging pressure Pim, the reduction being caused when any of the exhaust gas changeover valve 66, the intake air changeover valve 64, and the exhaust gas bypass valve 68 is abnormal. That is, any of the exhaust gas changeover valve 66, the intake air changeover valve 64, and the exhaust gas bypass valve 68 is abnormal, when the difference between the target supercharging pressure Pimtgt and the supercharging pressure Pim is larger than the predetermined value K.

(Assumption A) All of the intake air changeover valve 64, the exhaust gas changeover valve 66, and the exhaust gas bypass valve 68 are normal.

Now, it is assumed that all of the intake air changeover valve 64, the exhaust gas changeover valve 66, and the exhaust gas bypass valve 68 are normal. In this case, the supercharging pressure Pim coincides with the target supercharging pressure Pimtgt, as described above.

Accordingly, the CPC 81 makes a "No" determination at step 1004, and proceeds to step 1006 at which the CPU 81 sets a value of an intake-air-changeover-valve-open-flag XACVOP at "0". The intake-air-changeover-valve-open-flag XACVOP indicates that the intake air changeover valve 64 shuts the high-pressure-compressor-bypass-passage-section 63, when the value of the intake-air-changeover-valve-open-flag XACVOP is "0". To the contrary, the intake-air-changeover-valve-open-flag XACVOP indicates that the intake air changeover valve 64 opens the high-pressure-compressor-bypass-passage-section 63, when the value of the intake-air-changeover-valve-open-flag XACVOP is "1".

It should be noted that all of values of flags, which include the intake-air-changeover-valve-open-flag XACVOP, used by the first apparatus are set at "0" by an initial routine executed when the ignition key switch (not shown) is turned ON from OFF. Further, all of values of flags, which include the intake-air-changeover-valve-open-flag XACVOP, used by the first apparatus are stored in the back-up RAM 84.

Consequently, the CPU 81 proceeds to step 1008 at which the CPU 81 sets a value of an exhaust-gas-changeover-valve-large-opening-degree-abnormality-flag XECVFO at "0". The exhaust-gas-changeover-valve-large-opening-degree-abnormality-flag XECVFO indicates that the exhaust gas changeover valve 66 is normal, when the value of the exhaust-gas-changeover-valve-large-opening-degree-abnormality-flag XECVFO is "0". To the contrary, the exhaust-gas-changeover-valve-large-opening-degree-abnormality-flag XECVFO indicates that the exhaust gas changeover valve 66 is abnormal (specifically, in the large-opening-degree abnormal open state), when the value of the exhaust-gas-changeover-valve-large-opening-degree-abnormality-flag XECVFO is "1". Thereafter, the CPU 81 proceeds to step 1098 to end the present routine tentatively.

Consequently, the CPU 81 proceeds to step 1010 at which the CPU 81 sets a value of an exhaust-gas-changeover-valve-small-opening-degree-abnormality-flag XECVIO at "0". The exhaust-gas-changeover-valve-small-opening-degree-abnormality-flag XECVIO indicates that the exhaust gas changeover valve 66 is normal, when the value of the exhaust-gas-changeover-valve-small-opening-degree-abnormality-flag XECVIO is "0". To the contrary, the exhaust-gas-changeover-valve-small-opening-degree-abnormality-flag XECVIO indicates that the exhaust gas changeover valve 66 is abnormal (specifically, in the small-opening-degree abnormal open state), when the value of the exhaust-gas-changeover-valve-small-opening-degree-abnormality-flag XECVIO is "1".

Consequently, the CPU 81 proceeds to step 1012 at which the CPU 81 sets a value of an exhaust-gas-bypass-valve-abnormality-flag XEBV at "0". The exhaust-gas-bypass-valve-abnormality-flag XEBV indicates that the exhaust gas bypass valve 68 is normal, when the value of the exhaust-gas-bypass-valve-abnormality-flag XEBV is "0". To the contrary, the exhaust-gas-bypass-valve-abnormality-flag XEBV indicates that the exhaust gas bypass: valve 68 is abnormal, when the value of the exhaust-gas-bypass-valve-abnormality-flag XEBV is "1".

Consequently, the CPU 81 proceeds to step 1014 at which the CPU 81 sets a value of an intake-air-changeover-valve-abnormality-flag XACV at "0". The intake-air-changeover-valve-abnormality-flag XACV indicates that the intake air changeover valve 64 is normal, when the value of the intake-air-changeover-valve-abnormality-flag XACV is "0". To the contrary, the intake-air-changeover-valve-abnormality-flag XACV indicates that the intake air changeover valve 64 is abnormal, when the value of the intake-air-changeover-valve-abnormality-flag XACV is "1".

Figure 11:
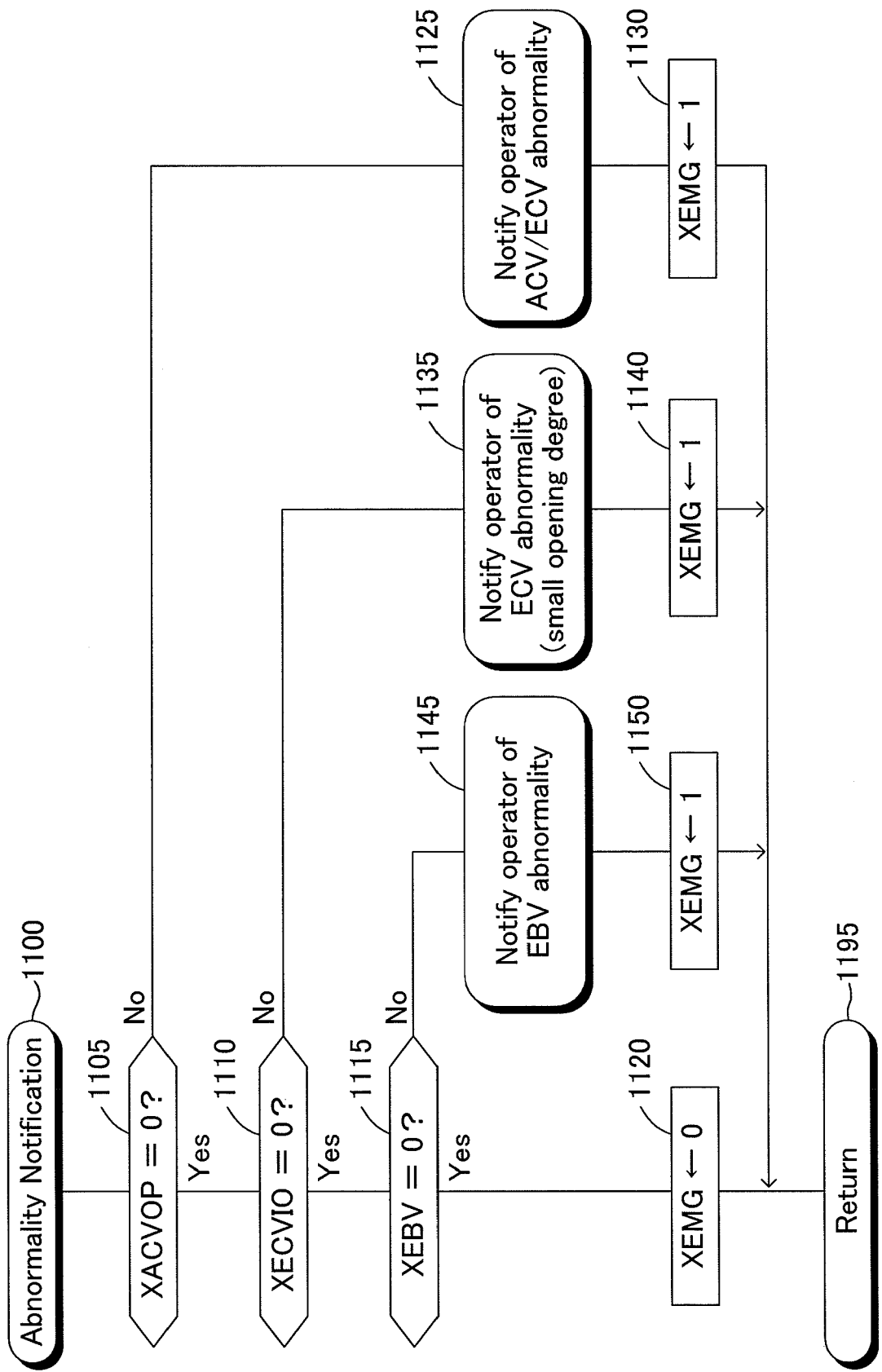
FIG. 11 is a flowchart showing a routine executed by a CPU of the control apparatus according to the first embodiment of the present invention.

Further, the CPC 81 executes "an abnormality notification routine" shown by a flowchart in FIG. 11 every elapse of a predetermined time period. If any of the intake air changeover valve 64, the exhaust gas changeover valve 66, and the exhaust gas bypass valve 68 is abnormal, the CPU 81 notifies the operator of accordingly.

Specifically, the CPU 81 starts executing the routine from step 1100 of FIG. 11 at a predetermined timing, and proceeds to step 1105 at which the CPU 81 determines whether or not the value of the intake-air-changeover-valve-open-flag XACVOP is "0". The value of the intake-air-changeover-valve-open-flag XACVOP is "0" at the present time, and therefore the CPU 81 makes a "Yes" determination at step 1105 to proceed to step 1110.

Subsequently, the CPU 81 determines whether or not the value of the exhaust-gas-changeover-valve-small-opening-degree-abnormality-flag XECVIO is "0" at step 1110. The value of the exhaust-gas-changeover-valve-small-opening-degree-abnormality-flag XECVIO is "0" at the present time, and therefore the CPU 81 makes a "Yes" determination at step 1110 to proceed to step 1115.

Subsequently, the CPU 81 determines whether or not the value of the exhaust-gas-bypass-valve-abnormality-flag XEBV is "0" at step 1115. The value of the exhaust-gas-bypass-valve-abnormality-flag XEBV is "0" at the present time, and therefore the CPU 81 makes a "Yes" determination at step 1115 to proceed to step 1120.

The CPU 81 sets a value of an abnormality-occurrence-flag XEMG at "0" at step 1120. The abnormality-occurrence-flag XEMG indicates that all of the intake air changeover valve 64, the exhaust gas changeover valve 66, and the exhaust gas bypass valve 68 operate normally, when the abnormality-occurrence-flag XEMG is "0". To the contrary, the abnormality-occurrence-flag XEMG indicates that any of the intake air changeover valve 64, the exhaust gas changeover valve 66, and the exhaust gas bypass valve 68 is abnormal, when the value of the abnormality-occurrence-flag XEMG is "1".

Thereafter, the CPU 81 proceeds to step 1195 at which the CPU 81 ends the present routine tentatively. Accordingly, when all of the intake air changeover valve 64, the exhaust gas changeover valve 66, and the exhaust gas bypass valve 68 are normal (i.e., when all of the value of the exhaust-gas-changeover-valve-small-opening-degree-abnormality-flag XECVIO, the value of the intake-air-changeover-valve-open-flag XACVOP, and the value of the exhaust-gas-bypass-valve-abnormality-flag XEBV are "0"), notification to the operator of the engine 10 is not provided.

Figure 12:
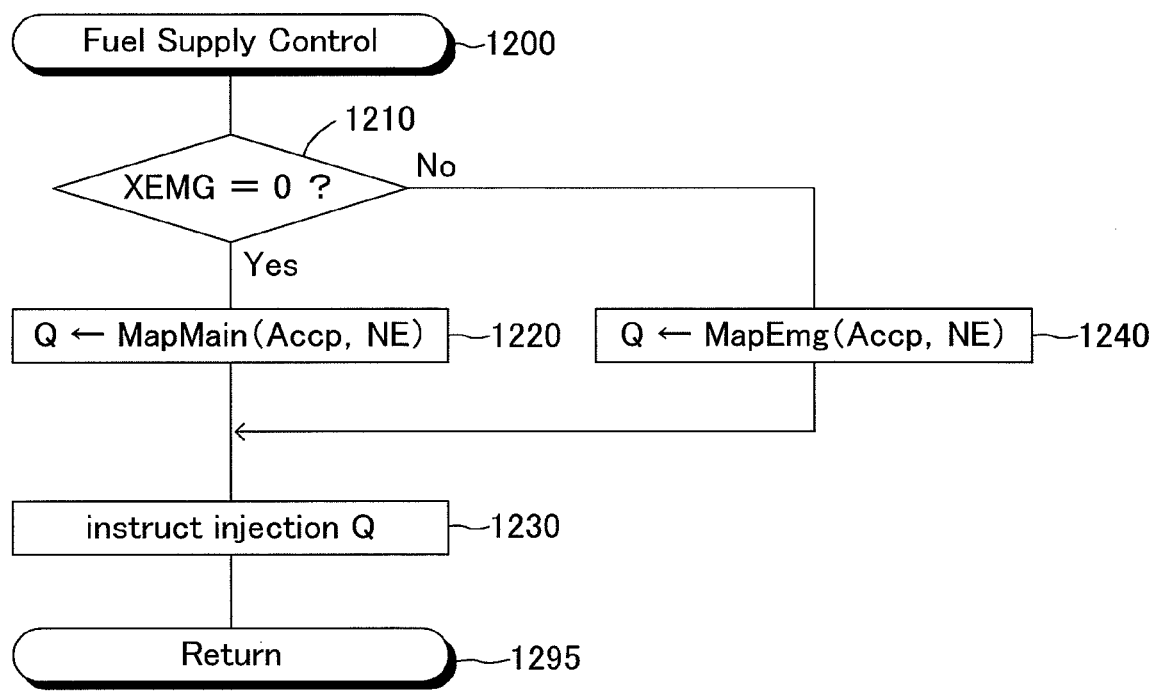
FIG. 12 is a flowchart showing a routine executed by a CPU of the control apparatus according to the first embodiment of the present invention.

Further, the CPC 81 repeatedly executes "a fuel supply control routine" shown by a flowchart in FIG. 12 every time when a crank angle of any one of the cylinders coincides with a predetermined crank angle θg (e.g., 90° crank angle before the compression top dead center). The CPU 81 calculates the fuel injection amount Q and instructs to inject the fuel, by this routine. The cylinder whose crank angle coincides with the predetermined crank angle θg before the compression top dead center will be referred to as "a fuel injection cylinder", hereinafter.

Specifically, when the crank angle of any one of the cylinders coincides with the predetermined crank angle θg, the CPU 81 starts executing the routine from step 1200 in FIG. 12, and proceeds to step 1210 at which the CPU 81 determines whether or not the value of the abnormality-occurrence-flag XEMG is "0". The value of the abnormality-occurrence-flag XEMG is "0" at the present time, and therefore the CPU 81 makes a "Yes" determination at step 1210 to proceed to step 1220.

At step 1220, the CPU 81 obtains the opening degree Accp of the accelerator pedal based on the output value of the accelerator opening degree sensor 76, and obtains the engine rotational speed NE based on the output value of the crank position sensor 75. Then, the CPU 81 applies the opening degree Accp of the accelerator pedal at the present time and the engine rotational speed NE at the present time to a normal-operating-state-fuel-injection-amount-table MapMain (Accp, NE) so as to obtain a fuel injection amount Q, the table MapMain (Accp, NE) defining a relation among "the opening degree Accp of the accelerator pedal, the engine rotational speed NE, and the fuel injection amount Q" when all of the control valves are normal, and the table MapMain (Accp, NE) being defined in advance. The fuel injection amount Q when all of the control valves are normal corresponds to a required torque. Hereinafter, an operation in which the fuel injection amount determined by the normal-operating-state-fuel-injection-amount-table MapMain (Accp, NE) is used will be referred to as "a normal operation".

Subsequently, the CPU 81 proceeds to step 1230 at which the CPU 81 provides to the injector 22 disposed for the fuel injection cylinder an instruction to inject the fuel whose amount is the fuel injection amount Q from the injector 22. That is, at this time, the fuel whose amount is the fuel injection amount Q is supplied to the fuel injection cylinder. Thereafter, the CPU 81 proceeds to step 1295 at which the CPU 81 ends the present routine tentatively.

In this manner, "the normal operation" in which the fuel whose amount is equal to the fuel injection amount Q determined based on the normal-operating-state-fuel-injection-amount-table MapMain (Accp, NE) is injected to the fuel injection cylinder, when all of the intake air changeover valve 64, the exhaust gas changeover valve 66, and the exhaust gas bypass valve 68 operate normally.

(Assumption B) The intake air changeover valve 64 is abnormal, but the exhaust gas changeover valve 66 and the exhaust gas bypass valve 68 are normal.

In this case, the high pressure compressor 61a can not compresses the new air In, even when the engine 10 is operated in any operating area of the first operating area AR1 and the second operating area AR2. Accordingly, the supercharging pressure Pim is smaller than the target supercharging pressure Pimtgt.

In this case, the CPU 81 starts executing the routine from step 1000 of FIG. 10 at a predetermined timing, and proceeds to step 1004 through step 1002, if the engine 10 is operated in the turbo mode 1 or the turbo mode 2. The intake air changeover valve 64 is abnormal according to the Assumption B described above, and therefore the difference between the target supercharging pressure Pimtgt and the supercharging pressure Pim is larger than the predetermined value K. Accordingly, the CPU 81 makes a "Yes" determination at step 1004 to proceed to step 1016 at which the CPU 81 determines whether or not the new air amount Ga is larger than a predetermined value A. It should be noted that the predetermined value A is set at "a value for determining that the engine 10 is operated in "the second operating area AR2" when the new air amount Ga is larger than the predetermined value A".

If the engine 10 is operated in "the first operating area AR1" at the present time, the CPU 81 makes a "No" determination at step 1016 to proceed to step 1018.

To the contrary, if the engine 10 is operated in "the second operating area AR2" at the present time, the CPU 81 makes a "Yes" determination at step 1016 to proceed to step 1020. The CPU 81 determines whether or not the low pressure compressor 62a supercharges the engine 10.

Specifically, the CPU 81 adopts "the atmospheric pressure Pa" as a pressure of the new air "before" being introduced into the low pressure compressor 62a, and adopts "the between-compressors-pressure Pc" as a pressure of the new air "after" passing through the low pressure compressor 62a. Subsequently, the CPU 81 determines whether or not "the sum of the atmospheric pressure and a predetermined value J (hereinafter, the sum of them will be referred to as "a second-compressor-upstream-side-pressure Pscup")" is larger than "the between-compressors-pressure Pc".

The predetermined value J is set at a value where "the sum of the atmospheric pressure and the predetermined value J" coincides with "the minimum value among the between-compressors-pressure Pc when the low pressure compressor 62a compresses the new air In". Accordingly, the between-compressors-pressure Pc is larger than or equal to the second-compressor-upstream-side-pressure Pscup, if the low pressure compressor 62a compresses the new air In.

The exhaust gas bypass valve 68 is normal according to the Assumption B, and therefore the low pressure compressor 62a compresses the new air In. That is, the between-compressors-pressure Pc is larger than or equal to the second-compressor-upstream-side-pressure Pscup, in this case. Consequently, the CPU 81 makes a "No" determination at step 1020 to proceed to step 1018.

As described above, the CPU 81 proceeds to step 1018 according to the Assumption B, when the engine 10 is operated in any of the first operating area AR1 and the second operating area AR2. The CPU 81 determines whether or not the high pressure compressor 61a supercharges the engine 10, at step 1018.

Specifically, the CPU 81 adopts "the between-compressors-pressure Pc" as a pressure of the new air "before" being introduced into the high pressure compressor 61a, and adopts "a sum of the supercharging pressure Pim and the pressure loss amount PD" as a pressure of the new air "after" passing through the high pressure compressor 61a. The supercharging pressure sensor 74 is configured so as to obtain a pressure of the new air after passing through the high pressure compressor 61a, the intercooler 34, and the throttle valve 33. Accordingly, "the sum of the supercharging pressure Pim and the pressure loss amount PD" substantially coincides with a pressure of the new air just after passing through the high pressure compressor 61a. The CPU 81 determines whether or not "a sum of the between-compressors-pressure Pc, the pressure loss amount PD and a predetermined value MG" is larger than "the between-compressors-pressure Pc", at the step 1018 (hereinafter, the sum of the supercharging pressure Pim and the pressure loss amount PD will be referred to as "a first-compressor-downstream-side-pressure Pfcdown"). It should be noted that the predetermined value MG is a value which is adopted in order to prevent an erroneous determination, and which is a predetermined value smaller than or equal to zero (i.e., zero or a negative number). In other words, the predetermined value MG is set so as to surely determine "the high pressure compressor 61a compresses the new air A", when "the value obtained by adding the predetermined value MG to the first-compressor-downstream-side-pressure Pfcdown" is larger than "the between-compressors-pressure Pc".

The intake air changeover valve 64 is abnormal according to the Assumption B described above, and therefore the high pressure compressor 61a does not compress the new air. That is, the between-compressors-pressure Pc substantially coincides with the first-compressor-downstream-side-pressure Pfcdown. Accordingly (in view of the predetermined value MG being zero or a negative number, as described above), the CPU 81 makes a "No" determination at step 1018, and proceeds to step 1022 at which the CPU 81 sets the value of the exhaust-gas-changeover-valve-small-opening-degree-abnormality-flag XECVIO at "0".

Subsequently, the CPU 81 proceeds to step 1024 at which the CPU 81 sets the value of the exhaust-gas-bypass-valve-abnormality-flag XEBV at "0", and sets the value of the intake-air-changeover-valve-open-flag XACVOP as "1" at the following step 1026. Thereafter, the CPU 81 proceeds to step 1098 at which the CPU 81 ends the present routine tentatively.

In this case, the CPU 81 starts executing the routine from step 1100 of FIG. 11 at a predetermined timing, and proceeds to the step 1105. The value of the intake-air-changeover-valve-open-flag XACVOP is "1" at the present time, and therefore the CPU 81 makes a "No" determination at step 1105, and proceeds to step 1125 at which the CPU 81 notifies the operator that "either one of the intake air changeover valve 64 and the exhaust gas changeover valve 66 is abnormal". It should be noted that this notification is performed by turning on a warning lamp which is not shown, or the like. Thereafter, the CPU 81 proceeds to step 1130 at which the CPU 81 sets the value of the abnormality-occurrence-flag XEMG at "1", and proceeds to step 1195 at which the CPU 81 ends the present routine tentatively.

As described above, when the intake air changeover valve 64 is abnormal, a warning notifying the operator of the engine 10 that "either one of the intake air changeover valve 64 and the exhaust gas changeover valve 66 is abnormal" is provided.

Further, when the crank angle of any one of the cylinders coincides with the predetermined crank angle θg, the CPU 81 starts executing the routine from step 1200 in FIG. 12, and proceeds to step 1210. The value of the abnormality-occurrence-flag XEMG is "1" at the present time, and therefore the CPU 81 makes a "No" determination at step 1210 to proceed to step 1240.

At step 1240, the CPU 81 obtains the opening degree Accp of the accelerator pedal based on the output value of the accelerator opening degree sensor 76, and obtains the engine rotational speed NE based on the output value of the crank position sensor 75. Then, the CPU 81 applies the opening degree Accp of the accelerator pedal at the present time and the engine rotational speed NE at the present time to an abnormality-occurring-state-fuel-injection-amount-table MapEmg (Accp, NE) so as to obtain a fuel injection amount Q, the table MapEmg (Accp, NE) defining a relation among "the opening degree Accp of the accelerator pedal, the engine rotational speed NE, and the fuel injection amount Q" in advance, and the table MapEmg (Accp, NE) being used when "any of the intake air changeover valve 64, the exhaust gas changeover valve 66, and the exhaust gas bypass valve 68 is abnormal". Hereinafter, an operation in which the fuel injection amount determined by the abnormality-occurring-state-fuel-injection-amount-table MapEmg (Accp, NE) is used will be referred to as "an emergency operation".

The abnormality-occurring-state-fuel-injection-amount-table MapEmg (Accp, NE) is a table to determine "the fuel injection amount Q which is unlikely to cause other members of the engine 10 or the whole engine 10 to be broken, even if the engine 10 is continued to be operated when any of the intake air changeover valve 64, the exhaust gas changeover valve 66, and the exhaust gas bypass valve 68 is abnormal". Accordingly, it should be appreciated that the fuel injection amount determined based on the abnormality-occurring-state-fuel-injection-amount-table MapEmg (Accp, NE) with respect to a certain set of "the opening degree Accp of the accelerator pedal and the engine rotational speed NE" is smaller than the fuel injection amount determined based on the normal-operating-state-fuel-injection-amount-table MapMain (Accp, NE) with respect to the certain set of "the opening degree Accp of the accelerator pedal and the engine rotational speed NE".

Subsequently, the CPU 81 proceeds to step 1230 to inject the fuel whose amount is the fuel injection amount Q from the injector 22 disposed for the fuel injection cylinder. Thereafter, the CPU 81 proceeds to step 1295 at which the CPU 81 ends the present routine tentatively.

As described above, when the intake air changeover valve 64 is abnormal, the first apparatus notifies the operator of the engine 10 that "either one of the intake air changeover valve 64 and the exhaust gas changeover valve 66 is abnormal". Further, the first apparatus performs "the emergency operation".

(Assumption C) The exhaust gas changeover valve 66 is abnormal (specifically, in the small-opening-degree abnormal open state), but the intake air changeover valve 64 and the exhaust gas bypass valve 68 are normal.

In this case, the high pressure compressor 61a can compresses the new air In. However, the opening degree of the exhaust gas changeover valve 66 in this case is larger than the opening degree of the exhaust gas changeover valve 66 when the exhaust gas changeover valve 66 is normal, and therefore the supercharging pressure Pim is smaller than the target supercharging pressure Pimtgt.

In this case, the CPU 81 starts executing the routine from step 1000 of FIG. 10 at a predetermined timing, and proceeds to step 1004 through step 1002, if the engine 10 is operated in the turbo mode 1 or the turbo mode 2. The exhaust gas changeover valve 66 is abnormal (specifically, in the small-opening-degree abnormal open state) according to the Assumption C described above, and therefore the difference between the target supercharging pressure Pimtgt and the supercharging pressure Pim is larger than the predetermined value K. Accordingly, the CPU 81 makes a "Yes" determination at step 1004 to proceed to step 1016.

If the engine 10 is operated in "the first operating area AR1" at the present time, the CPU 81 makes a "No" determination at step 1016 to proceed to step 1018. To the contrary, if the engine 10 is operated in "the second operating area AR2" at the present time, the CPU 81 makes a "Yes" determination at step 1016 to proceed to step 1020. Further at step1020, the CPU 81 makes a "No" determination to proceed to step 1018, since the exhaust gas bypass valve 68 is normal and therefore the low pressure supercharger 62 supercharges the engine 10 according to the Assumption C. That is, according to the Assumption C, the CPU 81 proceeds to step 1018 when the engine 10 is operated in any of the first operating area AR1 and the second operating area AR2.

Further, according to the Assumption C, the intake air changeover valve 64 is normal, and therefore the high pressure compressor 61a compresses the new air. Accordingly, the sum of the first-compressor-downstream-side-pressure Pfcdown (i.e., Pim+PD) and the predetermined value MG is larger than the between-compressors-pressure Pc. Consequently, the CPU 81 makes a "Yes" determination at step 1018 to proceed to step 1028 at which the CPU 81 sets the value of the exhaust-gas-changeover-valve-small-opening-degree-abnormality-flag XECVIO at "1".

Subsequently, the CPU 81 proceeds to step 1030 at which the CPU 81 sets the value of the exhaust-gas-bypass-valve-abnormality-flag XEBV at "0", and sets the value of the intake-air-changeover-valve-abnormality-flag XACV at "0" at the following step 1032. Thereafter, the CPU 81 proceeds to step 1098 at which the CPU 81 ends the present routine tentatively.

In this case, the CPU 81 starts executing the routine from step 1100 of FIG. 11 at a predetermined timing, and proceeds to the step 1105. The value of the intake-air-changeover-valve-open-flag XACVOP is "0" at the present time, and therefore the CPU 81 makes "Yes determination at step 1105, and proceeds to step 1110. The value of the exhaust-gas-changeover-valve-small-opening-degree-abnormality-flag XECVIO is "1" at the present time, and therefore the CPU 81 makes a "No" determination at step 1110 to proceed to step 1135 at which the CPU 81 notifies the operator that "the exhaust gas changeover valve 66 is abnormal (specifically, in the small-opening-degree abnormal open state)". It should be noted that this notification is performed by turning on a warning lamp which is not shown, or the like, as described above. Thereafter, the CPU 81 proceeds to step 1140 at which the CPU 81 sets the value of the abnormality-occurrence-flag XEMG at "1", and proceeds to step 1195 at which the CPU 81 ends the present routine tentatively.

As described above, when the exhaust gas changeover valve 66 is abnormal (specifically, in the small-opening-degree abnormal open state), a warning notifying the operator of the engine 10 that " the exhaust gas changeover valve 66 is abnormal (specifically, in the small-opening-degree abnormal open state)" is provided.

Further, when the crank angle of any one of the cylinders coincides with the predetermined crank angle θg, the CPU 81 starts executing the routine from step 1200 in FIG. 12, and proceeds to step 1210. The value of the abnormality-occurrence-flag XEMG is "1" at the present time, and therefore the CPU 81 proceeds to step 1295, through step 1210, step 1240, and step 1230 in this order, in the same way as the Assumption B is satisfied. At step 1295, the CPU 81 ends the present routine tentatively. Thereby, "the emergency operation" is performed.

As described above, when the exhaust gas changeover valve 66 is abnormal (specifically, in the small-opening-degree abnormal open state), the first apparatus notifies the operator of the engine 10 accordingly. Further, the first apparatus performs "the emergency operation".

(Assumption D) The exhaust gas changeover valve 66 is abnormal (specifically, in the large-opening-degree abnormal open state), but the intake air changeover valve 64 and the exhaust gas bypass valve 68 are normal.

In this case, the high pressure compressor 61a can not compresses the new air In. Therefore, the supercharging pressure Pim is smaller than the target supercharging pressure Pimtgt.

In this case, the CPU 81 starts executing the routine from step 1000 of FIG. 10 at a predetermined timing, and proceeds to step 1004 through step 1002, if the engine 10 is operated in the turbo mode 1 or the turbo mode 2. The exhaust gas changeover valve 66 is abnormal (specifically, in the large-opening-degree abnormal open state) according to the Assumption D described above, and therefore the difference between the target supercharging pressure Pimtgt and the supercharging pressure Pim is larger than the predetermined value K. Accordingly, the CPU 81 makes a "Yes" determination at step 1004 to proceed to step 1016.

If the engine 10 is operated in "the first operating area AR1" at the present time, the CPU 81 makes a "No" determination at step 1016 to proceed to step 1018. To the contrary, if the engine 10 is operated in "the second operating area AR2" at the present time, the CPU 81 makes a "Yes" determination at step 1016 to proceed to step 1020. The exhaust gas bypass valve 68 is normal according to the Assumption D, and therefore the low pressure supercharger 62 supercharges the engine 10. Accordingly, the CPU 81 makes a "No" determination at step 1020 to proceed to step 1018. That is, according to the Assumption D, the CPU 81 proceeds to step 1018 when the engine 10 is operated in any of the first operating area AR1 and the second operating area AR2.

Further, according to the Assumption D, the high pressure compressor 61*a* does not compress the new air. Accordingly, the first-compressor-downstream-side-pressure Pfcdown (i.e., Pim+PD) substantially coincides with the between-compressors-pressure Pc. Consequently, the CPU 81 proceeds to step 1098, through step 1018, step 1022, step 1024, and step 1026 in this order, in the same way as the Assumption B is satisfied. At step 1098, the CPU 81 ends the present routine tentatively.

In this case, the CPU 81 starts executing the routine from step 1100 of FIG. 11 at a predetermined timing, and proceeds to the step 1195, through step 1105, step 1125, and step 1130 in this order, in the same way as the Assumption B is satisfied. At step 1195, the CPU 81 ends the present routine tentatively.

As described above, when the exhaust gas changeover valve 66 is abnormal (specifically, in the large-opening-degree abnormal open state), a warning notifying the operator of the engine 10 that "either one of the intake air changeover valve 64 and the exhaust gas changeover valve 66 is abnormal" is provided.

Further, when the crank angle of any one of the cylinders coincides with the predetermined crank angle θg, the CPU 81 starts executing the routine from step 1200 in FIG. 12, and proceeds to step 1210. The value of the abnormality-occurrence-flag XEMG is "1" at the present time, and therefore the CPU 81 proceeds to step 1295, through step 1210, step 1240, and step 1230 in this order, in the same way as the Assumption B is satisfied. At step 1295, the CPU 81 ends the present routine tentatively. Thereby, "the emergency operation" is performed.

As described above, when the exhaust gas changeover valve 66 is abnormal (specifically, in the large-opening-degree abnormal open state), the first apparatus notifies the operator of the engine 10 that "either one of the intake air changeover valve 64 and the exhaust gas changeover valve 66 is abnormal". Further, the first apparatus performs "the emergency operation".

(Assumption E) The exhaust gas bypass valve 68 is abnormal, but the intake air changeover valve 64 and the exhaust gas changeover valve 66 are normal.

In this case, the low pressure compressor 62*a* can not appropriately compress the new air. Accordingly, the supercharging pressure Pim is smaller than the target supercharging pressure Pimtgt. It should be noted that the supercharging pressure Pim decreases when the exhaust gas bypass valve 68 is abnormal as described above, only in the case that the engine 10 is operated in "the second operating area AR2". Therefore, it will be assumed hereinafter that the engine 10 is operated in "the second operating area AR2".

In this case, the engine 10 is operated in the first operating area AR1 or the second operating area AR2 under the assumption described above, and therefore the CPU 81 starts executing the routine from step 1000 of FIG. 10 at a predetermined timing, and proceeds to step 1004 through step 1002. The exhaust gas bypass valve 68 is abnormal according to the Assumption E, and therefore the difference between the target supercharging pressure Pimtgt and the supercharging pressure Pim is larger than the predetermined value K. Accordingly, the CPU 81 makes a "Yes" determination at step 1004 to proceed to step 1016.

Now, the engine 10 is operated in "the second operating area AR2" at the present time, the CPU 81 makes a "Yes" determination at step 1016 to proceed to step 1020. According to the Assumption E, the between-compressors-pressure Pc is smaller than the second-compressor-upstream-side-pressure Pscup (i.e., Pa+J). Accordingly, the CPU 81 makes a "Yes" determination at step 1020 to proceed to step 1034.

The CPU 81 sets the value of the exhaust-gas-changeover-valve-large-opening-degree-abnormality-flag XECVFO at "0" at step 1034, and proceeds to step 1036. The CPU 81 sets the value of the exhaust-gas-changeover-valve-small-opening-degree-abnormality-flag XECVIO at "0" at step 1036, and proceeds to step 1038.

The CPU 81 sets the value of the exhaust-gas-bypass-valve-abnormality-flag XEBV at "1" at step 1038, and sets the value of the intake-air-changeover-valve-abnormality-flag XACV at "0" at the following step 1040. Thereafter, the CPU 81 proceeds to step 1098 at which the CPU 81 ends the present routine tentatively.

In this case, the CPU 81 starts executing the routine from step 1100 of FIG. 11 at a predetermined timing, and proceeds to the step 1105. The value of the intake-air-changeover-valve-open-flag XACVOP is "0" at the present time, and therefore the CPU 81 makes a "Yes" determination at step 1105, and proceeds to step 1110. The value of the exhaust-gas-changeover-valve-small-opening-degree-abnormality-flag XECVIO is "0", and therefore the CPU 81 makes a "Yes" determination at step 1110 to proceed to step 1115. Substantially, the value of the exhaust-gas-bypass-valve-abnormality-flag XEBV is "1" at the present time, and therefore the CPU 81 makes a "No" determination at step 1115 to proceed to step 1145 at which the CPU 81 notifies the operator that "the exhaust gas bypass valve 68 is abnormal". This notification is performed by turning on a warning lamp which is not shown, or the like, as described above. Thereafter, the CPU 81 proceeds to step 1150 at which the CPU 81 sets the value of the abnormality-occurrence-flag XEMG at "1", and proceeds to step 1195 at which the CPU 81 ends the present routine tentatively.

Further, when the crank angle of any one of the cylinders coincides with the predetermined crank angle θg in this case, the CPU 81 starts executing the routine from step 1200 in FIG. 12, and proceeds to step 1210. The value of the abnormality-occurrence-flag XEMG is "1" at the present time, and therefore the CPU 81 proceeds to step 1295, through step 1210, step 1240, and step 1230 in this order, in the same way as the Assumption B is satisfied. At step 1195, the CPU 81 ends the present routine tentatively. Thereby, "the emergency operation" is performed.

As described above, when the exhaust gas bypass valve 68 is abnormal, the first apparatus notifies the operator of the engine 10 accordingly. Further, the first apparatus performs "the emergency operation".

As described above, the first apparatus is applied to an internal combustion engine 10 having: a first supercharger 61; a second supercharger 62; a first passage section 65; a first control valve 66; a second passage section 63; and a second control valve 64, disposed in the second passage section 63, for opening the second passage section 63 so as to allow an air to pass through the second passage section 63 when a pressure of an air in the second passage section 63 at an upstream side of the second control valve 64 (the between-compressors-pressure Pc) is larger than a pressure of an air in the second passage section 63 at the downstream side of the second control valve 64 (the first-compressor-downstream-side-pressure Pfcdown) by a first pressure or more (the value corresponding to the biasing force), and for closing the second passage section 63 so as not to allow an air to pass through the second passage section 63 when a pressure Pc of an air in the second passage section 63 at an upstream side of the second control valve 64 is not larger than a pressure Pfcdown of an air in the second passage section 63 at the downstream side of the second control valve 64 by the first pressure or more.

The first apparatus determines abnormality of the first control valve 66 and the second control valve 64 in accordance with the abnormality determination method 1.

That is, the first apparatus comprises:

control-valve-operating-means for operating the first control valve 66 in such a manner that the first compressor 61a compresses an air introduced into the first compressor 61a and discharges the compressed air, when the engine 10 is operated in a first operating area AR1 in which a new air amount Ga is smaller than or equal to a first threshold new air amount (the predetermined value A) (when the first apparatus makes a "Yes" determination at step 1002 and makes a "No" determination at step 1016);

pressure-obtaining-means for obtaining, a between-compressors-pressure Pc (which is obtained by the between-compressors-pressure sensor 72), a first-compressor-downstream-side-pressure Pfcdown (refer to step 1018 in FIG. 10), and a supercharging pressure Pim (which is obtained by the supercharging pressure sensor 74);

and abnormality-determining-means for determining, if a supercharging-pressure-abnormal-state which is a state where the obtained supercharging pressure Pim is smaller than a referential supercharging pressure Pimtgt determined based on an operating condition of the engine 10 by a second pressure (the predetermined value K) or more occurs (when the first apparatus makes a "Yes" determination at step 1004 in FIG. 10) when the engine 10 is operated in the first operating area AR1 (refer to the above) that: the first control valve 66 is abnormal and the second control valve 64 is normal (refer to step 1028 and step 1032 in FIG. 10), if the first compressor-downstream-side-pressure Pfcdown (=Pim+PD) is larger than a first threshold pressure (=Pim−MG) which is larger than or equal to the between-compressors-pressure Pc (if the first apparatus makes a "Yes" determination at step 1018); and either one of the first control valve 66 and the second control valve 64 is abnormal (refer to step 1026 in FIG. 10, step 1105 and step 1125 in FIG. 11), if the first compressor-downstream-side-pressure Pfcdown is smaller than or equal to the first threshold pressure (Pim−MG) (when the first apparatus makes a "Yes" determination at step 1018).

As described above, the first apparatus can determine whether or not a plurality of the supercharges 61 and 62, the first control valve as the exhaust gas changeover valve 66, and the second control valve as the intake air changeover valve 64 are normally operated. Further, the first apparatus can determine whether or not the control valves are normally operated, even when the engine is driven in a relatively low load operating area (the first operating area AR1). Accordingly, the first apparatus can find abnormality of the control valves early.

As described above, it can be also determined that the opening degree of the first control valve 66 is "an opening degree: which is different from an opening degree at which the first control valve 66 is located when the first control valve 66 is normal; and which is within the range from the fully-closed-opening-degree for shutting the first passage section 65 to a predetermined threshold opening degree (i.e., the small-opening-degree abnormal open state)", when the abnormality-determining-means determines that "the first control valve 66 is abnormal and the second control valve 64 is normal" (refer to step 1028 in FIG. 10).

Further, in the first apparatus, the pressure-obtaining-means is configured so as to estimate an amount of a pressure loss PD generated by the pressure loss generating member 33 and 34 (refer to from step 910 to step 930), obtain the supercharging pressure Pim by actually detecting the supercharging pressure, and obtain the sum (Pim+PD) of the estimated amount of the pressure loss PD and the detected supercharging pressure Pim as the first-compressor-downstream-side-pressure Pfcdown (refer to step 1018 in FIG. 10).

Further, the engine 10 has: a third passage section 67; and a third control valve 68.

In the first apparatus, the control-valve-operating-means is configured in such a manner that; the control-valve-operating-means operates the third control valve 68 so as not to allow the exhaust gas Ex to pass through the third passage section 67, when the engine 10 is operated in "the first operating area AR1" or "in a second operating area AR2 in which the new air amount Ga is larger than the first threshold new air amount A and in which the new air amount Ga is smaller than or equal to a second threshold new air amount B which is larger than the first threshold new air amount A"; and the control-valve-operating-means operates the third control valve 68 so as to allow the exhaust gas Ex to pass through the third passage section 67, when the engine 10 is operated in "a third operating area in which the new air amount Ga is larger than the second threshold new air amount B" (refer to from FIG. 3(A) to FIG. 3(C)).

The first apparatus determines abnormality of the first control valve 66, the second control valve 64, and the third control valve 68 in accordance with the abnormality determination method 2.

In the first apparatus, the abnormality-determining-means is configured so as to determine, if the supercharging-pressure-abnormal-state occurs (if the first apparatus makes a "Yes" determination at step 1004 in FIG. 10) when the engine 10 is operated in the second operating area AR2 (when the first apparatus makes a "Yes" determination at step 1002, and makes a "Yes" determination at step 1016), that:

the third control valve 68 is normal (refer to step 1024 and step 1030 in FIG. 10) if the between-compressors-pressure Pc is larger than or equal to a predetermined second threshold pressure (the second-compressor-upstream-side-pressure Pscup=Pa+J) (if the first apparatus makes a "Yes" determination at step 1020 in FIG. 10);

and the third control valve 68 is abnormal (refer to step 1038 in FIG. 10) if the between-compressors-pressure Pc is smaller than the second threshold pressure Pscup (if the first apparatus makes a "Yes" determination at step1020 in FIG. 10).

As described above, the first apparatus is applied to an internal combustion engine having a plurality of the supercharges 61 and 62, a plurality of bypass passages 63, 65 and 67, the exhaust gas changeover valve 66, the intake air changeover valve 64, and other control valve (the third control valve 68), and can determine whether or not the "other control valve (the third control valve 68)" is normally operated.

Further, in the first apparatus, the abnormality-determining-means is configured so as to infer that the first control valve 66 and the second control valve 64 are normal (refer to step 1034, step 1036, and step 1040 in FIG. 10) if it determines that the third control valve 68 is abnormal (refer to step 1038 in FIG. 10).

Further, in the first apparatus, the control-valve-operating-means is configured in such a manner that the control-valve-operating-means operates the first control valve so as to compress the air introduced into the first compressor 61a and discharge the compressed air (refer from FIG. 3(A) to FIG. 3(C)) when the engine 10 is operated in the second operating area AR2 (when the first apparatus makes a "Yes" determination at step 1002, and makes a "Yes" determination at step 1016), the abnormality-determining-means is configured so as to determine, if the abnormality-determining-means determines that the third control valve 68 is normal (refer to the "No" determinations in step 1020, and step 1024 or step 1030) when the engine 10 is operated in the second operating area AR2 (refer to above), that:

the first control valve 66 is abnormal and the second control valve 64 is normal (refer to step 1028 and step 1032) if the first compressor-downstream-side-pressure Pfcdown (Pim+PD) is larger than the first threshold pressure (Pc−MG) (if the first apparatus makes a "Yes" determination at step 1018);

and either one of the first control valve 66 and the second control valve 64 is abnormal (refer to step 1026 in FIG. 10, step 1105 and step 1125 in FIG. 11) if the first compressor-downstream-side-pressure Pfcdown is smaller than or equal to the first threshold pressure (if the first apparatus makes a "No" determination at step 1018).

(A Second Embodiment)

Next will be described an apparatus for determining an abnormality of a control valve according to a second embodiment of the present invention (hereinafter, this apparatus will be referred to as "a second apparatus") is applied.

<An Outline of Apparatus>

The second apparatus is applied to an internal combustion engine similar to the internal combustion engine 10 to which the first apparatus is applied.

<An Outline of Operations the Apparatus>

The second apparatus is different from the first apparatus only in the following points.

The second apparatus send an instruction signal for forcibly changing the opening degree of the exhaust gas changeover valve 66 to the exhaust gas changeover valve actuator 66a, if a predetermined abnormality determining condition is satisfied when it is determined that "either one of the exhaust gas changeover valve 66 and the intake air changeover valve 64 is abnormal" in the first apparatus (refer to step 1026 in FIG. 10, step 1105 and step 1125 in FIG. 11). Subsequently, the second apparatus determine "whether or not the intake air changeover valve 64 is abnormal" and "whether or not the exhaust gas changeover valve 66 is abnormal", based on a change amount of the supercharging pressure between the supercharging pressure before the instruction signal is sent to the exhaust gas changeover valve actuator 66a and the supercharging pressure after the instruction signal is sent to the exhaust gas changeover valve actuator 66a. Further, the second apparatus notifies a result of the determination described above, and performs the emergency operation.

<An Abnormality Determination for the Control Valve>

Next will be described methods to determine an abnormality of the control valve in the second apparatus.

The second apparatus provides to the exhaust gas changeover valve 66 (actually, the exhaust gas changeover valve actuator 66a) an instruction to change the opening degree of the exhaust gas changeover valve 66 (opening-degree-change-instruction), if it is determined that "either one of the exhaust gas changeover valve 66 and the intake air changeover valve 64 is abnormal" when an abnormality determining condition including "the engine 10 is operated in the second operating area AR2" is satisfied. Subsequently, the second apparatus obtains the supercharging pressure Pim0 at a timing "before" the opening-degree-change-instruction is provided to the exhaust gas changeover valve 66 and the supercharging pressure Pim1 at a timing "after" the opening-degree-change-instruction is provided to the exhaust gas changeover valve 66.

Subsequently, the second apparatus determines that "the intake air changeover valve 64 is abnormal", if the change amount of the supercharging pressure Pim (|Pim1−Pim0|) when (before and after) the opening-degree-change-instruction is provided is larger than or equal to a predetermined value Pimth. To the contrary, the second apparatus determines that "the exhaust gas changeover valve 66 is abnormal", if the change amount (|Pim1−Pim0|) is smaller than the predetermined value Pimth. Hereinafter, the determination method described above will be referred to as "an abnormality determination method 3".

"The opening-degree-change-instruction" includes: an instruction to "increase" the opening degree of the exhaust gas changeover valve 66; and an instruction to "decrease" the opening degree of the exhaust gas changeover valve 66. However, a principle of the abnormality determination method is common to these even if any of the instructions above is provided to the exhaust gas changeover valve 66. Accordingly, next will be described reasons why "which of the intake air changeover valve 64 and the exhaust gas changeover valve 66 is abnormal" can be determined by "the abnormality determination method 3" in the following order, with reference to a case where the instruction to "increase" the opening degree of the exhaust gas changeover valve 66 (opening-degree-increase-instruction) is provided to the exhaust gas changeover valve 66 as a representative example.

It should be noted that the second apparatus does not assume that both of the intake air changeover valve 64 and the exhaust gas changeover valve 66 become abnormal at the same time, according to the multiple-abnormality-exclusive-assumption. Further, it can be determined that the exhaust gas bypass valve 68 is normal when it is determined that "either one of the intake air changeover valve 64 and the exhaust gas changeover valve 66 is abnormal", according to the multiple-abnormality-exclusive-assumption.

<The Description Order>

(Case 2-1) The intake air changeover valve 64 is abnormal, but the exhaust gas changeover valve 66 is normal.

(Case 2-2) The exhaust gas changeover valve 66 is abnormal, but the intake air changeover valve 64 is normal.

<Description>

(Case 2-1) The case where the intake air changeover valve 64 is abnormal but the exhaust gas changeover valve 66 is normal.

The intake air changeover valve 64 must be in "the fully close" state in a case that the engine 10 is operated in the second operating area AR2 (refer to FIG. 3(B)). Accordingly, the intake air changeover valve 64 is in a state in which the intake air changeover valve 64 opens (i.e., the intake air changeover valve abnormal open state, as described above) if the intake air changeover valve 64 is abnormal when the engine 10 is operated in the operating area, in the same way as the Case 1-2 described above.

In this case, the intake air changeover valve 64 is in the intake air changeover valve abnormal open state, and therefore the high pressure compressor 61a can not compress the new air In, as shown in FIG. 5. On the other hand, the exhaust gas bypass valve 68 is normal, and therefore the low pressure compressor 62a can compress the new air In regardless of the condition of the intake air changeover valve 64. That is, "only the low pressure compressor 62a" can supercharge the engine 10 in this case.

Hereinafter, a ratio of "a pressure of the new air In immediately after passing through the high pressure compressor 61a" to "a pressure of the new air In immediately before being introduced into the high pressure compressor 61a" will be referred to as "a pressure ratio of the high pressure supercharger", for convenience. Further, a ratio of "a pressure of the new air In immediately after passing through the low pressure compressor 62a" to "a pressure of the new air In immediately before being introduced into the low pressure compressor 62a" will be referred to as "a pressure ratio of the low pressure supercharger", for convenience. It should be noted that the supercharging pressure Pim can be obtained by multiplying "a product of the pressure ratio of the high pressure supercharger and the pressure ratio of the low pressure supercharger" by "a pressure of an air introduced into the engine from an outside of the engine (the atmospheric pressure, in general)".

Now, it is assumed that the opening degree of the exhaust gas changeover valve 66 is kept at a predetermined opening degree Oecv1 in a period before the opening-degree-increase-instruction is provided to the exhaust gas changeover valve 66. In this case, the new air In is not compressed by the high pressure compressor 61a as described above, and therefore the pressure ratio of the high pressure supercharger is "1". Accordingly, the supercharging pressure Pim approximately coincides with a value obtained by multiplying the pressure ratio of the low pressure supercharger by the atmospheric pressure.

When the second apparatus provides to the exhaust gas changeover valve 66 an instruction to change (increase) the opening degree of the exhaust gas changeover valve 66, the opening degree of the exhaust gas changeover valve 66 changes in accordance with this instruction, since the exhaust gas changeover valve 66 is normal. Consequently, the opening degree of the exhaust gas changeover valve 66 changes (increases) from the opening degree Oecv1 to an opening degree Oecv2.

The energy of the exhaust gas Ex introduced into the high pressure turbine 61b decreases when the opening degree of the exhaust gas changeover valve 66 increases, as described with reference to FIG. 6 (refer to the Case 1-3). However, the pressure ratio of the high pressure supercharger does not change in this case, since the high pressure compressor 61a can not compress the new air In. That is, the pressure ratio of the high pressure supercharger is kept at "1".

On the other hand, the amount of the exhaust gas Ex directly introduced into the low pressure turbine 62b increases when the opening degree of the exhaust gas changeover valve 66 increases, and therefore the energy of the exhaust gas Ex introduced into the low pressure turbine 62b increases. Accordingly, the pressure ratio of the low pressure supercharger increases.

Consequently, the supercharging pressure Pim "increases" when the opening degree of the exhaust gas changeover valve 66 is "increased". It can be understood from the above descriptions that the supercharging pressure Pim "decreases" when the opening degree of the exhaust gas changeover valve 66 is "decreased" to the contrary.

(Case 2-2) The case where the exhaust gas changeover valve 66 is abnormal but the intake air changeover valve 64 is normal.

As described above, it is determined that "either one of the exhaust gas changeover valve 66 and the intake air changeover valve 64 is abnormal" in the following two cases: a case where the intake air changeover valve 64 is in "the intake air changeover valve abnormal open state"; and a case where the exhaust gas changeover valve 66 is in "the large-opening-degree abnormal open state". Accordingly, if the exhaust gas changeover valve 66 is abnormal when it is determined that "either one of the exhaust gas changeover valve 66 and the intake air changeover valve 64 is abnormal", the exhaust gas changeover valve 66 is in "the large-opening-degree abnormal open state" (refer to the Case 1-2 and the Case 1-3 described above). It should be noted that the opening degree of the exhaust gas changeover valve 66 is "an opening degree within the first compressor un-drivable range" in this case.

There is a possibility that the exhaust gas changeover valve 66 is fixedly adhered at an opening degree within the first compressor un-drivable range, when the exhaust gas changeover valve 66 is in "the large-opening-degree abnormal open state". On the other hand, there is another possibility that the exhaust gas changeover valve 66 is in a state where the exhaust gas changeover valve 66 can be operated only within the first compressor un-drivable range (in other words, in a state where the opening degree of the exhaust gas changeover valve 66 is limited to be within the first compressor un-drivable range) in this case. Details of the above two possibilities will be described below, separately.

In the case where the exhaust gas changeover valve 66 is fixedly adhered, the opening degree of the exhaust gas changeover valve 66 does not change even when the opening-degree-change-instruction is provided to the exhaust gas changeover valve 66. Therefore, both of the pressure ratio of the high pressure supercharger and the pressure ratio of the low pressure supercharger do not change in this case. Accordingly, the supercharging pressure Pim does not change.

To the contrary, in the case where the opening degree of the exhaust gas changeover valve 66 is limited to be within the first compressor un-drivable range, the opening degree of the exhaust gas changeover valve 66 can change when the opening-degree-change-instruction is provided to the exhaust gas changeover valve 66. However, the opening degree of the exhaust gas changeover valve 66 is limited to be within the first compressor un-drivable range, and therefore a change amount of the flow rate of the exhaust gas Ex (energy of the exhaust gas Ex) introduced into the low pressure compressor 62a is small, even if the opening degree of the exhaust gas changeover valve 66 changes.

In the meantime, when the opening degree of the exhaust gas changeover valve 66 changes, the energy of the exhaust gas Ex introduced into the high pressure compressor 61a also changes. However, the exhaust gas changeover valve 66 is in "the large-opening-degree abnormal open state", and therefore the high pressure compressor 61a does not supercharge the engine 10, as shown in FIG. 7. In other words, the energy of the exhaust gas Ex introduced into the high pressure compressor 61a is not used as a work to compress the new air In. Accordingly, the exhaust gas Ex introduced into the high pressure compressor 61a passes through the high pressure compressor 61a substantially without losing the energy, and heads to the low pressure compressor 62a.

As a result of the above, the energy of the exhaust gas Ex introduced into the exhaust gas changeover valve 66 does not substantially change, even if the opening degree of the exhaust gas changeover valve 66 changes within the first compressor un-drivable range. Accordingly, the pressure ratio of the low pressure supercharger does not substantially change.

Further, the high pressure compressor 61a can not compress the new air In in this case, and therefore the pressure ratio of the high pressure supercharger is kept at "1" when (between before and after) the opening-degree-change-instruction is provided to the exhaust gas changeover valve 66.

Accordingly, the supercharging pressure Pim does not change even if the opening degree of the exhaust gas changeover valve 66 changes, when the opening degree of the exhaust gas changeover valve 66 is limited to be within the first compressor un-drivable range.

As described above, when the opening-degree-change-instruction is provided to the exhaust gas changeover valve 66 in the case where the exhaust gas changeover valve 66 is abnormal, the supercharging pressure Pim does not substantially change, regardless of whether or not the exhaust gas changeover valve 66 can be operated. To the contrary, it can be understood from the above descriptions that the supercharging pressure Pim does not subsequently change when an instruction to "decrease" the opening degree of the exhaust gas changeover valve 66 in this case.

Accordingly, it can be determined that "the intake air changeover valve 64 is abnormal", if the supercharging pressure Pim changes when the second apparatus provides to the exhaust gas changeover valve 66 an instruction to change the opening degree of the exhaust gas changeover valve 66 (in other words, the absolute value of the difference between the supercharging pressure Pim0 and the supercharging pressure Pim1 is larger than or equal to a predetermined value). To the contrary, it can be determined that "the exhaust gas changeover valve 66 is abnormal", if the supercharging pressure Pim does not change when the instruction is provided to the exhaust gas changeover valve 66 (in other words, the absolute value of the difference between the supercharging pressure Pim0 and the supercharging pressure Pim1 is smaller than the predetermined value) (refer to the abnormality determination method 3 described above).

<An Actual Operation>

Next will be described an actual operation of the second apparatus.

Figure 13:
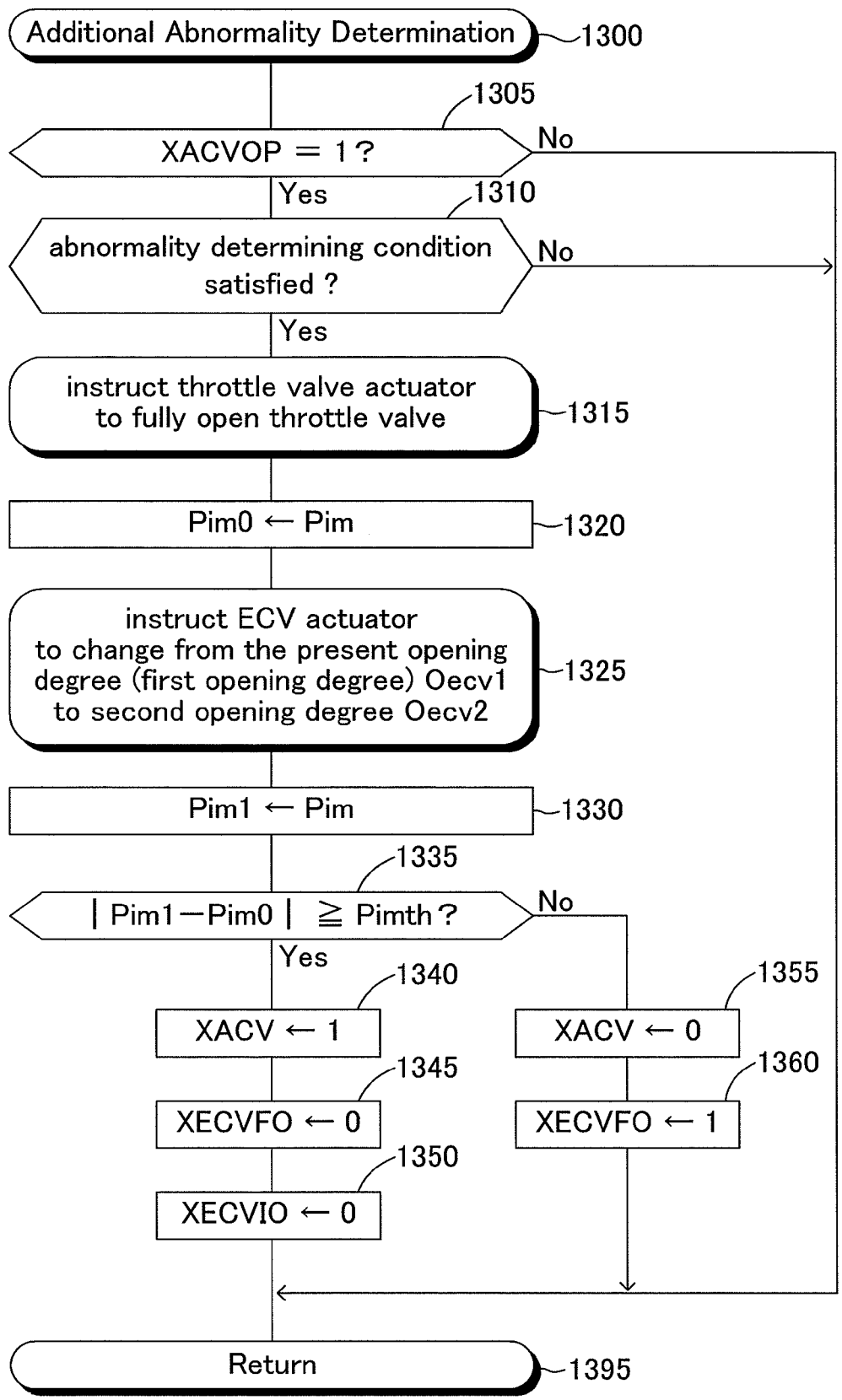
FIG. 13 is a flowchart showing a routine executed by a CPU of the control apparatus according to a second embodiment of the present invention.
Figure 14:
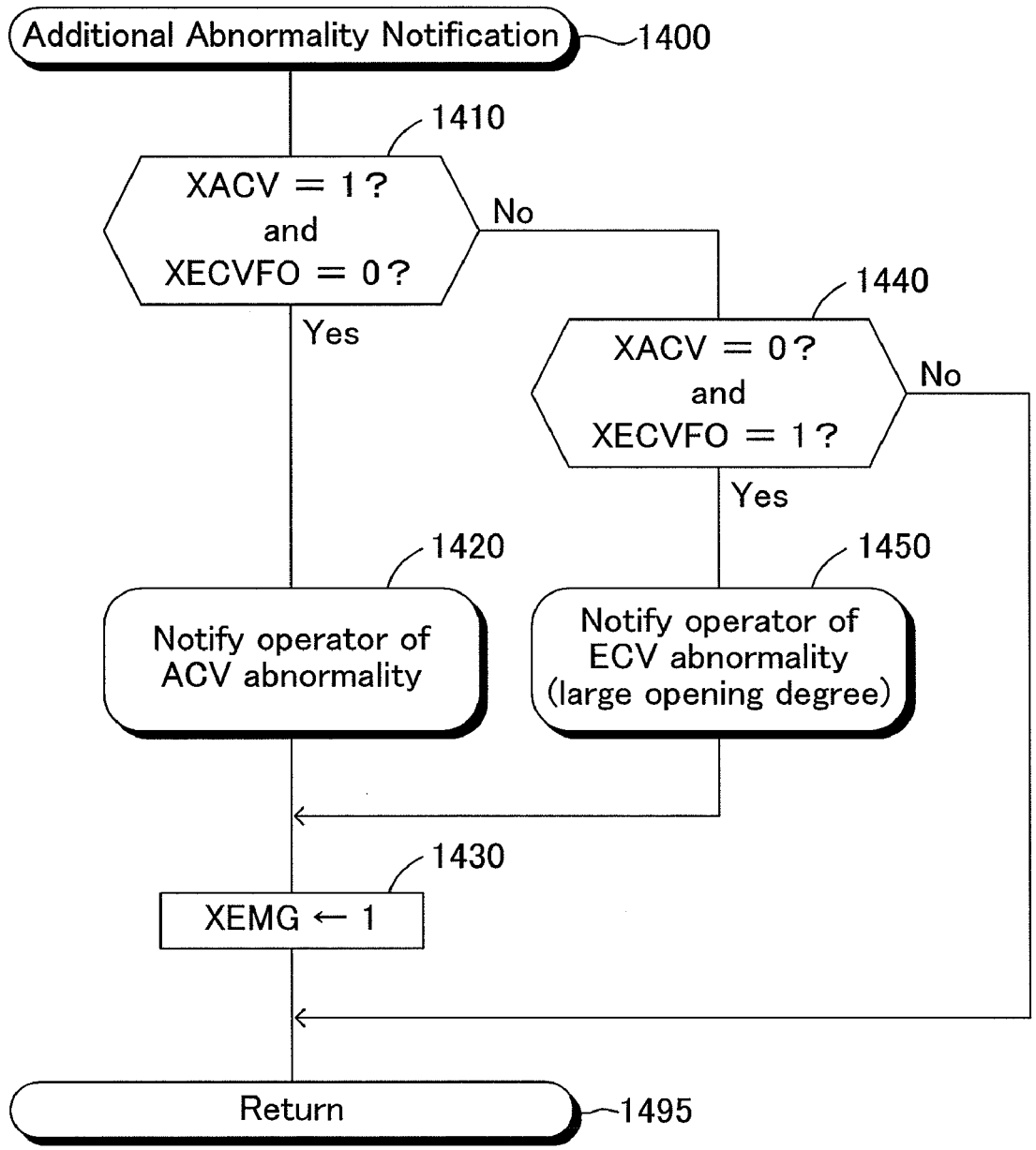
FIG. 14 is a flowchart showing a routine executed by a CPU of the control apparatus according to the second embodiment of the present invention.

The second apparatus is different from the first apparatus only in a point that the second apparatus execute routines shown by flowcharts in FIG. 13 and FIG. 14 in addition to the routines shown by the flowcharts in FIG. 9 to FIG. 12. Accordingly, an actual operation of the second apparatus, particularly regarding this difference, will be described below.

Figure 9:
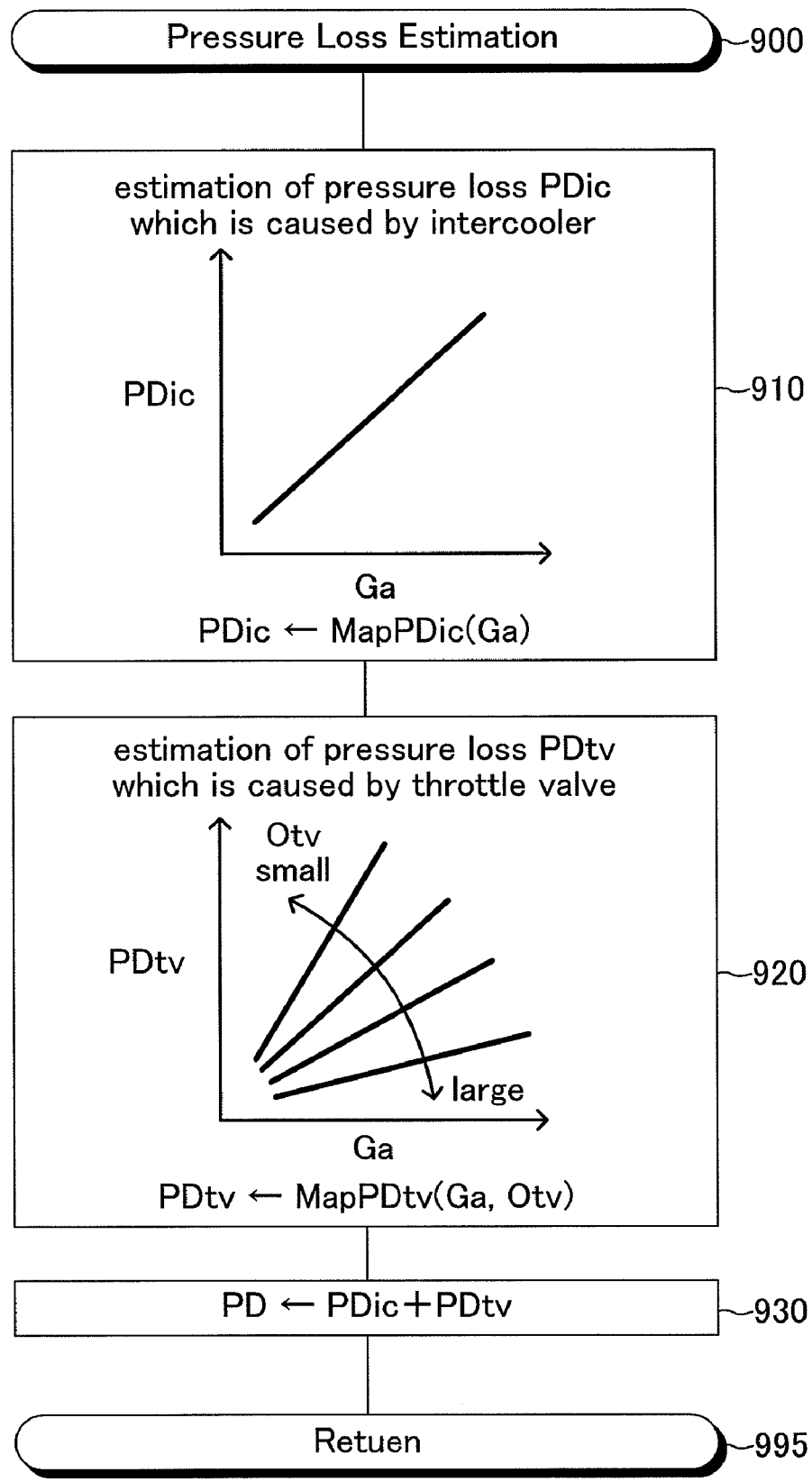
FIG. 9 is a flowchart showing a routine executed by a CPU of the control apparatus according to the first embodiment of the present invention.

The second apparatus repeatedly executes the routines shown by the flowcharts in FIG. 9 to FIG. 11 every elapse of a predetermined period, and executes the routine shown by the flowchart in FIG. 12 every time when a crank angle of any one of the cylinders coincides with a predetermined crank angle θg, in the same way as the first apparatus. Hereinafter, it will be assumed, in the routine shown in FIG. 10, that the value of the intake-air-changeover-valve-open-flag XACVOP is set at "1" (i.e., the CPU 81 makes a "No" determination at step 1018, and therefore proceeds to step 1026 through step 1022 and step 1024).

It should be noted that, when the CPU 81 executes the routine shown in FIG. 11 at a predetermined timing, a warning notifying the operator of the engine 10 that "either one of the intake air changeover valve 64 and the exhaust gas changeover valve 66 is abnormal" is provided (refer to step 1105 and step 1125 in FIG. 11).

The CPU 81 executes "an additional abnormality determination routine" shown by a flowchart in FIG. 13 every elapse of a predetermined period. The CPU 81 determines whether or not which of the intake air changeover valve 64 and the exhaust gas changeover valve 66 is abnormal by this routine.

Specifically, the CPU 81 starts executing the routine from step 1300 in FIG. 13, and proceeds to step 1305 at which the CPU 81 determines whether or not the value of the intake-air-changeover-valve-open-flag XACVOP is "1". According to the assumption described above, the value of the intake-air-changeover-valve-open-flag XACVOP is "1" at the present time, and therefore the CPU 81 makes a "Yes" determination at step 1305 to proceed to step 1310.

At step 1310, the CPU 81 determines whether or not "an abnormality determining condition for determining which of the intake air changeover valve 64 and the exhaust gas changeover valve 66 is abnormal" is satisfied. This abnormality determining condition is a condition which is satisfied when "the engine 10 is operated in the second operating area AR2". That is, this abnormality determining condition is satisfied when the engine 10 is operated in an operating area where both of "the high pressure supercharger 61 (the first supercharger) and the low pressure supercharger 62 (the second supercharger)" can supercharges the engine 10.

The abnormality determining condition may include a condition that "the determination whether or not the control valves are abnormal has not been performed yet after a start of a current operation (i.e., after an ignition key switch is turned ON from OFF)".

When the abnormality determining condition described above is not satisfied at the present time, the CPU 81 makes a "No" determination at step 1310 and proceeds to step 1315. Hereinafter, descriptions will be continued based on an assumption that the abnormality determining condition is satisfied at the present time.

At step 1315, the CPU 81 instructs the throttle valve actuator 33a to fully open the opening degree of the throttle valve 33. Subsequently, the CPU 81 proceeds to step 1320 at which the CPU 81 obtains the supercharging pressure Pim at the present time and at which the CPU 81 stores the obtained supercharging pressure Pim as "the referential supercharging pressure Pim0 serving as the first value", and proceeds to step 1325. This timing will be referred to as "a first timing", and the opening degree of the exhaust gas changeover valve 66 at this timing will be referred to as "a first opening degree Oecv1", for convenience Subsequently, at step 1325, the CPU 81 provides to the exhaust gas changeover valve actuator 66a an instruction to change the opening degree of the exhaust gas changeover valve 66 to a second opening degree Oecv2. The CPU 81 waits until a predetermined time elapses. The second opening degree Oecv2 is set at a value at which the supercharging pressure Pim changes by a sufficiently large amount when actual opening degree of the exhaust gas changeover valve 66 changes from the first opening degree Oecv1 to the second opening degree Oecv2. For example, if the first opening degree Oecv1 is smaller than ½ (a half) of "a fully-opened-opening-degree which is the maximum opening degree of the exhaust gas changeover valve 66", the CPU 81 sets the second opening degree Oecv2 at "an opening degree larger than the first opening degree Oecv1 (for example, the fully-opened-opening-degree)". On the other hand, if the first opening degree Oecv1 is larger than or equal to the ½ of "the fully-opened-opening-degree of the exhaust gas changeover valve 66", the CPU 81 sets the second opening degree Oecv2 at "an opening degree smaller than the first opening degree Oecv1 (for example, the fully-closed-opening-degree)". Hereinafter, the timing at which a predetermined time has elapsed since the timing at which the instruction to change the opening degree is provided to the exhaust gas changeover valve 66 will be referred to as "a second timing" for convenience.

When the second timing comes, the CPU 81 proceeds to step 1330 at which the CPU 81 obtains the supercharging pressure Pim at the second timing, and stores the obtained supercharging pressure Pim as "a supercharging-pressure-for-a-determination Pim1 serving as a second value". Subsequently, the CPU 81 proceeds to step 1335 at which the CPU 81 determines whether or not an absolute value of a difference between the supercharging-pressure-for-a-determination Pim1 and the referential supercharging pressure Pim0 is larger than or equal to a threshold supercharging pressure Pimth. The threshold supercharging pressure Pimth is also referred to as a threshold change amount, and is set at "the minimum value of the absolute value of the difference between the referential supercharging pressure Pim0 and the supercharging-pressure-for-a-determination Pim1 which is obtained when the exhaust gas changeover valve 66 is normal".

(Assumption F) The intake air changeover valve 64 is abnormal, but the exhaust gas changeover valve 66 is normal.

In this case, the supercharging pressure Pim increases by the threshold supercharging pressure Pimth or more when the opening degree of the exhaust gas changeover valve 66 increases, but the supercharging pressure Pim decreases by the threshold supercharging pressure Pimth or less when the opening degree of the exhaust gas changeover valve 66 decreases.

Accordingly, the CPU 81 makes a "Yes" determination at step 1335, and proceeds to step 1340 at which the CPU 81 sets the value of the intake-air-changeover-valve-abnormality-flag XACV at "1", according to the Assumption F. Subsequently, the CPU 81 proceeds to step 1345 at which the CPU 81 sets the value of the exhaust-gas-changeover-valve-large-opening-degree-abnormality-flag XECVFO at "0", and sets the value of the exhaust-gas-changeover-valve-small-opening-degree-abnormality-flag XECVIO at "0" at the following step 1350. Thereafter, the CPU 81 proceeds to step 1395 at which the CPU 81 ends the present routine tentatively.

Further, the CPU 81 executes "an additional abnormality notification routine" shown by a flowchart in FIG. 14 every elapse of a predetermined period. The CPU 81 notifies the operator of the engine 10 which of the intake air changeover valve 64 and the exhaust gas changeover valve 66 is abnormal by this routine.

Specifically, the CPU 81 starts executing the routine from step 1400 in FIG. 14 at a predetermined timing, and proceeds to step 1410 at which the CPU 81 determines whether or not both of the value of the intake-air-changeover-valve-abnormality-flag XACV is "1" and the value of the exhaust-gas-changeover-valve-large-opening-degree-abnormality-flag XECVFO is "0". The value of the intake-air-changeover-valve-abnormality-flag XACV is "1" and the value of the exhaust-gas-changeover-valve-large-opening-degree-abnormality-flag XECVFO is "0" at the present time, and therefore the CPU 81 makes a "Yes" determination at step 1410, and proceeds to step 1420 at which the CPU 81 notifies the operator of the engine 10 that "the intake air changeover valve 64 is abnormal". It should be noted that this notification is performed by turning on a warning lamp which is not shown, or the like, in the same way as the first apparatus. Thereafter, the CPU 81 proceeds to step 1430 at which the CPU 81 sets the value of the abnormality-occurrence-flag XEMG at "1", and proceeds to step 1495 at which the CPU 81 ends the present routine tentatively.

As described above, when the intake air changeover valve 64 is abnormal (i.e., the value of the intake-air-changeover-valve-abnormality-flag XACV is "1"), a warning notifying the operator that "the intake air changeover valve 64 is abnormal" is provided.

Further, when the crank angle of any one of the cylinders coincides with the predetermined crank angle θg, the CPU 81 starts executing the routine from step 1200 in FIG. 12, and proceeds to step 1295, through step 1210, step 1240, and step 1230 in this order, in the same way as the case that the Assumption B is satisfied in the first apparatus. At step 1295 the CPU 81 ends the present routine tentatively. Thereby, "the emergency operation" is performed.

As described above, when the intake air changeover valve 64 is abnormal, a warning notifying the operator of the engine 10 that "the intake air changeover valve 64 is abnormal" is provided, and the emergency operation is performed.

(Assumption G) The exhaust gas changeover valve 66 is abnormal, but the intake air changeover valve 64 is normal.

In this case, the supercharging pressure Pim does not subsequently change even if the instruction to change the opening degree of the exhaust gas changeover valve 66 is provided to the exhaust gas changeover valve actuator 66a, and therefore the absolute value of the difference between the supercharging-pressure-for-a-determination Pim1 and the referential supercharging pressure Pim0 is smaller than the threshold supercharging pressure Pimth.

Specifically, the CPU 81 starts executing the routine from step 1300 in FIG. 13, and proceeds to step 1335 through step 1305 to step 1330 if the abnormality determining condition is satisfied. According to the Assumption G, the CPU 81 makes a "No" determination at step 1335 and proceeds to step 1355 at which the CPU 81 sets the value of the intake-air-changeover-valve-abnormality-flag XACV at "0". Subsequently, the CPU 81 sets the value of the exhaust-gas-changeover-valve-large-opening-degree-abnormality-flag XECVFO at "1" in the following step 1360. Thereafter, the CPU 81 proceeds to step 1395 at which the CPU 81 ends the present routine tentatively.

Further, the CPU 81 starts executing the routine from step 1400 in FIG. 14, and proceeds to step 1410. The value of the intake-air-changeover-valve-abnormality-flag XACV is "0" and the value of the exhaust-gas-changeover-valve-large-opening-degree-abnormality-flag XECVFO is "1" at the present time, and therefore the CPU 81 makes a "No" determination at step 1410, and proceeds to step 1440 at which the CPU 81 determines whether or not both conditions are satisfied, one condition being satisfied when the value of the intake-air-changeover-valve-abnormality-flag XACV is "0", and the other condition being satisfied when the value of the exhaust-gas-changeover-valve-large-opening-degree-abnormality-flag XECVFO is "1".

As described above, the value of the intake-air-changeover-valve-abnormality-flag XACV is "0" and the value of the exhaust-gas-changeover-valve-large-opening-degree-abnormality-flag XECVFO is "1" at the present time, and therefore the CPU 81 makes a "Yes" determination at step 1440, and proceeds to step 1450 at which the CPU 81 notifies the operator of the engine 10 that "the exhaust gas changeover valve 66 is abnormal". This notification is performed by turning on a warning lamp which is not shown, or the like, in the same way as the above. Subsequently, the CPU 81 proceeds to step 1430 at which the CPU 81 sets the value of the abnormality-occurrence-flag XEMG at "1", and proceeds to step 1495 at which the CPU 81 ends the present routine tentatively.

It should be noted that the CPU 81 makes a "No" determination at step 1440, if the above conditions are not satisfied when the determination at step 1440 is performed. Subsequently, the CPU 81 directly proceeds to step 1495 at which the CPU 81 ends the present routine tentatively. Therefore, the warning to the operator in this routine is not performed in this case. It may occurs such a situation that the above conditions are not satisfied when the determination at step 1440 is performed, for example, in a case that the value of the exhaust-gas-changeover-valve-large-opening-degree-abnormality-flag XECVFO is set at "0" (step 1034 in FIG. 10) and furthermore the value of the intake-air-changeover-valve-abnormality-flag XACV is set at "0" (step 1040 in FIG. 10) due to "Yes" determination at step 1020 in FIG. 10.

As described above, when the exhaust gas changeover valve 66 is abnormal (the large-opening-degree abnormal open state) (i.e., when the value of the exhaust-gas-changeover-valve-large-opening-degree-abnormality-flag XECVFO is "1"), the warning that "the exhaust gas changeover valve 66 is abnormal (the large-opening-degree abnormal opening state)" is notified to the operator of the engine 10.

Further, when the crank angle of any one of the cylinders coincides with the predetermined crank angle 8g, the CPU 81 starts executing the routine from step 1200 in FIG. 12, and proceeds to step 1295 through step 1210, step 1240, and step 1230 in this order, in the same way as the Assumption F is satisfied. At step 1295, the CPU 81 ends the present routine tentatively. Thereby, "the emergency operation" is performed.

That is, when the exhaust gas changeover valve 66 is abnormal, the warning that "the exhaust gas changeover valve 66 is abnormal" is notified to the operator of the engine 10 and the emergency operation is performed.

As described above, the second apparatus determines which of the first control valve 66 and the second control valve 64 is abnormal by the abnormality determination method 3.

That is, in the second apparatus, the abnormality-determining-means is configured in such a manner that:

the abnormality-determining-means obtains, as a first value Pim0, the supercharging-pressure-corresponding-value (the supercharging pressure Pim, in the above embodiment) which becomes larger as the obtained supercharging pressure Pim becomes larger (refer to step 1320 in FIG. 13);

the abnormality-determining-means operates, at "a first timing after the timing at which the abnormality-determining-means obtains the first value Pim0", the first control valve 66 so that the opening degree of the first control valve 66 becomes equal to "a second opening degree Oecv2, which is different from a first opening degree Oecv1, which is an opening degree of the first control valve 66 when the abnormality-determining-means obtains the first value Pim0" (refer to step 1320 in FIG. 13);

the abnormality-determining-means obtains, as a second value Pim1, the supercharging-pressure-corresponding-value which is obtained at a second timing at which a predetermined period elapses after the first timing (refer to step 1330 in FIG. 13), during a period in which an abnormality determining condition including a condition that the engine 10 is operated in the second operating area AR2 is satisfied (the period in which the CPU 81 makes a "Yes" determination at step 1310 in FIG. 13) when the supercharging-pressure-abnormal-state occurs (when the CPU 81 makes a "Yes" determination at step 1004 in FIG. 10) and the first compressor-downstream-side-pressure Pfcdown (=Pim+PD) is smaller than or equal to the first threshold pressure (Pc-MG) (when the CPU 81 makes a "No" determination at step 1018 in FIG. 10);

and, the abnormality-determining-means determines that "the first control valve 66 is normal and the second control valve 64 is abnormal" (refer to step 1340, step 1345, and step 1350 in FIG. 13) if the absolute value of a change amount of the supercharging-pressure-corresponding-value which is the difference of the second value Pim1 and the first value Pim0 is larger than or equal to a predetermined threshold change amount Pimth (if the CPU 81 makes a "Yes" determination at step 1335 in FIG. 13); and the abnormality-determining-means determines that "the first control valve 66 is abnormal and the second control valve 64 is normal" (refer to step 1355 and step 1360 in FIG. 13) if the absolute value of the change amount of the supercharging-pressure-corresponding-value is smaller than the threshold change amount Pimth (if the CPU 81 makes a "No" determination at step 1335 in FIG. 13).

As described above, the second apparatus can determine which of the first control valve 66 and the second control valve 64 is abnormal, when it is determined that "either one of the first control valve 66 and the second control valve 64 is abnormal".

The second apparatus can determine that the opening degree of the second control valve 64 is "such an opening degree that the second control valve 64 can not shut the second passage section 63", when the abnormality-determining-means determines that "the first control valve 66 is normal and the second control valve 64 is abnormal", as described above (refer to step 1340 in FIG. 13).

Further, the second apparatus can determine that the opening degree of the first control valve 66 is "an opening degree: which is different from an opening degree at which the first control valve 66 is located when the first control valve 66 is normal, and which is within the range from the threshold opening degree to the fully-opened-opening-degree for completely opening the first passage section 65 (i.e., the large-opening-degree abnormal opening state)", when the abnormality-determining-means determines that "the first control valve 66 is abnormal, and the second control valve 64 is normal" (refer to step 1360).

Further, in the second apparatus, the abnormality-determining-means is configured so as to obtain the supercharging pressure Pim as the supercharging-pressure-corresponding-value (refer to step 1320 and step 1330).

In the meantime, in "both" of the first apparatus and the second apparatus, the control-valve-operating-means is configured in such a manner that the control-valve-operating-means operates the first control valve 66 so that the opening degree of the first control valve 66 becomes a fully-closed-opening-degree when the engine 10 is operated in the first operating area AR1 (refer to FIG. 3(B)).

Further, in both of the first apparatus and the second apparatus, when the engine 10 is operated in the second operating area AR2, the first control valve 66 is configured so as to vary the flow passage area of the first passage section 65 in response to an instruction signal, the control-valve-operating-means or the abnormality-determining-means is configured so as to change the opening degree of the first control valve 66 by sending the instruction signal to a first control valve driving means (the exhaust gas changeover valve actuator 66a) (refer to FIG. 3(B)).

The present invention is not limited to the above embodiments, but may be modified as appropriate without departing from the scope of the invention.

For example, in the first embodiment and the second embodiment, the between-compressors-pressure sensor 72 is disposed in the intake air passage between the first compressor and the second compressor. However, the between-compressors-pressure sensor 72 may be disposed in the second passage section 63 at an upstream side of the second control valve 64.

Further, in the second embodiment, "the supercharging pressure", which is the pressure of air in the intake air passage at a downstream side of the first compressor, is obtained as "the supercharging-pressure-corresponding-value". However, the second apparatus may be configured so as to obtain "the new air amount", which is an amount of the air introduced into the engine, as the supercharging-pressure-corresponding-value. Still further, the supercharging pressure which is obtained as the supercharging-pressure-corresponding-value may be a pressure of an air in the intake air passage between the intercooler 34 and the throttle valve 33.

Additionally, in the second embodiment, such an instruction that the second opening degree Oecv2 is always larger than "the first opening degree Oecv1, which is the opening degree at the present time" (for example, the second opening degree may coincides with the fully-opened-opening-degree) may be provided toward the first control valve, if the first opening degree Oecv1 is always sufficiently small (that is, the abnormality determining condition of step 1310 in FIG. 13 includes a condition that the engine 10 is operated in such an operating condition that the first opening degree Oecv1 is sufficiently small) when an instruction for the first control valve (the exhaust gas changeover valve 66) to change the opening degree Oecv of the first control valve is provided (refer to step 1325 in FIG. 13).

In the second embodiment, such an instruction that the second opening degree Oecv2 is always smaller than "the first opening degree Oecv1, which is the opening degree at the present time" (for example, the second opening degree may coincides with the fully-closed-opening-degree) may be provided toward the first control valve, if the first opening degree Oecv1 is always sufficiently large (that is, the abnormality determining condition of step 1310 in FIG. 13 includes a condition that the engine 10 is operated in such an operating condition that the first opening degree Oecv1 is sufficiently large), in the same way as the above.

Further, in the second embodiment, the abnormality determining condition, which the apparatus determines whether or not is satisfied at step 1310 in FIG. 13, may include a condition that a required torque of the engine 10 is smaller than or equal to a predetermined threshold torque (that is, the engine 10 is operated in a deceleration state). It should be noted that the condition that "the engine 10 is operated in the second operating area AR2 (i.e., the operation area where the new air amount Ga is such an amount that both of the first compressor 61 and the second compressor 62 can be driven)" needs to be satisfied, when the engine 10 is operated in this deceleration state.

The output torque variation of the engine can be unlikely that the operator realizes such a torque variation as "the unexpected/unintentional torque variation" by changing the opening degree of the first control valve 66 when the engine 10 is operated in "the deceleration state". As a result, it can be determined which of the first control valve 66 and the second control valve 64 is abnormal while retaining an excellent comfortability in riding.

The required torque can be determined based on "the opening degree Accp of the accelerator pedal", "the engine rotational speed NE", and "the fuel supply amount Q", and so on. In other words, the condition described above may be a condition which is satisfied when the opening degree Accp of the accelerator pedal is smaller than or equal to a predetermined threshold opening degree Accpth, or may be a condition which is satisfied when an operating condition determined by the opening degree Accp of the accelerator pedal and the engine rotational speed NE is in "a predetermined deceleration area defined based on the opening degree Accp of the accelerator pedal and the engine rotational speed NE", or may be a condition which is satisfied when the fuel supply amount Q determined based on the opening degree Accp of the accelerator pedal and the engine rotational speed NE, and so on, is smaller than or equal to "a predetermined fuel supply amount threshold representing the deceleration condition".

Further, in the second embodiment, the apparatus is configured in such a manner that the opening degree of the throttle valve 33 is set at the fully-opened-opening-degree at a timing before the opening degree of the first control valve 66 is changed (refer to step 1315 in FIG. 13). However, in the second embodiment, it is not always necessary to set the opening degree of the throttle valve 33 at the fully-opened-opening-degree when the opening degree of the first control valve 66 is changed.

The invention claimed is:

1. An apparatus for determining an abnormality of a control valve, the apparatus being applied to an internal combustion engine having:

a first supercharger comprising, a first turbine disposed in an exhaust gas passage of the engine, and a first compressor disposed in an intake air passage of the engine and driven by the first turbine which is driven by an exhaust gas flowing in the exhaust gas passage;

a second supercharger comprising, a second turbine disposed in the exhaust gas passage at a downstream side of the first turbine, and a second compressor disposed in the intake air passage at an upstream side of the first compressor and driven by the second turbine which is driven by the exhaust gas;

a first passage section whose one end is connected to the exhaust gas passage at an upstream side of the first turbine and whose the other end is connected to the exhaust gas passage between the first turbine and the second turbine;

a first control valve, disposed in the first passage section, for varying a flow passage area of the first passage section depending on an opening degree of the first control valve;

a second passage section whose one end is connected to the intake air passage between the first compressor and the second compressor and whose the other end is connected to the intake air passage at the downstream side of the first compressor; and a second control valve, disposed in the second passage section: for opening the second passage section so as to allow an air to pass through the second passage section when a pressure of an air in the second passage section at an upstream side of the second control valve is larger than a pressure of an air in the second passage section at the downstream side of the second control valve by a first pressure or more; and for closing the second passage section so as not to allow an air to pass through the second passage section when the pressure of the air in the second passage section at an upstream side of the second control valve is not larger than the pressure of the air in the second passage section at the downstream side of the second control valve by the first pressure or more, the apparatus for determining an abnormality of a control valve comprising:

control-valve-operating-means for operating the first control valve in such a manner that the first compressor compresses an air introduced into the first compressor and discharges the compressed air, when the engine is operated in a first operating area in which a new air amount which is an amount of an air introduced into a combustion chamber from an outside of the engine is smaller than or equal to a first threshold new air amount;

pressure-obtaining-means for obtaining: a between-compressors-pressure which is a pressure of an air in the intake air passage between the first compressor and the second compressor; a first-compressor-downstream-side-pressure which is a pressure of an air in the intake air passage at a downstream side of the first compressor and at an upstream side of a pressure loss generating member disposed between the first compressor and the combustion chamber; and a supercharging pressure which is a pressure of an air in the intake air passage at a downstream side of the pressure loss generating member;

abnormality-determining-means for determining, if a supercharging-pressure-abnormal-state which is a state where the obtained supercharging pressure is smaller than a referential supercharging pressure determined based on an operating condition of the engine by a second pressure or more occurs when the engine is operated in the first operating area, that: the first control valve is abnormal and the second control valve is normal if the first-compressor-downstream-side-pressure is larger than a first threshold pressure which is larger than or equal to the between-compressors-pressure; and either one of the first control valve and the second control valve is abnormal if the first-compressor-downstream-side-pressure is smaller than or equal to the first threshold pressure.

2. The apparatus for determining an abnormality of a control valve of an internal combustion engine according to claim 1, wherein the pressure-obtaining-means is configured so as to: estimate an amount of a pressure loss generated by the pressure loss generating member; obtain the supercharging pressure by actually detecting the supercharging pressure; and obtain a sum of the estimated amount of the pressure loss and the detected supercharging pressure as the first-compressor-downstream-side-pressure.

3. The apparatus for determining an abnormality of a control valve of an internal combustion engine according to claim 1, wherein the engine further has:

a third passage section whose one end is connected to the exhaust gas passage between the first turbine and the second turbine and whose the other end is connected to the exhaust gas passage at a downstream side of the second turbine; and a third control valve, disposed in the third passage section, for varying a flow passage area of the third passage section depending on an opening degree of the third control valve, the control-valve-operating-means is configured in such a manner that; the control-valve-operating-means operates the third control valve so as not to allow the exhaust gas to pass through the third passage section when the engine is operated in the first operating area or in a second operating area in which the new air amount is larger than the first threshold new air amount and smaller than or equal to a second threshold new air amount which is larger than the first threshold new air amount; and the control-valve-operating-means operates the third control valve so as to allow the exhaust gas to pass through the third passage section when the engine is operated in a third operating area in which the new air amount is larger than the second threshold new air amount, the abnormality-determining-means is configured so as to determine, if the supercharging-pressure-abnormal-state occurs when the engine is operated in the second operating area, that: the third control valve is normal if the between-compressors-pressure is larger than or equal to a predetermined second threshold pressure; and the third control valve is abnormal if the between-compressors-pressure is smaller than the second threshold pressure.

4. The apparatus for determining an abnormality of a control valve of an internal combustion engine according to claim 3, wherein the abnormality-determining-means is configured so as to infer that the first control valve and the second control valve are normal if the abnormality-determining-means determines that the third control valve is abnormal.

5. The apparatus for determining an abnormality of a control valve of an internal combustion engine according to claim 3, wherein the control-valve-operating-means is configured in such a manner that the control-valve-operating-means operates the first control valve so as to compress the air introduced into the first compressor and discharge the compressed air when the engine is operated in the second operating area, the abnormality-determining-means is configured so as to determine, if the abnormality-determining-means determines that the third control valve is normal when the engine is operated in the second operating area, that: the first control valve is abnormal and the second control valve is normal if the first-compressor-downstream-side-pressure is larger than the first threshold pressure; and either one of the first control valve and the second control valve is abnormal if the first-compressor-downstream-side-pressure is smaller than or equal to the first threshold pressure.

6. The apparatus for determining an abnormality of a control valve of an internal combustion engine according to claim 1, wherein the abnormality-determining-means is configured so as to:
obtain, as a first value, the supercharging-pressure-corresponding-value which becomes larger as the obtained supercharging pressure becomes larger;
operate the first control valve, at a first timing after the timing at which the abnormality-determining-means obtains the first value, in such a manner that the opening degree of the first control valve coincides with a second opening degree different from a first opening degree which is an opening degree of the first control valve at a timing when the abnormality-determining-means obtains the first value;

obtain, as a second value, the supercharging-pressure-corresponding-value which is obtained at a second timing at which a predetermined period has elapsed from the first timing, during a period in which an abnormality determining condition including a condition that the engine is operated in the second operating area is satisfied when the supercharging-pressure-abnormal-state occurs and the first-compressor-downstream-side-pressure is smaller than or equal to the first threshold pressure; and, determine that the first control valve is normal and the second control valve is abnormal if an absolute value of a change amount of the supercharging-pressure-corresponding-value which is the difference of the second value and the first value is larger than or equal to a predetermined threshold change amount; and determine that the first control valve is abnormal and the second control valve is normal if the absolute value of the change amount of the supercharging-pressure-corresponding-value is smaller than the threshold change amount.

7. The apparatus for determining an abnormality of a control valve of an internal combustion engine according to claim 6, wherein the abnormality-determining-means is configured so as to obtain the supercharging pressure as the supercharging-pressure-corresponding-value.

8. The apparatus for determining an abnormality of a control valve of an internal combustion engine according to claim 6, wherein the abnormality-determining-means is configured so as to obtain the new air amount as the supercharging-pressure-corresponding-value.

9. The apparatus for determining an abnormality of a control valve of an internal combustion engine according to claim 1, wherein the control-valve-operating-means is configured in such a manner that the control-valve-operating-means operates the first control valve so that the opening degree of the first control valve becomes a fully-closed-opening-degree when the engine is operated in the first operating area.

10. The apparatus for determining an abnormality of a control valve of an internal combustion engine according to claim 1, wherein the first control valve is configured so as to vary the flow passage area of the first passage section in response to an instruction signal, the control-valve-operating-means or the abnormality-determining-means is configured so as to change the opening degree of the first control valve by sending the instruction signal to a first control valve driving means.

11. The apparatus for determining an abnormality of a control valve of an internal combustion engine according to claim 1, wherein the second control valve comprises a valving element, a valve seat portion against which the valving element rests, and biasing means for biasing the valving element toward the valve seat portion, and the second control valve is configured: in such a manner that the valving element is moved to a first position at which the valving element rests against the valve seat portion by a biasing force generated by the biasing means so as to close the second passage section when the pressure of the air in the second passage section at an upstream side of the second control valve is not larger than the pressure of the air at a downstream side of the second control valve by the first pressure or more; and in such a manner that the valving element is moved to a second position different from the first position against the biasing force generated by the biasing means so as to open the second passage section to allow an air to pass through the second passage section when the pressure of the air in the second passage section at an upstream side of the second control valve is larger than the pressure of the air at a downstream side of the second control valve by the first pressure or more.

* * * * *